United States Patent
Martin et al.

(10) Patent No.: US 12,183,207 B2
(45) Date of Patent: Dec. 31, 2024

(54) DISPATCHING PROVIDER DEVICES UTILIZING MULTI-OUTCOME TRANSPORTATION-VALUE METRICS AND DYNAMIC PROVIDER DEVICE MODES

(71) Applicant: Lyft, Inc., San Francisco, CA (US)

(72) Inventors: Sebastien Jean Francois Martin, New York, NY (US); Garrett John van Ryzin, Brooklyn, NY (US)

(73) Assignee: Lyft, Inc., San Francisco, CA (US)

( * ) Notice: Subject to any disclaimer, the term of this patent is extended or adjusted under 35 U.S.C. 154(b) by 885 days.

(21) Appl. No.: 16/985,650

(22) Filed: Aug. 5, 2020

(65) Prior Publication Data
US 2022/0044569 A1    Feb. 10, 2022

(51) Int. Cl.
*G08G 1/00*    (2006.01)
*G01C 21/34*    (2006.01)
*G01C 21/36*    (2006.01)

(52) U.S. Cl.
CPC ......... *G08G 1/202* (2013.01); *G01C 21/3438* (2013.01); *G01C 21/3461* (2013.01); *G01C 21/3605* (2013.01); *G08G 1/207* (2013.01)

(58) Field of Classification Search
CPC .... G08G 1/202; G08G 1/207; G01C 21/3438; G01C 21/3461; G01C 21/3605;
(Continued)

(56) References Cited

U.S. PATENT DOCUMENTS

2015/0161564 A1    6/2015 Sweeney et al.
2016/0034845 A1    2/2016 Hiyama et al.
(Continued)

OTHER PUBLICATIONS

Alexandra König, Jan Grippenkoven, Travellers' willingness to share rides in autonomous mobility on demand systems depending on travel distance and detour, 2019, Elsevier Ltd, Travel Behaviour and Society, pp. 13 (Year: 2019).*

(Continued)

*Primary Examiner* — Aniss Chad
*Assistant Examiner* — Chase L Cooley
(74) *Attorney, Agent, or Firm* — Keller Preece PLLC

(57) ABSTRACT

The present application discloses systems, methods, and computer-readable media that utilize computing devices to model multi-outcome transportation-value metrics that account for spatio-temporal trajectories across locations, times and other contextual features, and then utilize computer networks to dispatch provider devices to locations based on the multi-outcome transportation-value metrics. Moreover, the disclosed systems can utilize these multi-outcome transportation-value metrics and/or other models to manage and utilize dynamic transportation dispatch modes to more efficiently align provider devices and requestor devices across computer networks. For instance, the disclosed system can dispatch a provider device based on a discounted multi-outcome transportation-value metric. Furthermore, the disclosed system can dynamically determine prioritized dispatch mode provider device slots, fill provider device slots based on performance metrics, and then select provider device from between a prioritized transportation dispatch mode and another transportation dispatch mode based on prioritization metrics corresponding to a transportation request.

20 Claims, 24 Drawing Sheets

(58) Field of Classification Search
CPC ........... G06Q 10/0631; G06Q 30/0283; G06Q 30/08; G06Q 50/30
See application file for complete search history.

(56) References Cited

U.S. PATENT DOCUMENTS

| | | |
|---|---|---|
| 2018/0374032 A1 | 12/2018 | Pan et al. |
| 2019/0019122 A1 | 1/2019 | Allen |
| 2020/0018602 A1 | 1/2020 | Beaurepaire et al. |
| 2020/0126175 A1 | 4/2020 | Fong et al. |
| 2020/0364627 A1* | 11/2020 | Qin ..................... G06N 3/084 |
| 2021/0055118 A1 | 2/2021 | Singer et al. |
| 2022/0044570 A1 | 2/2022 | Azagirre Lekuona et al. |
| 2022/0261827 A1* | 8/2022 | Chen ..................... G06Q 10/02 |
| 2023/0120345 A1 | 4/2023 | Demiralp et al. |

OTHER PUBLICATIONS

Larry Karp, Railroad discounting, 2015, Elsevier, Economic Letters, pp. 2 (Year: 2015).*
U.S. Appl. No. 16/985,656, filed Sep. 1, 2023, Office Action.
U.S. Appl. No. 16/985,656, filed Jan. 24, 2024, Notice of Allowance.
U.S. Appl. No. 17/229,690, filed Jun. 12, 2024, Office Action.

* cited by examiner

DISPATCHING PROVIDER DEVICES UTILIZING MULTI-OUTCOME TRANSPORTATION-VALUE METRICS AND DYNAMIC PROVIDER DEVICE MODES

BACKGROUND

Recent years have seen significant development in transportation matching systems that utilize web and mobile applications to manage real-time on-demand transportation requests from requestor devices. For example, on-demand transportation matching systems can match provider devices with requestor devices to provide transportation across a variety of geographic locations. This often involves communications from an on-demand transportation matching system via web or mobile applications on a provider device and a requestor device that coordinate various aspects of a transportation service (e.g., a pickup location, a drop-off location, etc.). Although on-demand transportation matching systems can match provider devices and requestor devices, these systems have a number of technical deficiencies in relation to accuracy, efficiency, and flexibility of computing systems in dispatching provider devices across computer networks to satisfy real-time requests of requestor devices.

SUMMARY

The disclosure describes one or more embodiments of systems, methods, and non-transitory computer readable media that provide benefits and solve one or more of the foregoing or other problems. In particular, the disclosed systems can utilize computing devices to model multi-outcome transportation-value metrics that account for expected spatio-temporal trajectories across locations, times and other contextual features, and then utilize computer networks to dispatch provider devices to locations based on the multi-outcome transportation-value metrics. Moreover, the disclosed systems can utilize these multi-outcome transportation-value metrics and/or other models to manage and utilize dynamic transportation dispatch modes to more efficiently align provider devices and requestor devices across computer networks.

For example, in one or more embodiments, the disclosed systems utilize a dynamic programming approach to determine a multi-outcome transportation-value metric that reflects a total discounted expected reward for an open provider device conditioned on the location and time of the provider device. The disclosed systems can efficiently and flexibly generate a multi-outcome transportation-value metric that takes into account the entire trajectory of future dispatches and digital transportation requests that a provider device might fulfill with respect to an input location (e.g., a destination location) and time. To illustrate, in some embodiments, the disclosed systems utilize a dynamic programming model reduced to a least square value estimation to efficiently estimate multi-outcome transportation-value metrics that reflect rewards for sequences of anticipated outcomes beginning from particular locations and times. By analyzing multi-outcome transportation-value metrics for a variety of locations, the disclosed systems can accurately and flexibly dispatch provider devices into more efficient fleet layouts and generate more efficient provider device matches for transportation requests.

In addition, the disclosed systems can also utilize multi-outcome transportation-value metrics and/or other computer-implemented models to generate, assign, and manage different transportation dispatch modes across a fleet of provider devices. For instance, the disclosed systems can establish a prioritized dispatch mode and analyze historical data to determine a particular number of provider device slots corresponding to the prioritized dispatch mode. The disclosed systems can analyze a variety of performance metrics across a provider device fleet to assign provider devices to fill the provider slots corresponding to the prioritized dispatch mode. Subsequently, the disclosed systems can dispatch provider devices in the prioritized transportation dispatch mode using various prioritization metrics. As an example, the disclosed systems can prioritize provider devices from the prioritized transportation dispatch mode for a transportation request by analyzing the multi-outcome transportation-value metric at a destination location, predicted idle-times at the destination location, a provider-device-flow model between the destination location and a pickup location, or a number of transportation requests available at the destination location. In this manner, the disclosed systems can increase flexibility and accuracy of implementing systems by dispatching different provider devices according to the unique characteristics of individual transportation dispatch modes.

BRIEF DESCRIPTION OF THE DRAWINGS

The detailed description is described with reference to the accompanying drawings in which.

DETAILED DESCRIPTION

Figure 1:
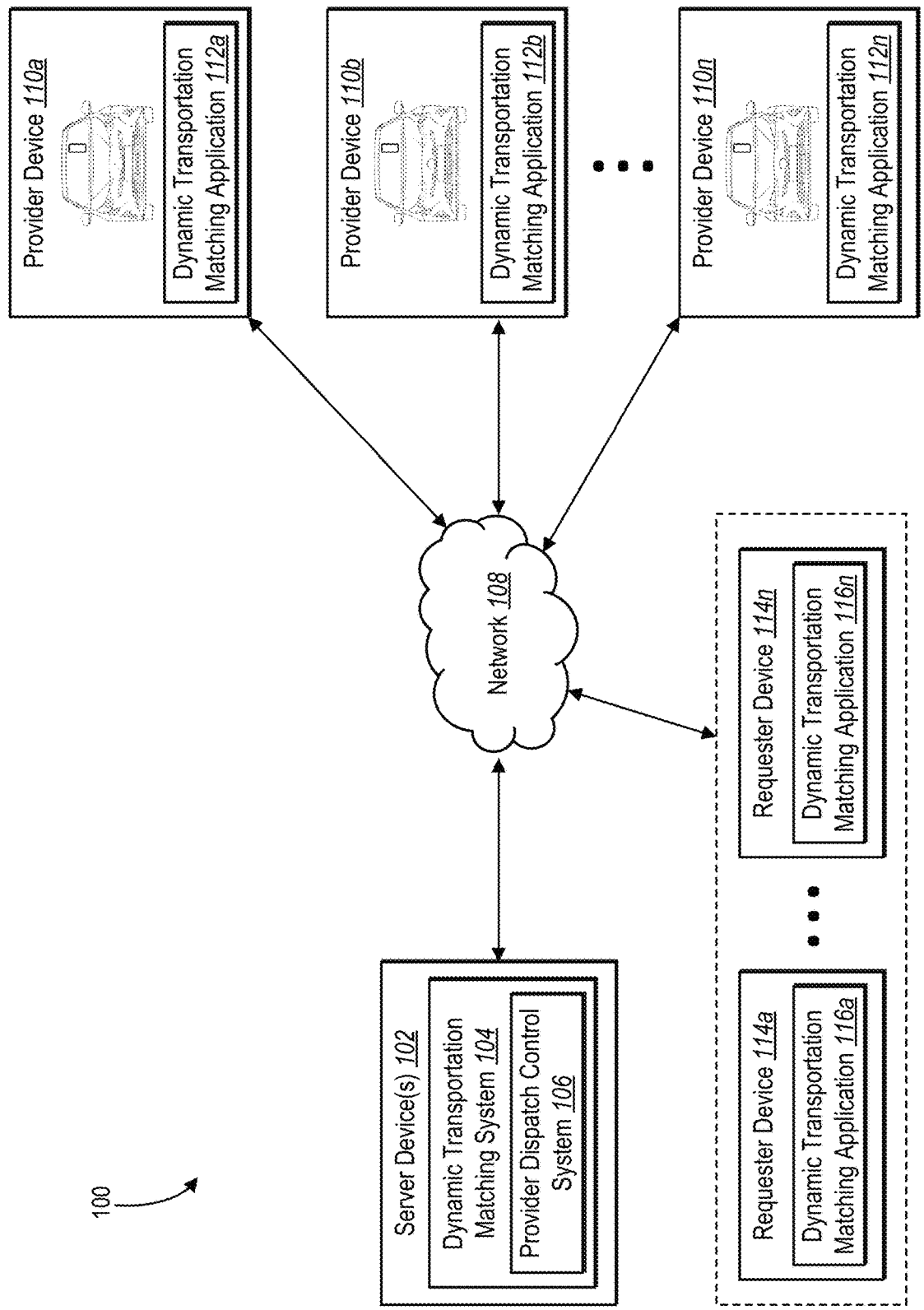
FIG. 1 illustrates a block diagram of an environment for implementing a provider dispatch control system in accordance with one or more embodiments.

This disclosure describes one or more embodiments of a provider dispatch control system that dispatches provider devices using multi-outcome transportation value metrics that accounts for multiple potential outcomes (or trajectories) corresponding to specific destination locations and times. In particular, the provider dispatch control system can model time-discounted expected trajectories from various locations to determine multi-outcome transportation-value metrics and then utilize the multi-outcome transportation-value metrics to accurately and efficiently dispatch provider devices. Moreover, the provider dispatch control system can utilize the multi-outcome transportation-value metrics and/or other models to generate and implement dynamic transportation dispatch modes for efficiently dispatching provider devices to respond to digital communications from requestor devices.

As just mentioned, the provider dispatch control system can determine a multi-outcome transportation-value metric for a provider device in relation to a specific time and location. For example, the provider dispatch control system can use a prediction model to analyze a set of historical outcomes and historical rewards to determine an expected reward that not only reflects the anticipated benefit of traveling to a destination location but the benefit of future outcomes (e.g., future dispatch trajectories) initiating from the destination location. The provider dispatch control system can utilize a variety of models to determine the multi-outcome transportation-value metric, including a dynamic programming approach in addition to other machine learning models.

In some embodiments, the provider dispatch control system can also apply a computer-implemented model to account for time-discounted values of expected rewards. For example, the provider dispatch control system can determine a transportation time to a particular destination location. The provider dispatch system can apply the transportation time to the expected reward corresponding to the destination location in order to generate a discounted multi-outcome transportation-value metric. In this manner, the provider dispatch system accounts for spatio-temporal rewards (for a variety of locations and times) while also accurately accounting for lost value in time required to travel between locations.

In addition, the provider dispatch control system can utilize a multi-outcome transportation value metric to dispatch provider devices. Indeed, the provider dispatch control system can utilize a discounted multi-outcome transportation-value metric to relocate a provider device to a destination location, select a provider device for a transportation request, and/or implement a prioritized transportation dispatch mode. In some embodiments, the provider dispatch control system, in real-time, determines multi-outcome transportation value metrics for multiple provider devices in association with a variety of locations, and dispatches the provider devices (even without transportation requests from requestor devices) into a more efficient layout of a fleet of provider devices.

As mentioned above, the provider dispatch control system can also generate and implement different transportation dispatch modes, such as a prioritized dispatch mode and an alternate (flexible) dispatch mode. In particular, the provider dispatch control system can select/assign provider devices to the prioritized dispatch mode to more efficiently dispatch the corresponding provider devices in responding to transportation requests. For example, the provider dispatch control system can monitor provider device activity across a computer network and select the most efficient provider devices for a prioritized dispatch mode. The provider dispatch control system can then utilize the multi-outcome transportation value metric (or other models) to dispatch the provider devices assigned to the prioritized dispatch mode even more efficiently.

To illustrate, the provider dispatch control system can select a provider device to fulfill a transportation request by selecting the provider device from between a prioritized transportation dispatch mode (that uses prioritization metrics) and a flexible transportation dispatch mode. For instance, the provider dispatch control system can determine a number of slots for the prioritized transportation dispatch mode and select provider devices for the prioritized transportation dispatch mode. Subsequently, the provider dispatch control system can determine prioritization metrics for provider devices from the prioritized transportation dispatch mode for a transportation request. Indeed, the prioritization metrics can correspond to a discounted multi-outcome transportation value metric at a destination location of the transportation request, idle times at the destination location, a provider-device-flow model for the destination location, or a number of transportation requests at the destination location. Then, the provider dispatch control system can analyze the prioritization metrics to select a provider device (e.g., from the prioritized transportation dispatch mode) to fulfill the transportation request.

As mentioned, the provider dispatch control system can intelligently determine provider devices for the prioritized transportation dispatch mode. In particular, the provider dispatch control system can determine a number of provider device slots for the prioritized transportation dispatch mode (e.g., using transportation-mode value improvement metrics and/or provider device utilization metrics). Subsequently, the provider dispatch control system can select provider devices for the number of slots (e.g., using performance metrics corresponding to the provider devices).

Then, the provider dispatch control system can select a provider device to fulfill a transportation request received from a requestor device by analyzing the prioritization metrics corresponding to provider devices in a prioritized transportation dispatch mode. For example, the provider dispatch control system can determine scores for provider devices using different criteria for the two dispatch modes to select a provider device. For instance, the provider dispatch control system can determine scores for the prioritized transportation dispatch mode using one or more prioritization metrics (priority selection scores) while determining scores for the additional transportation dispatch mode without the prioritization metrics (selection scores). As mentioned above, the provider dispatch control system can utilize a discounted multi-outcome transportation value metric at the destination location, idle times at the destination location, a provider-device-flow model for the destination location, or a number of transportation requests at the destination location to determine the prioritization metrics for a provider device.

Further, the provider dispatch control system can compare the priority selection scores and the selection scores to select a provider device from between the two dispatch modes. Upon selecting the provider device, the provider dispatch control system can transmit the transportation request to the selected provider device to fulfill the transportation request. In some embodiments, the provider dispatch control system analyzes the prioritization metrics by comparing the prioritization metrics to a baseline (or threshold) transportation value metric to determine whether to select or not to select a provider device from the prioritized transportation dispatch mode for a transportation request.

As mentioned above, although conventional ride sharing systems can match requestor devices with provider devices, conventional ride sharing systems often face a number of technical shortcomings, particularly with regard to efficiency, accuracy, and flexibility of operation. For instance, conventional systems often utilize complex, computationally expensive models, to match and dispatch provider devices to destination locations. For example, conventional systems can apply complex heuristic or machine-learning models to analyze a set of provider devices and requestor devices, match the provider devices to the requestor devices, and dispatch the provider devices to various destination locations. In analyzing thousands or millions of provider devices and requestor devices, this approach can require significant computational resources, bandwidth, and processing power.

Moreover, despite the complexity of such models, conventional systems still generate inaccurate and inefficient fleet layouts across geographic regions. Indeed, conventional systems often analyze the characteristics of individual transportation requests (e.g., destination location, travel distance, wait time at the pickup location, requestor rating, etc.) and features of provider devices (e.g., provider device location, estimated time of arrival, etc.) to dispatch provider devices. However, this approach often still results in sub-optimal or inaccurate matches that include impractical/inefficient destinations, unnecessary down time for provider devices, long wait times for requestor devices, and excessive digital cancellations. Moreover, this inaccuracy also leads to increased processing and bandwidth, as vacant provider devices and waiting requestor devices repeatedly query servers for matches, cancellations, re-matches, navigational directions, provider device locations, and/or digital status updates.

In addition, despite using complex analytical models, conventional ride sharing systems are often inflexible and rigid. Indeed, conventional ride sharing systems rigidly focus on features of provider devices and specific requestor devices to generate matches. This approach ignores alternative factors, including how any particular match will impact the future of individual provider devices, or a fleet of provider devices. This inflexibility further contributes to the inefficiencies and inaccuracies of implementing computing systems discussed above. Furthermore, conventional ride sharing systems are inflexible in that they dispatch provider devices utilizing the same approach. Indeed, conventional ride sharing systems often rigidly dispatch efficient provider devices utilizing the same algorithm and approach as inefficient provider devices.

The provider dispatch control system can provide numerous advantages, benefits, and practical applications relative to conventional systems. For example, the provider dispatch control system is more efficient compared to many conventional ride sharing systems. In particular, the provider dispatch control system can efficiently and intelligently determine and utilize multi-outcome transportation-value metrics based on one or more future outcomes at a location to dispatch provider devices. For instance, the provider dispatch control system can analyze a large number (e.g., thousands) of historical outcomes and rewards (in real time) for a number of provider devices in a complex system while remaining computationally efficient. For example, as discussed in greater detail below, the provider dispatch control system can utilize a dynamic programming model reduced to a least square value estimation to efficiently estimate multi-outcome transportation-value metrics. The provider dispatch control system can solve a dynamic programming model of historical outcomes across numerous destination locations with little processing power or time.

The provider dispatch control system also improves efficiency by implementing a prioritized dispatch mode. For example, the provider dispatch control system can monitor performance metrics of provider devices via computer networks to identify provider devices to assign to prioritized dispatch modes. The provider dispatch control system can then apply prioritized metrics in dispatching provider devices corresponding to the prioritized dispatch modes to more efficiently dispatch provider devices with heightened performance metrics across geographical regions. The resulting improvement in utilization and efficiency of the prioritized dispatch mode reduces the overall number of provider devices needed to fulfill network-wide transportation requests. Moreover, this reduction in provider devices reduces overall system communication and processing demand across implementing computer networks.

In addition, the provider dispatch control system can also improve accuracy relative to conventional systems. For example, by using a multi-outcome transportation-value metric, the provider dispatch control system can determine more accurate dispatch strategies for provider devices in a transportation matching system. For example, the provider dispatch control system can determine multi-outcome transportation values for a large number of provider devices to accurately align provider devices to requestor devices and destination locations with improved spatio-temporal trajectories. Indeed, the priority dispatch control system can utilize the determined multi-outcome transportation values to accurately dispatch provider devices to locations that increase utilization of provider devices. Moreover, the priority dispatch system can more accurately dispatch provider devices corresponding to prioritized dispatch modes.

In improving accuracy, the prioritized transportation dispatch mode further improves the efficiencies discussed above. For instance, the provider dispatch control system can dispatch provider devices to more efficient destinations, reduce idle times for provider devices, reduce wait times for requestor devices, and reduce digital cancellations. This leads to reduced processing and bandwidth, as provider devices and requestor devices submit fewer queries for matches, cancellations, re-matches, navigational directions, locations, and/or digital status updates.

Furthermore, the provider dispatch control system also improves flexibility relative to conventional systems. Indeed, rather than focusing rigidly on the features or characteristics of provider devices and requestor devices in generating digital matches, the provider dispatch control system can dispatch provider devices based on spatio-temporal trajectories after arriving at a destination location. In other words, the provider dispatch system can flexibly consider multiple outcomes beyond an initial destination location in dispatching provider devices and responding to transportation requests. In addition, the provider dispatch control system can further improve flexibility utilizing different dispatch modes. Indeed, the provider dispatch control system can flexibly apply different prioritization metrics to prioritized dispatch modes to dispatch provider devices in responding to transportation requests.

As indicated by the foregoing discussion, the present disclosure utilizes a variety of terms to describe features and advantages of the provider dispatch control system. For example, as used herein, the term "transportation request" refers to a request (e.g., from a requestor or requestor device) for transport by a transportation vehicle. In particular, a transportation request includes a request for a transportation vehicle to transport a requestor or a group of individuals from one geographic area to another geographic area. A transportation request can include information such as a pickup location, a destination location (e.g., a location to which the requestor wishes to travel), a request location (e.g., a location from which the transportation request is initiated), location profile information, a requestor rating, or a travel history.

As used herein, the term "transportation time" refers to a time of travel to a location. In particular, the term "transportation time" can include a time a provider device (or transportation vehicle) takes to reach a destination location from the provider device's current location, a pickup location associated with a transportation request, or another designated location. In one or more embodiments, the transportation time can include an estimated transportation time (e.g., an estimated time of arrival or "ETA") or an actual transportation time.

As used herein, the term "outcome" refers to activity or conduct resulting from a provider device being positioned at particular location. For example, an outcome can include a provider device fulfilling a transportation request to a destination location immediately after being at an initial location. Similarly, an outcome can include a provider device waiting or traveling without a passenger after being at an initial location. Thus, the term "outcome" can refer to conduct or actions (fulfilling a transportation request, logging off, fulfilling a multi-rider transportation request, waiting, traveling, etc.) over an interval of time between when a provider device is in an idle time (e.g., waiting for a transportation request) at an initial location and when the provider device begins a subsequent idle time at a destination location. Furthermore, as used herein, the term "historical outcome" refers to an outcome from a former time (e.g., a previously observed outcome from a provider device being positioned at an initial location).

As used herein, the term "reward" refers to a measured benefit, result, or incentive. In particular, the term "reward" can refer to a measured value or benefit corresponding to one or more outcomes from a provider device being positioned at a particular location. For example, a reward can include a conversion metric, a measure of revenue, a number of transportation requests fulfilled, a utilization metric (e.g., a measure of time that a provider device is actively fulfilling transportation requests), or a monetary value corresponding to one or more transportation requests. For instance, a reward can include the number of transportation requests fulfilled from outcomes originating at a particular location. Similarly, a reward can include provider device utilization metrics for outcomes from a particular location (or a monetary value corresponding to outcomes from a particular location). In addition, as used herein, the term "historical reward" refers to a reward that corresponds to a historical outcome (e.g., an observed reward from a previous time).

As used herein, the term "prediction model" refers to a computer-implemented algorithm that analyzes historical data to predict expected behaviors or results. In particular, the term "prediction model" can refer to a machine learning or other computer implemented algorithm that analyzes historical data (e.g., historical outcomes and/or historical rewards) to determine a predicted value for a particular location (e.g., a multi-outcome transportation-value metric at the particular location).

As used herein, the term "multi-outcome transportation-value metric" refers to an expected reward that reflects the value of an expected sequence of outcomes (originating from a particular location). In particular, the term "multi-outcome transportation-value metric" can refer to an accumulation of expected rewards for a provider device from a sequence of expected outcomes originating from a location (at a specific time). For example, a multi-outcome transportation-value metric can include the accumulated monetary value of a sequence of expected transportation requests that are expected to result from a provider device being positioned at a particular location (and moving to subsequent locations with expected outcomes and rewards).

As used herein, the term "discounted multi-outcome transportation-value metric" refers to a multi-outcome transportation-value metric that reflects a rate of reward degradation due to time. In particular, the term "discounted multi-outcome transportation-value metric" can refer to a multi-outcome transportation-value metric that is reduced by a time discounting rate that is based on a transportation time to a destination location. In some embodiments, the provider dispatch control system utilizes a time discounting rate that uses a combination of a logarithmic rate and a transportation time to a location.

As used herein, the term "transportation dispatch mode" refers to a category or classification of provider devices. In particular, a transportation dispatch mode refers to a classification utilized to dispatch provider devices utilizing a unique algorithm, weight, or score. For example, the provider dispatch control system can apply unique algorithms, weights, or scores in dispatching provider devices in different transportation dispatch modes. The provider dispatch control system can also provide unique application functionality, user interfaces, or access privileges to provider devices assigned to a particular transportation dispatch mode. Thus, a transportation dispatch mode can also refer to the unique application functions, interfaces, and privileges provided to a particular class of provider devices. For example, a transportation dispatch mode can include, but is not limited to, a prioritized transportation dispatch mode (e.g., a power dispatch mode) or another transportation dispatch mode (e.g., a flex dispatch mode).

Furthermore, as used herein, the term "prioritized transportation dispatch mode" refers to a transportation dispatch mode that is prioritized relative to another transportation dispatch mode. For example, provider devices assigned to a prioritized transportation dispatch mode can be prioritized over other provider devices corresponding to another transportation dispatch mode (e.g., to achieve an increased provider device utilization). To illustrate, the provider dispatch control system can apply prioritization metrics to provider devices corresponding to a prioritized dispatch mode in selecting provider devices to match with transportation requests of requestor devices.

As used herein, the term "selection score" refers to a value or metric utilized to select a provider device to fulfill a transportation request. In particular, the term "selection score" can refer to a value that indicates a degree (or grade) of correspondence between a provider device and a transportation request. In addition, as used herein, the term "priority selection score" refers to a selection score determined using one or more prioritization metrics and associated with a provider device assigned to a prioritized transportation dispatch mode.

In addition, as used herein, the term "prioritization metric" refers to a value applied to a provider device of a prioritized transportation dispatch mode in dispatching the provider device. In particular, a prioritization metric can include a value applied (only) to provider devices of a prioritized transportation dispatch mode in determining a selection score. Thus, the term "prioritization metric" can include a value used to increase and/or decrease a priority selection score of a provider device within the prioritized transportation dispatch mode (to increase utilization of the provider device). As outlined in greater detail below, the provider dispatch control system can determine a prioritization metric using a discounted multi-outcome transportation value metric at a destination location, an idle time corresponding with the destination location, a provider-device-flow model corresponding to the destination location, and/or a number of transportation requests near the destination location.

Additionally, as used herein, the term "idle time" refers to a time during which a provider device is not actively fulfilling a transportation request. In particular, the term "idle time" refers to a time in which a transportation vehicle corresponding to a provider device does not have an active transportation request and/or does not have a passenger in the transportation vehicle.

Moreover, as used herein, the term "provider device slot" refers to an assignable opening within a prioritized transportation dispatch mode for a provider device. In particular, the term "provider device slot" refers to an assignable opening to place a provider device within the prioritized transportation dispatch mode. As an example, the provider dispatch control system can determine fifty provider device slots for the prioritized transportation dispatch mode and select fifty provider devices for the provider device slots.

In addition, as used herein, the term "performance metric" refers to one or more attributes, features, or actions corresponding to a provider device. In particular, the term "performance metric" can include one or more attributes corresponding to a provider device utilized to rank or select the provider device for a transportation dispatch mode or a transportation request. For example, a performance metric can include attributes such as, but not limited to efficiency, rating, utilization time (e.g., an average or accumulated time), idle time, compliance, seniority, value, or drive time associated with a provider device (or account corresponding to a provider/provider device). In one or more embodiments, the provider dispatch control system 106 can utilize various provider device metrics described in U.S. patent application Ser. No. 16/909,456, filed Jun. 23, 2020, entitled GENERATING AND UTILIZING PROVIDER TIERS FOR DYNAMICALLY SURFACING PROVIDER DEVICE TRANSPORTATION TIME BLACK INTERFACES, the contents of which are herein incorporated by reference in their entirety.

Turning now to the figures, FIG. 1 illustrates a schematic diagram of a system 100 (or environment) in which a provider dispatch control system 106 can operate in accordance with one or more embodiments. As shown in FIG. 1, the system 100 includes server device(s) 102, a dynamic transportation matching system 104, the provider dispatch control system 106, provider devices 110a-110n, requestor devices 114a-114n, and a network 108. As further illustrated in FIG. 1, the server device(s) 102, the provider devices 110a-110n, and the requestor devices 114a-114n can communicate via the network 108. Although FIG. 1 illustrates the provider dispatch control system 106 being implemented by a particular component and/or device within the system 100, the provider dispatch control system 106 can be implemented, in whole or in part, by other computing devices and/or components in the system 100.

As shown in FIG. 1, the server device(s) 102 can include the dynamic transportation matching system 104 which further includes the provider dispatch control system 106. In particular, the provider dispatch control system 106 can determine discounted multi-outcome transportation-value metrics for one or more provider devices and dispatch the one or more provider devices using the respective discounted multi-outcome transportation-value metrics in accordance with one or more embodiments described herein. Furthermore, the provider dispatch control system 106 can also determine provider devices for a prioritized transportation dispatch mode and select provider devices for a transportation request (between the prioritized transportation dispatch mode using prioritization metrics and another transportation dispatch mode without using the prioritization metrics) in accordance with one or more embodiments described herein.

As mentioned above and as shown in FIG. 1, the system 100 includes the provider devices 110a-110n. In one or more embodiments, the provider devices 110a-110n may include, but are not limited to, mobile devices (e.g., smartphones, tablets) or any other type of computing devices, including those explained below with reference to FIGS. 18 and/or 19. Indeed, the provider devices 110a-110n can include computing devices associated with (and/or operated by) providers or transportation vehicles (e.g., transportation vehicles of providers or autonomous vehicles). Moreover, the system 100 can include any number of provider devices.

In addition, as shown in FIG. 1, each of the provider devices 110a-110n include dynamic transportation matching applications 112a-112n. In some embodiments, the dynamic transportation matching applications 112a-112n can comprise instructions that (upon execution) cause the provider devices 110a-110n to perform various actions for a dynamic transportation matching system, as described herein. Such instructions may cause a provider device to present dispatch instructions (e.g., via a graphical user interface displaying navigation information) for a vehicle associated with the provider device in accordance with one or more embodiments herein. Furthermore, such instructions may likewise cause a provider device to present graphical user interface including digital invitations to a prioritized transportation dispatch mode and/or transportation requests.

Moreover, as shown in FIG. 1, the system 100 includes the requestor devices 114a-114n. For example, the requestor devices 114a-114n may include, but are not limited to, mobile devices (e.g., smartphones, tablets) or any other type of computing devices, including those explained below with reference to FIGS. 18 and/or 19. Additionally, the requestor devices can include computing devices associated with (and/or operated by) requestors for transportation requests (or other services). As also shown in FIG. 1, the requestor devices 114a-114n include dynamic transportation matching applications 116a-116n which can include instructions that (upon execution) cause the requestor devices 114a-114n to perform various actions for the dynamic transportation matching system. For example, a requestor can operate the transportation matching application 116a on the requestor device 114a to transmit a transportation request to the provider dispatch control system 106 (via the network 108). Moreover, the system 100 can include any number of requestor devices.

In one or more embodiments, the provider devices 110a-110n and the requestor devices 114a-114n correspond to one or more user accounts (e.g., user accounts stored at the server device(s) 102). For example, a user of a provider device can establish a user account with login credentials and a provider of the provider device can establish a provider account with login credentials. These user accounts can include a variety of information regarding requestors/providers, including user information (e.g., name, telephone number, etc.), vehicle information (e.g., vehicle type, license plate number), device information (e.g., operating system, memory or processing capability), payment information, purchase history, transportation history, etc. Different accounts can also include various privileges associated with requestors and providers (e.g., privileges to access certain functionality via the transportation matching application, to provide transportation services, to submit transportation requests, etc.). The transportation matching system 104 can manage the provider devices 110a-110n and the requestor devices 114a-114n based on appropriate privileges associated with the corresponding user accounts (e.g. provider accounts and/or requestor accounts). Accordingly, providers and/or requestors can utilize multiple devices (e.g., multiple provider devices or multiple requestor devices) with the appropriate privileges associated with the corresponding accounts.

The present disclosure utilizes provider devices and requestor devices to refer to devices associated with these user accounts. Thus, in referring to a provider device or a requestor device, the disclosure and the claims are not limited to communications with a specific device, but any device corresponding to an account of a particular user. Accordingly, in using the term provider device, this disclosure refers to any computing device corresponding to a provider account. Similarly, in using the term requestor device, this disclosure refers to any computing device corresponding to a requestor account.

As an overview of the system 100, in one or more embodiments, a requestor device from the requestor devices 114a-114n can transmit a transportation request (e.g., including a pickup location and destination location) to the provider dispatch control system 106. Furthermore, the provider dispatch control system 106 can utilize information corresponding to the transportation request and the provider devices 110a-110n to select a provider device for the transportation request in accordance with one or more embodiments herein (e.g., using a multi-outcome transportation-value metric and/or a prioritized transportation dispatch mode). Then, the provider dispatch control system 106 can transmit the transportation request to a selected provider device (from the provider devices 110a-110n) to fulfill the transportation request. Additionally, in one or more embodiments, the provider dispatch control system 106 can determine multi-outcome transportation-value metrics for the provider devices 110a-110n in relation to a variety of locations and dispatch the provider devices 110a-110n using the multi-outcome transportation-value metrics in accordance with one or more embodiments herein.

Additionally, as shown in FIG. 1, the system 100 includes the network 108. As mentioned above, the network 108 can enable communication between components of the system 100. In one or more embodiments, the network 108 may include a suitable network and may communicate using a various number of communication platforms and technologies suitable for transmitting data and/or communication signals, examples of which are described with reference to FIGS. 18 and/or 19. Furthermore, although FIG. 1 illustrates the server device(s) 102, the provider device(s) 110a-110n, and the requestor devices 114a-114n communicating via the network 108, the various components of the system 100 can communicate and/or interact via other methods (e.g., the server device(s) 102 and the provider devices 110a-110n can communicate directly).

Figure 2:
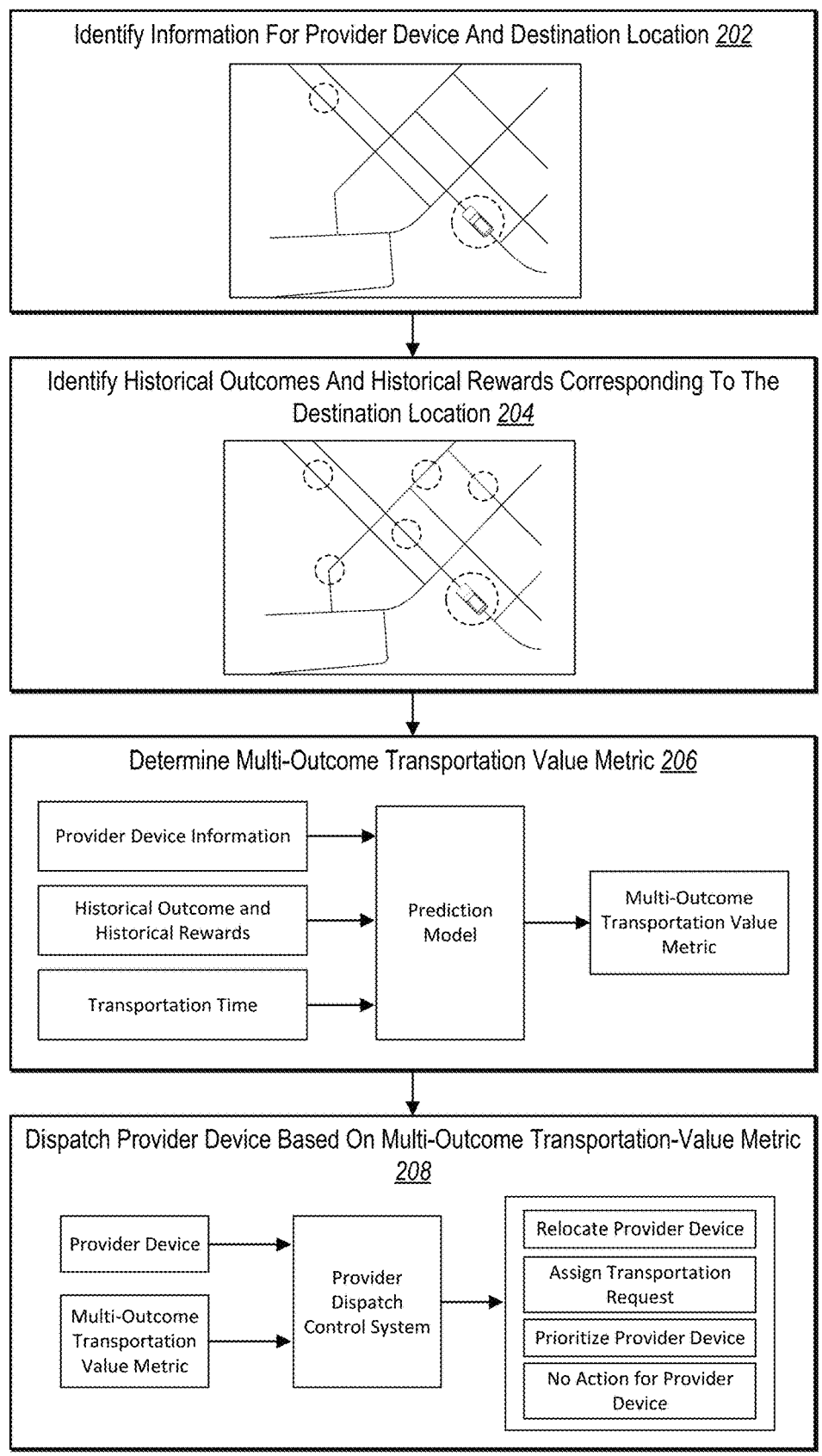
FIG. 2 illustrates an overview diagram of the provider dispatch control system dispatching a provider device based on a multi-outcome transportation-value metric in accordance with one or more embodiments.

As mentioned above, the provider dispatch control system 106 can dispatch a provider device using a multi-outcome transportation-value metric that accounts for a sequence of potential outcomes originating at a particular location. In particular, as shown in FIG. 2, the provider dispatch control system 106 identifies information for a provider device and a destination location and identifies historical outcomes and historical rewards corresponding to the destination location. Subsequently, as shown in FIG. 2, the provider dispatch control system 106 determines a multi-outcome transportation-value metric using the information, historical outcomes, and historical rewards. Finally, as further shown in FIG. 2, the provider dispatch control system 106 dispatches a provider device based on the multi-outcome transportation-value metric.

Indeed, as illustrated in FIG. 2, the provider dispatch control system 106 identifies information for a provider device and a destination location in an act 202. For example, the provider dispatch control system 106 can receive location information (e.g., GPS data) from a provider device to determine the current location of the provider device. In addition, the provider dispatch control system 106 can also identify one or more destination locations associated with possible relocation options for the provider device and/or associated with one or more transportation requests.

Furthermore, as shown in FIG. 2, the provider dispatch control system 106 identifies historical outcomes and historical rewards corresponding to one or more destination locations in an act 204. In particular, the provider dispatch control system 106 can identify (from historical data of one or more provider devices) historical outcomes that correspond to a destination location. Indeed, the historical outcomes can include one or more activities that have occurred from or correspond to the destination location (e.g., a chain of events). In addition, the provider dispatch control system 106 can identify a historical reward that corresponds to the historical outcome. In one or more embodiments, the provider dispatch control system 106 identifies multiple historical outcomes and historical rewards for a destination location or for a plurality of destination locations. Additional detail regarding identifying historical outcomes and historical rewards is provided below (e.g., in relation to FIGS. 3A and 3B).

Additionally, as illustrated in FIG. 2, the provider dispatch control system 106 determines a multi-outcome transportation-value metric in an act 206. As shown in FIG. 2, the provider dispatch control system 106 can analyze the provider device information (e.g., a current location), identified historical outcomes and historical rewards, and a transportation time to a destination location using a prediction model. In some embodiments, the provider dispatch control system 106 utilizes the prediction model to recursively determine multi-outcome transportation-value metrics for multiple destinations from the historical outcomes and historical rewards. Further, the provider dispatch control system 106 generates a discounted multi-outcome transportation-value metric for a destination location by utilizing a multi-outcome transportation-value metric determined for the destination location discounted by the transportation time to the destination location (for the provider device). Additional detail regarding determining multi-outcome transportation-value metrics and discounted multi-outcome transportation-value metrics is provided below (e.g., in relation to FIG. 4).

Then, as shown in FIG. 2, the provider dispatch control system 106 dispatches a provider device based on the multi-outcome transportation-value metric in an act 208. In particular, the provider dispatch control system 106 can utilize the discounted multi-outcome transportation-value metric corresponding to the destination location (for the provider device) to determine a dispatch strategy for the provider device. For example, as shown in FIG. 2, the provider dispatch control system 106 can take a variety of dispatch actions for the provider device based on the discounted multi-outcome transportation-value metric including relocating the provider device to the destination location, selecting a transportation request that includes traveling to the destination location, prioritizing the provider device for transportation requests to the destination location, or taking no action for the provider device such that the provider device does not travel to the destination location. Additional detail regarding dispatching a provider device based on a multi-outcome transportation-value metric is provided below (e.g., in relation to FIGS. 5-8).

As mentioned above, the provider dispatch control system 106 can identify historical outcomes and historical rewards for a plurality of locations. For instance, the provider dispatch control system 106 can store (or log) historical data that corresponds to one or more outcomes experienced by one or more provider devices within the dynamic transportation matching system 104. Indeed, the provider dispatch control system 106 utilizes this historical data as historical outcomes. In addition, the provider dispatch control system 106 can store (or log) rewards that were experienced for those historical outcomes. The provider dispatch control system 106 can further utilize these rewards as the historical rewards.

In one or more embodiments, the provider dispatch control system 106 represents an outcome as activity with an interval of time between when a provider device is in an idle state (e.g., waiting for a transportation request) and when the provider device enters a subsequent idle state. In particular, the provider dispatch control system 106 can identify an outcome of a provider device by identifying an interval of time in which the provider device is an idle state, engages in one or more activities, and enters a subsequent idle state.

Figure 3A:
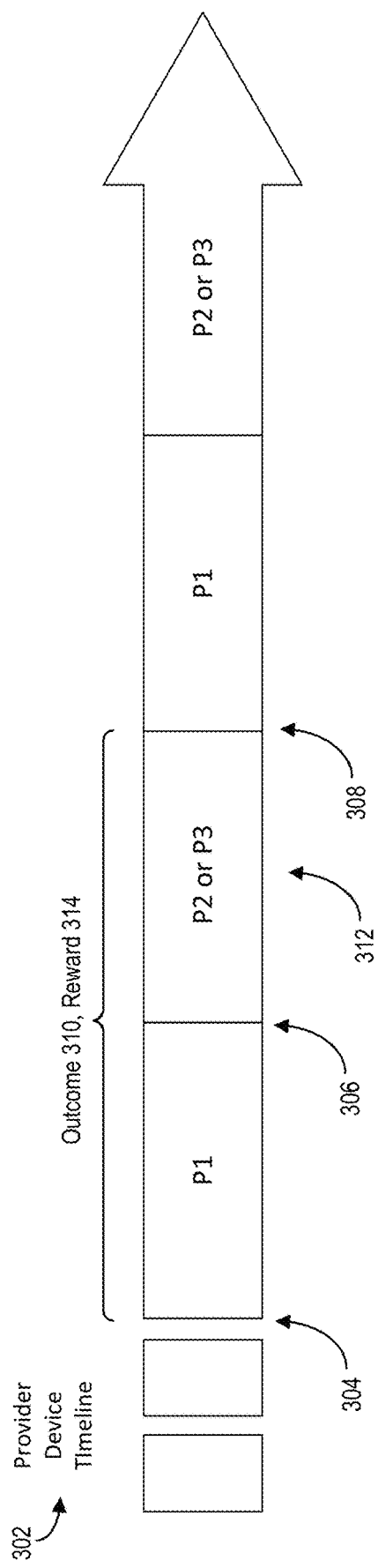
FIGS. 3A and 3B illustrate a diagram of the provider dispatch control system identifying historical outcomes and historical rewards from historical data in accordance with one or more embodiments.

Indeed, FIG. 3A illustrates an example outcome of a provider device within a provider device timeline 302. For example, as shown in FIG. 3A, the provider dispatch control system 106 can determine the beginning of an outcome at the start of an idle state (P1 state) (e.g., an initial point 304 of a P1 state). In addition, as shown in FIG. 3A, the provider dispatch control system 106 can identify a start of an activity state (P2 or P3 state) (e.g., point 306 of a P2 or P3 state). Then, as illustrated in FIG. 3A, the provider dispatch control system 106 can identify the start of a subsequent idle state for the provider device (e.g., the point 308 of a subsequent P1 state). The provider dispatch control system 106 can identify the interval (and activities) between start of the idle state at initial point 304 and the start of the subsequent idle state at point 308 as an outcome 310.

In one or more embodiments, as shown in FIG. 3A, the provider dispatch control system 106 can identify one or more activities 312. As an example, a provider dispatch control system 106 can identify when a provider device begins waiting for a transportation request (e.g., the initial point 304). Then, the provider dispatch control system 106 can identify when a provider device receives a transportation request, travels to a pickup location associated with the transportation request, and/or is actively fulfilling the transportation request (e.g., the point 306 of a P2 or P3 state). Subsequently, the provider dispatch control system 106 can identify when a provider device completes the transportation request (at a destination location) and enters a subsequent idle state (e.g., the point 308). Indeed, in one or more embodiments, the provider dispatch control system 106 can represent such an interval of time and such activities within that interval of time as the outcome 310.

As shown in FIG. 3A, the provider dispatch control system 106 can represent different states of a provider device utilizing a P1 state, a P2 state, and a P3 state. For example, the provider dispatch control system 106 can determine that a provider device is in a P1 state when the provider device is waiting for a transportation request (e.g., not assigned a transportation request). In particular, a P1 state can include a state in which the provider device is idle and not fulfilling a transportation request.

Furthermore, the provider dispatch control system 106 can determine that a provider device is in a P2 state when the provider device is assigned (or selected for) a transportation request. Indeed, the P2 state can include a state in which a provider device (via a vehicle associated with the provider device) is travelling to a pickup location corresponding to a transportation request. For instance, the provider dispatch control system 106 can determine that a provider device is in a P2 state after the provider device is assigned a transportation request, while the vehicle corresponding to the provider device travels to a pickup location for the transportation request, and until the provider device begins to actively fulfill the transportation request (e.g., the requestor is in the vehicle corresponding to the provider device).

Additionally, the provider dispatch control system 106 can determine that a provider device is in a P3 state when the provider device is actively fulfilling a transportation request. For example, the P3 state can include a state in which a provider device (via a vehicle associated with the provider device) is actively providing transportation to a requestor to a destination location. Indeed, the provider dispatch control system 106 can identify that a provider device is in a P3 state when a requestor is picked up and is being transported to a destination location corresponding to a transportation request. For instance, as used herein, the term "utilization metric" (sometimes referred to as "provider device utilization metric") refers to a measure of provider device activity in fulfilling transportation requests over time. In particular, a utilization metric can include a measure of active time (i.e., in a P3 state) spent by a provider device in fulfilling transportation requests (e.g., a percentage of time with a requestor in a provider vehicle).

Furthermore, as mentioned above, the provider dispatch control system 106 can identify (or determine) a reward correspond to an outcome for a provider device. For instance, a reward can include the number of transportation requests one or more provider devices fulfill within an interval of time, one or more provider device utilization metrics reflecting times associated with one or more provider devices actively fulfilling one or more transportation requests, or a monetary value corresponding to one or more transportation requests. Indeed, a provider dispatch control system 106 can determine a reward for an outcome by identifying the number of transportation requests that are fulfilled within the outcome (e.g., the number of P3 states), identifying the provider device utilization metrics associated with the provider devices actively fulfilling one or more transportation requests in the outcome (e.g., an amount of time within the P3 state), or a monetary value corresponding to the outcome (e.g., monetary value gained from the P2 and/or P3 states). For instance, as shown in FIG. 3A, the provider dispatch control system 106 can determine a reward 314 associated with the outcome 310. Indeed, the reward 314 can include the value of the P2 or P3 state (e.g., the one or more activities 312) within the outcome 310.

Figure 3B:
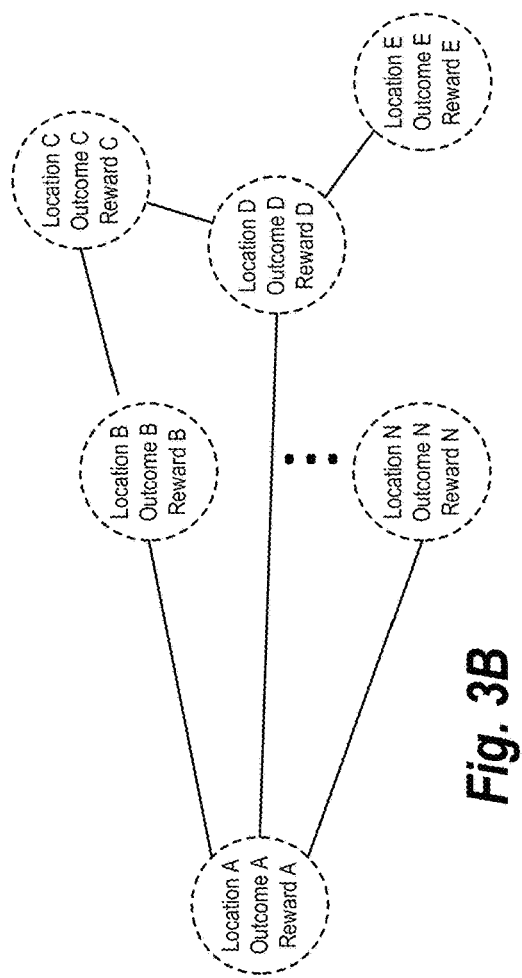

In one or more embodiments, the provider dispatch control system 106 can identify a variety of historical outcomes and historical rewards from a variety of locations. For example, FIG. 3B illustrates the provider dispatch control system 106 identifying a variety of historical outcomes and historical rewards for multiple locations. As shown in FIG. 3B, the provider dispatch control system 106 identifies historical outcomes at each location and historical rewards of transitioning to the next location (e.g., location A-N each include an outcome and reward). Furthermore, the provider dispatch control system 106 can identify a historical outcome and historical reward for a variety of provider devices at each location. By doing so, the provider dispatch control system 106 can identify a set of historical outcomes and historical rewards for one or more locations associated with the dynamic transportation matching system 104.

Furthermore, the provider dispatch control system 106 can identify historical outcomes and historical rewards for a location in association with various times. For instance, the provider dispatch control system 106 can identify historical outcomes and historical rewards that occur at a location at different time periods. For example, the provider dispatch control system 106 can identify different sets of historical outcomes and historical rewards at a location for different times of a day (e.g., every ten minutes, half hour, hour). In addition, the provider dispatch control system 106 can also identify different sets of historical outcomes and historical rewards at a location for different days (e.g., specific dates, days of the week).

In some embodiments, the provider dispatch control system 106 can utilize historical outcomes and historical rewards corresponding to a variety of provider devices at a location to generate a distribution of historical outcomes and rewards for the location. For instance, the provider dispatch control system 106 can collect historical outcome and historical reward data for multiple provider devices that have experienced an outcome and reward at a location and generate a distribution of historical outcomes and rewards for the location. Indeed, the provider dispatch control system 106 can generate a distribution of historical outcomes and rewards for multiple locations. Additionally, the provider dispatch control system 106 can also utilize historical outcomes and historical rewards of multiple provider devices at a location to generate a distribution of historical outcomes and rewards for the location in association with different times (e.g., a different distribution for a different time period).

Furthermore, the provider dispatch control system 106 can utilize historical outcomes and historical rewards corresponding to a location (e.g., based on a distribution or other statistical approach at each location) to determine historical multi-outcome transportation-values at the location. In particular, upon identifying historical outcomes and historical rewards for each available location, the provider dispatch control system 106 can determine the historical multi-outcome transportation value of a location by utilizing an accumulation of historical rewards resulting from the location and other locations that correspond to a future outcome of that location (e.g., using recursive approach as described in greater detail below in relation to FIG. 4). Indeed, the provider dispatch control system 106 can also determine historical multi-outcome transportation values that are discounted by the transportation time between the locations (as described in greater detail below in relation to FIG. 4).

Although the foregoing example describes determining value based on time and location, the system can determine value based on a variety of other contextual factors. For example, the provider dispatch control system 106 can determine historical multi-outcome transportation-values specific to particular times and locations (but independent of other provider device features). In some embodiments, the provider dispatch control system 106 can identify multi-outcome transportation values specific to other features (e.g., driver ratings, driver vehicle, weather, historical driver performance, etc.).

For instance, the provider dispatch control system 106 can determine specific sets of provider devices by using attributes corresponding to the provider devices. As an example, the provider dispatch control system 106 can utilize performance metrics (as described below) to determine a specific set of provider devices and generate a historical multi-outcome transportation value (at a location) from historical outcome and historical reward data corresponding to the specific set of provider devices. Furthermore, in some embodiments, the provider dispatch control system 106 can utilize attributes such as, but not limited to, vehicle type, vehicle age, and/or ride type to determine a specific set of provider devices and generate a historical multi-outcome transportation value from historical outcome and historical reward data corresponding to these specific features or contexts.

Figure 4:
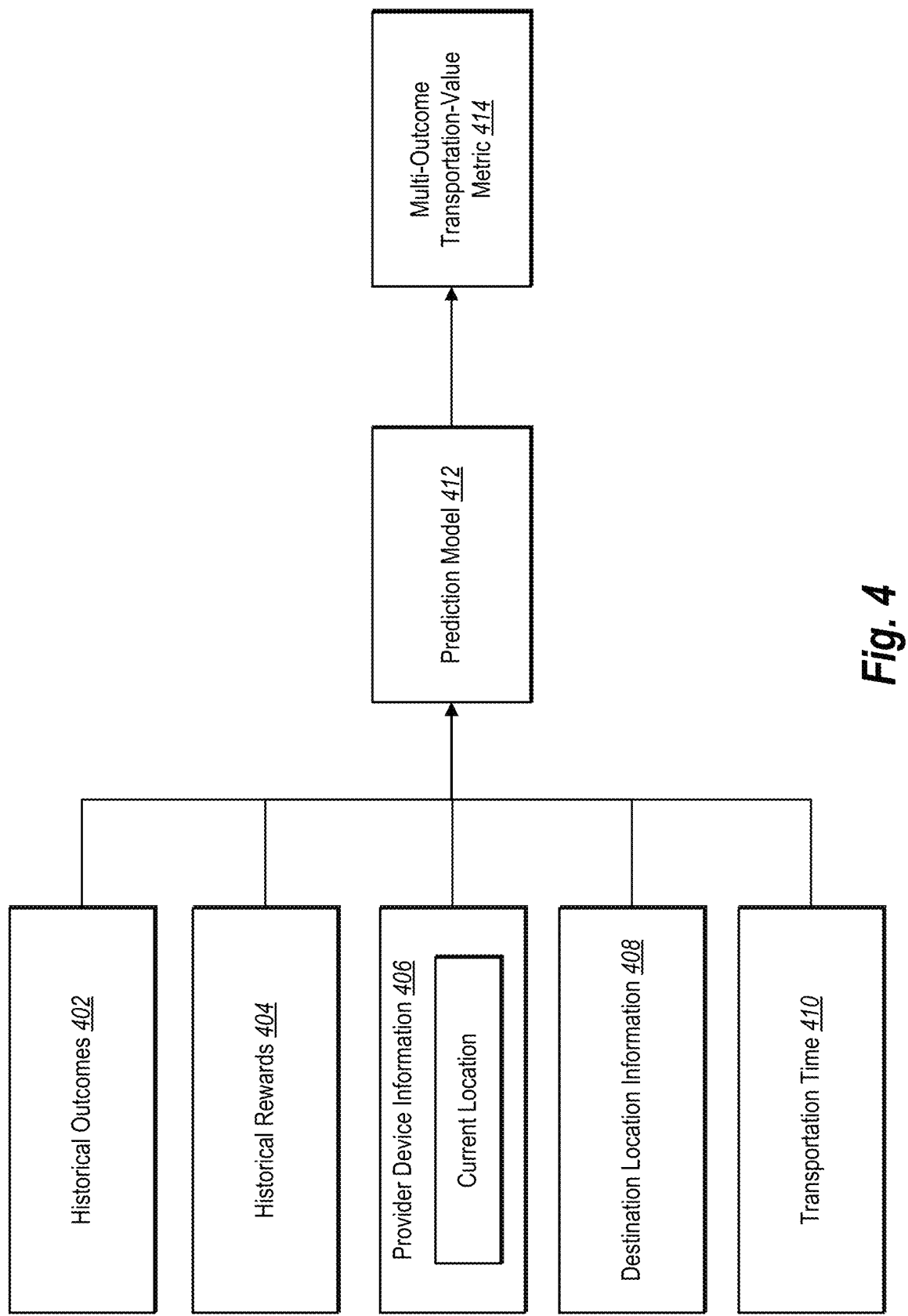
FIG. 4 illustrates a diagram of the provider dispatch control system determining a multi-outcome transportation-value metric in accordance with one or more embodiments.

As mentioned above, the provider dispatch control system 106 can determine multi-outcome transportation-value metrics for a location and time. For instance, FIG. 4 illustrates the provider dispatch control system 106 determining a multi-outcome transportation-value metric for a destination location and provider device. In particular, as shown in FIG. 4, the provider dispatch control system 106 generates a multi-outcome transportation value metric 414 by utilizing a prediction model 412 to analyze historical outcomes 402, historical rewards 404, provider device information 406, destination location information 408 (across a variety of locations), and transportation time 410. For example, the provider dispatch control system 106 can determine an estimated multi-outcome transportation-value metric at a location that is based on a variety of outcomes and rewards corresponding to the location and also a variety of outcomes and rewards corresponding to successive locations from the location. Accordingly, the generated multi-outcome transportation-value estimated for a location (and time) can provide insight on the effect of dispatching a particular provider device to the location (at a particular time).

Moreover, the provider dispatch control system 106, as part of the prediction model 412, can also generate discounted multi-outcome transportation-value metrics. For instance, the provider dispatch control system 106 can determine an estimated multi-outcome transportation-value metric at a location by accounting for transportation time to the location. In addition, the provider dispatch control system 106 can also account for transportation time from the location to successive locations by discounting each expected reward between locations by a transportation time between the locations. In some embodiments, the transportation time is based on travel distance (and a travel path) from a current location of the provider device.

For instance, the provider dispatch control system 106 can determine a multi-outcome transportation-value metric ($V_{i,t}$) at a location i and a time t of a provider device. In particular, the provider dispatch control system 106 can determine a provider device outcome in which the provider device becomes open (e.g., leaves an idle P1 state) at a time i and location t, begins a P2 or P3 state at second time and second location, and continues to an arrival time at a destination location (e.g., the start of a subsequent idle time). The provider dispatch control system 106 can determine a reward (corresponding to the P2 and/or P3 state) for such an outcome that is discounted (e.g., reduced) by the transportation time from the time i and the arrival time at the destination location. Indeed, the provider dispatch control system 106 can determine such a discounted reward for multiple outcomes (e.g., multiple outcomes in which the second outcome is an outcome at a first destination location). Moreover, the provider dispatch control system 106 can utilize a summation of the discounted rewards as the discounted multi-outcome transportation-value metric corresponding a location.

For example, the provider dispatch control system 106 can determine a discounted multi-outcome transportation-value metric (e.g., a total discounted expected reward accumulated by a provider device over time) where a provider device begins a P1 state at time $t_0$. In particular, the provider dispatch control system 106 considers a sequence of rewards ($r_1, r_2, \ldots$) as they accumulate over time and a sequence of times ($t_1, t_2, \ldots$) at which the provider device leaves a P1 state (i.e., switches from a P1 state to another state). In some embodiments, the provider dispatch control system 106 utilizes stochastic infinite sequence $(r_k)_k$ and $(t_k)_k$. Indeed, the provider dispatch control system 106 can determine (or represent) the discounted multi-outcome transportation-value metric V starting at time $t_0$ using the following equation:

$$V = \mathbb{E}_{r,t}[\Sigma_{k=1} e^{-\rho(t_k - t_0)} r_k] \text{ or}$$

$$V_{i,t_0} = \mathbb{E}_{r,t}[\Sigma_{k=1} e^{-\rho(t_k - t_0)} r_k | \text{ provider device is in location } i \text{ at time } t_0].$$

Furthermore, (in relation to the above equation) the provider dispatch control system 106 can represent a time discounting rate as parameter $\rho > 0$. In one or more embodiments, as the value of $\rho$ increases, future rewards are increasingly discounted (e.g., the provider dispatch control system 106 values future rewards to a lesser degree than current rewards). Furthermore, as the value of $\rho$ decreases, future rewards are less discounted (e.g., the provider dispatch control system 106 values future rewards closer to a current reward). For example, the provider dispatch control system 106 can utilize $\rho = 1$ to make future rewards only half of the value of rewards at an initial time (e.g., when the unit of time is in hours). In one or more embodiments, the provider dispatch control system 106 utilizes discounting to reflect model uncertainty (e.g., introducing less confidence for estimated future rewards versus estimated reward values for the current time). The provider dispatch control system 106, in some embodiments, also utilizes discounting to reflect a duration of a provider device's activity (e.g., a provider device may become inactive to stop accumulating a future reward due to an end of the driver's shift).

Additionally, the provider dispatch control system 106 can determine a (discounted) multi-outcome transportation-value metric for outcomes corresponding to the provider device. For example, in one or more embodiments, the provider dispatch control system 106 can represent a provider device outcome as a, the time and location at which the provider device enters a P1 state as $t^O(\omega)$ and $O(\omega)$ respectively, the time at which the provider device enters a P2 or P3 state as $t^S(\omega)$ and $S(\omega)$ respectively, and time and location of a destination of the provider device as $t^D(\omega)$ and $D(\omega)$ respectively. Furthermore, the provider dispatch control system 106 represents the reward collected during a P2 and/or P3 state as $r(\omega)$. Indeed, the provider dispatch control system 106 can generate a discounted multi-outcome transportation-value metric $V_{i,t}$ for a provider device in a location i at time t using the following equation:

$$V_{i,t} = \mathbb{E}_{\omega_1, \omega_2, \ldots}[\Sigma_k r(\omega_k) e^{-\rho(t^D(\omega_k) - t^O(\omega_1))} | t^O(\omega_1) = t, O(\omega_1) = i].$$

In relation to the above equation, in one or more embodiments, the provider dispatch control system 106 represents $O(\omega_{k+1}) = D(\omega_k)$ and $t^O(\omega_{k+1}) = t^D(\omega_k)$.

In some embodiments, the provider dispatch control system 106 utilizes a martingale assumption in which the determination is conditioned on the subsequent outcome location and a subsequent time associated with a subsequent outcome location and where the subsequent outcome is independent from a set of outcomes associated with the determined multi-outcome transportation-value metric. Indeed, the provider dispatch control system 106 utilizes a martingale assumption while determining a multi-outcome transportation-value metric such that an outcome of a provider device does not depend on a provider device's history of past outcomes. For instance, as mentioned above, in one or more embodiments, the provider dispatch control system 106 conditions future outcomes on location and time of a provider device. In particular, in one or more embodiments, the provider dispatch control system 106 utilizes the following condition (e.g., as the martingale assumption):

Conditioned on $O(\omega_{k+1}), t^O(\omega_{k+1}), \omega_{k+1}$ is independent of $\{\omega_1, \ldots, \omega_k\}$.

Furthermore, the provider dispatch control system 106 can utilize the multi-outcome transportation-value metric in dispatching a provider device. For example, the provider dispatch control system 106 can determine a reward for traveling to a particular location (e.g., a reward for servicing a transportation request) and then combine that reward with a multi-outcome transportation-value metric for being at the particular location. By combining the reward for a servicing a transportation request with the multi-outcome transportation-value metric for arriving at the destination location, the provider dispatch control system can provide a more complete estimate of the value of dispatching the provider device to service the transportation request.

For instance, the provider dispatch control system 106 can first determine a reward for a first outcome starting at a location i and time t of a provider device to destination location. Then, the provider dispatch control system 106 can utilize the destination location (d(i)) and the time of arrival (d(t)) at the destination location to determine a multi-outcome transportation-value metric ($V_{d(i), d(t)}$). As mentioned above, the provider dispatch control system 106 can determine the multi-outcome transportation-value metric ($V_{d(i), d(t)}$) reflecting rewards for a chain of expected outcomes resulting from the provider device arriving at the destination location and proceeding on to one or more successive locations.

In order to determine the total value ($V_{i, t}$) at a location i and a time t for a provider device, the provider dispatch control system 106 can combine the reward (for fulfilling a transportation request to the destination location) with the multi-outcome transportation-value metric ($V_{d(i), d(t)}$) (which reflects rewards that are expected to result from the provider device arriving at the destination location and providing transportation services to successive locations).

Furthermore, the provider dispatch control system 106 can also discount values based on the time it takes to travel to one or more destinations. For example, the provider dispatch control system 106 can determine a reward for a first outcome starting at a location i and time t of a provider device to destination location. The provider dispatch control system 106 can discount the reward by a transportation time to a location corresponding to the start of a P2 or P3 state from a current location of the provider device (e.g., i).

Additionally, the provider dispatch control system 106 can discount a multi-outcome transportation value metric. For example, the provider dispatch control system 106 can utilize a destination location (d(i)) and a time of arrival (d(t)) at the destination location to discount a multi-outcome transportation-value metric ($V_{d(i), d(t)}$) based on the transportation time to the destination location. For example, the transportation time to the destination can include a time from the current location (i) of the provider device or a location corresponding to the P2 or P3 state of the first outcome.

For example, the provider dispatch control system 106 can combine a discounted reward (for servicing a transportation request to a destination location) together with a discounted multi-outcome transportation value corresponding to the destination location utilizing the following equation:

$$V_{i,t} = \mathbb{E}_{\omega_1}\left[r(\omega_1)e^{-\rho(t^S(\omega_1) - t^O(\omega_1))} + V_{D(\omega_1), t^D(\omega_1)}e^{-\rho(t^D(\omega_1) - t^O(\omega_1))} \mid t^O(\omega_1) = t, O(\omega_1) = i\right].$$

In some embodiments, the provider dispatch control system 106 utilizes a logarithmic function to discount rewards by transportation time (e.g., $\rho = \ln(2)$). For instance, the provider dispatch control system 106 can utilize a logarithmic discounting rate that increasingly discounts rewards as transportation time increases. As an example, the provider dispatch control system 106 can discount a reward by half when the transportation time between locations is one hour (e.g., a reward that happens after one hour is discounted by half).

As mentioned above, the provider dispatch control system 106 can determine (or calculate) a multi-outcome transportation-value metric (for a location and time). In particular, the provider dispatch control system 106 can determine a multi-outcome transportation-value metric for a destination location by determining a summation of rewards accumulated from a location of the provider device and one or more outcomes beginning at the destination location to one or more successive locations (from historical outcomes and historical rewards). For instance, the provider dispatch control system 106 can determine the multi-outcome transportation-value metric by using the summation of rewards (e.g., from a P2 and/or P3 state) of a first outcome (e.g., transitioning to a destination location), a second outcome (e.g., transitioning to a successive location from the destination location), and a variety of outcomes from the successive location.

Indeed, the provider dispatch control system 106 can utilize a recursive approach (as part of the prediction model 412) to calculate (or approximate) a multi-outcome transportation-value metric for a location. For example, the provider dispatch control system 106 can utilize the above approach in a recursive manner (with dynamic programming) to determine a multi-outcome transportation-value metric ($V_{i, t}$) at a location i and a time t for a provider device. In one or more embodiments, the provider dispatch control system 106 utilizes a dynamic programming approach modeled on the Bellman equation to determine a multi-outcome transportation-value metric ($V_{i, t}$) at a location i and a time t for a provider device (via recursion).

For example, the provider dispatch control system 106 can condition the prediction model to approximate estimated multi-outcome transportation-value metrics for pairings of locations and times by comparing estimated multi-outcome transportation-value metrics with historical multi-outcome transportation-values. In particular, the provider dispatch control system 106 can utilize a function to estimate a multi-outcome transportation-value metric at a location and time. Then, the provider dispatch control system 106 can compare the estimated multi-outcome transportation-value metric to a multi-outcome transportation-value metric based on historical outcomes and historical rewards corresponding to the location and a similar time. Indeed, the provider dispatch control system 106 approximates the estimated multi-outcome transportation-value metrics by determining parameters for a multi-outcome transportation-value metric function that results in a minimal error.

For example, the provider dispatch control system 106 can estimate multi-outcome transportation-value metrics using historical outcome and historical reward data by approximating for a minimum error. More specifically, the provider dispatch control system 106 can determine a function that approximates a multi-outcome transportation value by determining parameters for the function that result in a minimal error between the estimated multi-outcome transportation value and the multi-outcome transportation value from historical outcomes and historical rewards (e.g., to make the approximated value and the value from the historical data as similar as possible or the same). By doing so, the provider dispatch control system 106 can determine an approximation function for the multi-outcome transportation-value metric that results in an accurate multi-outcome transportation-value metric without requiring a substantial (or infinite) amount of historical outcome and historical reward data at a location and time.

In particular, the provider dispatch control system 106 assigns a multi-outcome transportation value $V_{i,t}$ to a set of states (e.g., indexed by a variety of locations i and a variety of times t) as a multi-outcome transportation value approximation function. Then, the provider dispatch control system 106 can determine one or more estimated multi-outcome transportation-values by using the recursive (e.g., dynamic programming) approach described above with state transitions and rewards from the historical outcomes and historical rewards (e.g., the distribution of the historical outcomes and rewards). The provider dispatch control system 106 can determine a residual (or difference) between the multi-outcome transportation value output by the approximation function and the estimated multi-outcome transportation-value metric from the historical outcomes and historical rewards. Then, the provider dispatch control system 106 can select or adjust the parameters of the approximation function to minimize the residual (e.g., error) between the multi-outcome transportation value output by the approximation function and the estimated multi-outcome transportation-value metric from the historical outcomes and historical rewards to improve the accuracy of the approximation function.

In one or more embodiments, the provider dispatch control system 106 utilizes a least squares problem approach to improve the accuracy of the multi-outcome transportation-value metric approximation function. In particular, the provider dispatch control system 106 can determine a square of a residual (or difference) between the multi-outcome transportation value output by the approximation function and the estimated multi-outcome transportation-value metric from the historical outcomes and historical rewards. Then, the provider dispatch control system 106 can select or adjust parameters of the approximation function to minimize the squared residual. The resulting approximation function is utilized by the provider dispatch control system 106 to determine multi-outcome transportation-value metrics corresponding to particular locations at particular times for a provider device. For example, the provider dispatch control system 106 can improve the accuracy of a multi-outcome transportation-value metric approximation function $V_{i,t}=v(i, t,X)$ by estimating a set of parameters X for the function v using the following equation:

$$\min_X \mathbb{E}_\omega \Big[ \Big( v(O(\omega), t^O(\omega), X) - \big( r(\omega) e^{-\rho(t^S(\omega) - t^O(\omega))} + v(D(\omega), t^D(\omega), X) e^{-\rho(t^D(\omega) - t^O(\omega))} \big) \Big)^2 \Big].$$

In some embodiments, the provider dispatch control system 106 assigns a unique value to each pair (i,t) when the parameters X are equal to $(V_{i,t})_{i,t}$.

In some embodiments, the provider dispatch control system 106 utilizes discretized locations and times to generate a multi-outcome transportation-value metric approximation function. For example, the provider dispatch control system 106 can discretize the time and location parameters and can impose a uniform value over this discretization when generating the multi-outcome transportation-value metric approximation function. As an example, the provider dispatch control system 106 can utilize geo-hashes for locations (e.g., use regions corresponding to specific locations instead of the specific locations). Additionally, the provider dispatch control system 106 can discretize time at a variety of time levels (e.g., hour level, half-hour level). Subsequently, the provider dispatch control system 106 can utilize geo-hashes and time (gh, h) at an hour level (e.g., $\lfloor t \rfloor$) to generate a multi-outcome transportation-value metric approximation function.

In one or more embodiments, the provider dispatch control system 106 can create a simplified state space for the discretized locations and times from the state space of the historical outcomes and historical rewards. For instance, the provider dispatch control system 106 can include one or more locations corresponding to the historical outcomes and historical rewards as part of a geo-hash (e.g., gh(i)). Specifically, the provider dispatch control system 106 can identify a geo-hash that includes multiple locations and includes historical outcomes and historical rewards for those locations within the geo-hash. Furthermore, the provider dispatch control system 106 can identify times from historical outcomes and historical rewards and associates them to an hour (e.g., when discretized to an hour level) by utilizing a floor or ceiling of the times (e.g., $\lfloor t \rfloor$). By doing so, the provider dispatch control system 106 can simplify the state space of historical outcomes and historical rewards to a state space of historical outcomes and historical rewards corresponding to geo-hashes (e.g., regions) and hours of time (e.g., time levels).

Then, the provider dispatch control system 106 can assign a multi-outcome transportation value to a set of the simplified states (e.g., indexed by a variety of geo-hashes and a variety of hours (gh, h)) as a multi-outcome transportation value approximation function. Additionally, the provider dispatch control system 106 can determine one or more estimated multi-outcome transportation-values by using the recursive (e.g., dynamic programming) approach described above with the simplified state transitions and rewards from the historical outcomes and historical rewards. Indeed, the provider dispatch control system 106 can select or adjust parameters of the approximation function to minimize the residual (e.g., error) between the multi-outcome transportation value output by the approximation function and the estimated multi-outcome transportation-value metric from the historical outcomes and historical rewards in the simplified state space to improve the accuracy of the approximation function (e.g., using a least squares problem as described above). By doing so, the provider dispatch control system 106 can generate an approximation function for multi-outcome transportation-value metrics corresponding to geo-hashes and hour-based times.

As an example, the provider dispatch control system 106 can utilize a simplified state space with pairs (gh, h) of geo-hash and hour. In addition, the provider dispatch control system 106 can map locations and times from an original state space to the simplified state space using $\lfloor t \rfloor$ to represent an hour portion of time t and gh(i) as the geo-hash that includes the location i. Then, the provider dispatch control system 106 can utilize $X=(\overline{V}_{g,h})_{g,h}$ (e.g., for a set of parameters X) to assign a unique value to each hour and geo-hash. Furthermore, the provider dispatch control system 106 can generate an approximation function v that determines a multi-outcome transportation-value metric corresponding to geo-hashes and hour-based times (e.g., $v(i,t,X)=\overline{V}_{gh(i),\lfloor t \rfloor}$).

Moreover, the provider dispatch control system 106 can improve the accuracy of a multi-outcome transportation-value metric approximation function $v(i,t,X)=\overline{V}_{gh(i),\lfloor t \rfloor}$ by estimating a set of parameters X using the following equation:

$$\min_{[V]} \mathbb{E}_\omega \left[ \left( \overline{V}_{gh(O(\omega)),\lfloor t^O(\omega) \rfloor} - \left( r(\omega)e^{-\rho(t^S(\omega)-t^O(\omega))} + \overline{V}_{gh(D(\omega)),\lfloor t^D(\omega) \rfloor} e^{-\rho(t^D(\omega)-t^O(\omega))} \right) \right)^2 \right].$$

In some embodiments, the provider dispatch control system 106 can generate an approximation function for multi-outcome transportation-value metrics utilizing a fixed number of historical outcomes. For example, the provider dispatch control system 106 can generate an approximation function for multi-outcome transportation-value metrics utilizing a fixed number (N) of historical outcomes ($\omega_1, \ldots, \omega_N$) using the following equation:

$$\min_X \sum_{k=1}^{N} \left[ \left( v(O(\omega_k), t^O(\omega_k), X) - \left( r(\omega_k)e^{-\rho(t^S(\omega_k)-t^O(\omega_k))} + v(D(\omega_k), t^D(\omega_k), X)e^{-\rho(t^D(\omega_k)-t^O(\omega))} \right) \right)^2 \right].$$

Furthermore, in one or more embodiments, the provider dispatch control system 106 can limit spatial discontinuities in an approximation function for multi-outcome transportation-value metrics. For instance, the provider dispatch control system 106 can utilize a different resolution (e.g., higher resolution) geo-hash (e.g., a geo-hash that includes a greater or lesser locations in a set of locations). Furthermore, the provider dispatch control system 106 can utilize spatial regularization to improve statistical soundness of an approximation function for multi-outcome transportation-value metrics. In addition, for time-based discontinuities in an approximation function, the provider dispatch control system 106 can utilize piecewise linear value approximations for the multi-outcome transportation-value metrics.

As just mentioned, the provider dispatch control system 106 can utilize regularization to improve statistical soundness of an approximation function for multi-outcome transportation-value metrics. For instance, the provider dispatch control system 106 can utilize a smoothing prior (e.g., add a regularization term) to generate (or while generating) an approximation function for multi-outcome transportation-value metrics. For example, the provider dispatch control system 106 can utilize a smoothing prior (or regularization term) to cause location values to be closer to neighboring location values. In addition, the provider dispatch control system 106 can also utilize a smoothing prior (or regularization term) to cause multi-outcome transportation values to be closer to other multi-outcome transportation values at similar locations in previous and next time values (e.g., hour values) or to the same time values on other days (e.g., next or previous days). In some embodiments, the provider dispatch control system 106 utilizes a smoothing prior (or regularization term) to cause multi-outcome transportation values to be closer to broader historical estimations based on other time ranges (e.g., the average over a prior year with more historical data when estimating multi-outcome transportation values from a previous week).

Moreover, the provider dispatch control system 106 can utilize regularization parameters (e.g., a smoothing prior) to cross-validate estimations of multi-outcome transportation-value metrics corresponding to locations. For instance, in some embodiments, the provider dispatch control system 106 can utilize regularization parameters to penalize over-estimations of multi-outcome transportation-value metrics in order to reduce overestimation. In some embodiments, the provider dispatch control system 106 can utilize regularization parameters to achieve multi-outcome transportation-value metric estimations that are within a threshold percentile (e.g., a $25^{th}$ percentile).

In one or more embodiments, the provider dispatch control system 106 utilizes a time smoothing value to introduce regularization between multi-outcome transportation-value metrics corresponding to a location at different times. For instance, the provider dispatch control system 106 can utilize a time smoothing value to penalize a summation of squared residuals between multi-outcome transportation-value metrics at different time values. As an example, the provider dispatch control system 106 can penalize the squared difference between a multi-outcome transportation-value metric at a time and a multi-outcome transportation-value metric at an incremental time from the time (e.g., the next hour) by applying the time smoothing value (e.g., multiplying by a fractional value). For example, the provider dispatch control system 106 can penalize the squared difference between a multi-outcome transportation-value metric at a time and a multi-outcome transportation-value metric at an incremental time from the time (e.g., the next hour) by applying a time smoothing value (e.g., $\lambda_T = 0.1$) in the following equation:

$$\lambda_T \Sigma_{i,t} \|V_{i,t+1} - V_{i,t}\|^2.$$

In some embodiments, the provider dispatch control system 106 can utilize a smoothing prior (or regularization term) to cause multi-outcome transportation values corresponding to a location to be closer to other multi-outcome transportation values corresponding to neighboring locations. For example, the provider dispatch control system 106 can determine a spatial smoothing value to estimate multi-outcome transportation values for a location with less available (or unavailable) data to be based on neighboring locations. For instance, the provider dispatch control system 106 utilizes a spatial smoothing value with a least square error between the residual of the multi-outcome transportation-value metric corresponding to the location and multi-outcome transportation-value metrics corresponding to the neighboring locations. In particular, the provider dispatch control system 106 can utilize a spatial smoothing value (e.g., $\lambda_S = 4$) with a least square error between the residual of the multi-outcome transportation-value metric corresponding to the location and multi-outcome transportation-value metrics corresponding to the neighboring locations in the following equation:

$$\lambda_S \sum_{i,t} \left\| V_{i,t} - \frac{1}{|N(i)|} \sum_{j \in N(i)} V_{j,t} \right\|^2.$$

Furthermore, the provider dispatch control system 106 can also utilize piecewise linear value approximations to generate an approximation function for multi-outcome transportation-value metrics. In particular, the provider dispatch control system 106 can utilize an approximation function for multi-outcome transportation-value metrics that utilizes an interpolation of the time between the enclosing time ranges (e.g., between two enclosing hours). As an example, the provider dispatch control system 106 can determine a (discounted) multi-outcome transportation value based on the interpolation of the time between the enclosing time ranges (e.g., the output of the approximation function).

The provider dispatch control system 106 can also determine a (discounted) multi-outcome transportation value based on the interpolation of the time at a successive location between the enclosing time ranges in combination with the (discounted) reward at the initial location (e.g., the estimated multi-outcome transportation value from historical outcomes and historical rewards). Then, for example, the provider dispatch control system 106 can generate an approximation function for the multi-outcome transportation-value metrics that minimizes the residual between the interpolation-based output of the approximation function and the interpolation-based estimated multi-outcome transportation value from historical outcomes and historical rewards (e.g., using an error minimizing approach as described above).

As an example, the provider dispatch control system 106 can determine a parameter $X=(\overline{V}_{i,h})$ (as described above) with an approximation function for the multi-outcome transportation-value metric using the following equation:

$$v(i,t,X) = (\lceil t \rceil - t)\overline{V}_{gh(i),\lfloor t \rfloor} + (t - \lfloor t \rfloor)\overline{V}_{gh(i),\lceil t \rceil}.$$

In other words, the provider dispatch control system 106 utilizes an approximation function v that corresponds to the interpolation of the time between two enclosing hours. Indeed, the provider dispatch control system 106 can improve the accuracy of the multi-outcome transportation-value metric approximation function $v(i,t,X) = \overline{V}_{gh(i),\lfloor t \rfloor}$ (that utilizes interpolation based outputs) by estimating a set of parameters X using the following equation:

$$\min_{\overline{V}} \mathbb{E}_\omega \Big[ \big( a(\omega)\overline{V}_{gh(O(\omega)),\lfloor t^O(\omega) \rfloor} + b(\omega)\overline{V}_{gh(O(\omega)),\lceil t^O(\omega) \rceil} - c(\omega)\overline{V}_{gh(D(\omega)),\lfloor t^D(\omega) \rfloor} - d(\omega)\overline{V}_{gh(D(\omega)),\lceil t^D(\omega) \rceil} - e(\omega) \big)^2 \Big] \text{ with:}$$

$$\begin{cases} a(\omega) = \lceil t^O(\omega) \rceil - t^O(\omega) \\ b(\omega) = t^O(\omega) - \lfloor t^O(\omega) \rfloor \\ c(\omega) = e^{-\rho(t^D(\omega) - t^O(\omega))}(\lceil t^D(\omega) \rceil - t^D(\omega)) \\ d(\omega) = e^{-\rho(t^D(\omega) - t^O(\omega))}(t^D(\omega) - \lfloor t^O(\omega) \rfloor) \\ e(\omega) = e^{-\rho(t^S(\omega) - t^O(\omega))}r(\omega) \end{cases}$$

In one or more embodiments, the provider dispatch control system 106 can utilize the prediction model to determine multi-outcome transportation-value metrics (or discounted multi-outcome transportation-value metrics) in real time. For example, the provider dispatch control system 106 can utilize newly obtained historical outcome and historical reward data (e.g., in real time) to update a multi-outcome transportation-value metrics approximation function in real time. Furthermore, the provider dispatch control system 106 can utilize the multi-outcome transportation-value metric approximation function (as described) to determine multi-outcome transportation-value metrics (or discounted multi-outcome transportation-value metrics) in real time. In particular, by using the recursive approximation function described above, the provider dispatch control system 106 can determine multi-outcome transportation-value metrics for a large number of locations within a large area quickly and efficiently (e.g., within minutes).

Furthermore, in one or more embodiments, the provider dispatch control system 106 can utilize a prediction model that uses a variety of other approaches to estimate multi-outcome transportation-value metrics corresponding to locations. For example, in some embodiments, the provider dispatch control system 106 can utilize an alternate machine learning model (e.g., a neural network based model) to analyze historical outcomes and historical rewards corresponding to locations. In addition, the provider dispatch control system 106 can train a machine learning model to estimate multi-outcome transportation-value metrics corresponding to locations at particular times using the historical outcome and historical reward data. By doing so, the provider dispatch control system 106 can utilize a machine learning model (e.g., the prediction model) to estimate or determine a multi-outcome transportation-value metric corresponding to a destination location based on a location and time of a provider device.

For example, in order to train a machine learning model to estimate multi-outcome transportation-value metrics, the provider dispatch control system 106 can generate training data (e.g., ground truth data) from various locations at various times using the historical outcome and historical reward data. In particular, the provider dispatch control system 106 can sample historical outcomes and historical rewards for sets of locations and times corresponding to a number of historical provider device events. Furthermore, the provider dispatch control system 106 can determine ground truth multi-outcome transportation-value metrics for the locations and times using the sampled historical outcomes and historical rewards (e.g., via averages or other statistical approaches). Then, the provider dispatch control system 106 can train a machine learning model that predicts multi-outcome transportation-value metrics by comparing the predicted multi-outcome transportation-value metrics to the ground truth multi-outcome transportation-value metrics (e.g., via a loss function and/or backpropagation).

Although one or more embodiments described above refer to the provider dispatch control system 106 utilizing location and time to determine (discounted) multi-outcome transportation-value metrics, as mentioned above, the provider dispatch control system 106 can also utilize one or more additional (or alternate) factors to determine multi-outcome transportation-value metrics corresponding to locations. In particular, the provider dispatch control system 106 can train or condition the prediction model (e.g., to generate an approximation function) that accounts for additional factors to estimate a multi-outcome transportation-value metric. For instance, the provider dispatch control system 106 can utilize factors such as a time and location where a provider device enters a P1 state, the number of provider devices available at the time and location, and/or performance metrics (as described below) of the provider device.

In some embodiments, the provider dispatch control system 106 can utilize factors such as the length of time a provider device will be actively fulfilling transportation requests (e.g., a provider device shift). Furthermore, the provider dispatch control system 106 can also utilize factors such as a probability of conversion (e.g., the probability of transportation requests actually resulting in a fulfilled request) and/or a probability of cancellations (e.g., the probability of transportation requests that are cancelled prior to fulfillment).

As an example, a provider device associated with an experienced provider may correspond to a different outcome or sequence of outcomes compared to a provider device associated with an inexperienced provider. Accordingly, the provider dispatch control system 106 can generate an approximation function that estimates multi-outcome transportation-value metrics for the provider devices based on different levels of experience.

As mentioned above, in addition to experience, the provider dispatch control system 106 can utilize a variety of attributes such as, but not limited to, vehicle type, vehicle age, and/or ride type to determine a specific transportation-value metric approximation function corresponding to the specific contextual attributes.

Figure 5:
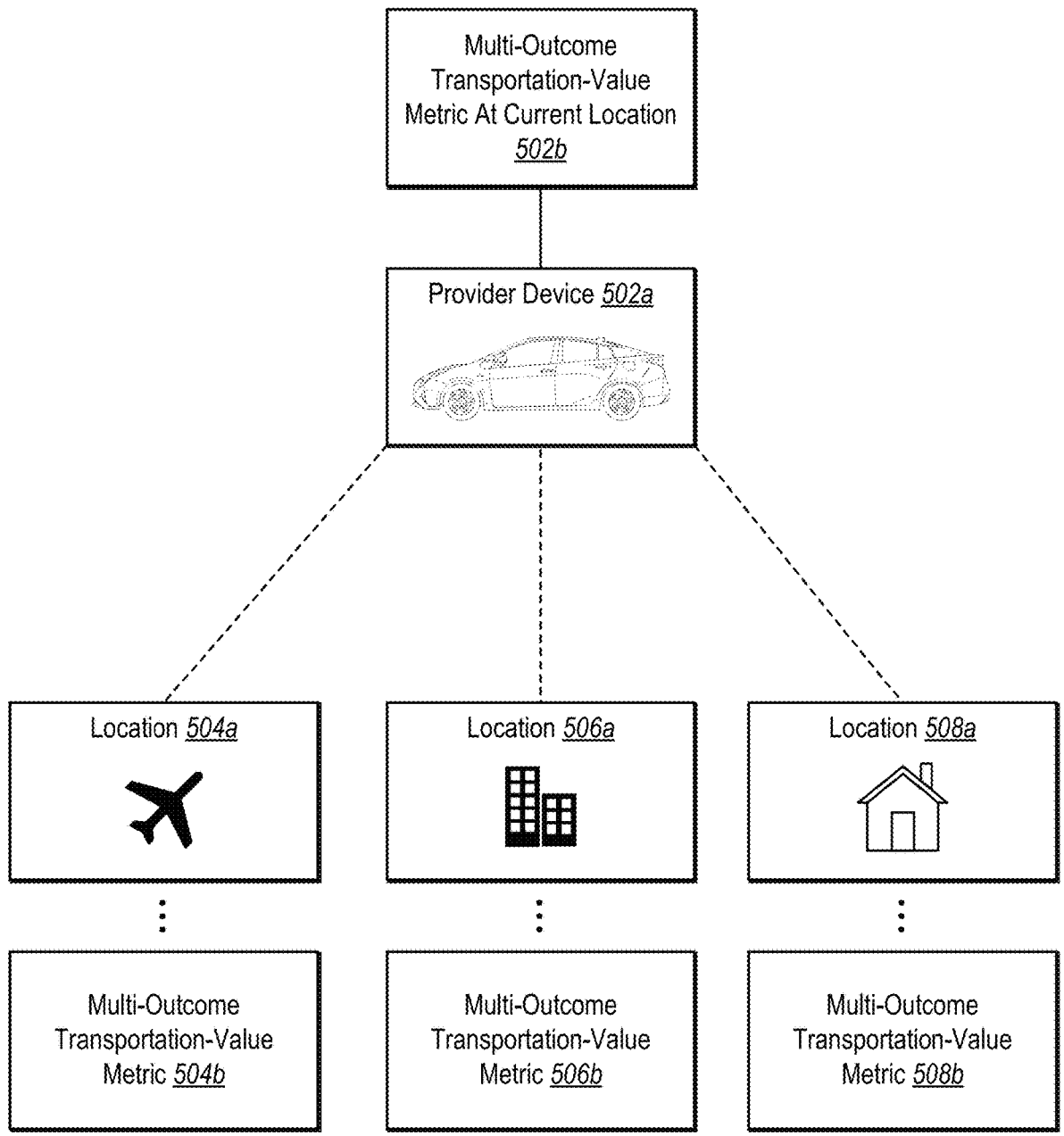
FIG. 5 illustrates a diagram of the provider dispatch control system dispatching a provider device by relocation based on a multi-outcome transportation-value metric in accordance with one or more embodiments.

As mentioned above, the provider dispatch control system 106 can utilize (discounted) multi-outcome transportation-value metrics to relocate provider devices (e.g., efficiently dispatch a provider device fleet). For example, FIG. 5 illustrates the provider dispatch control system 106 utilizing (discounted) multi-outcome transportation-value metrics to dispatch a provider device by relocating the provider device based on the multi-outcome transportation-value metrics. As shown in FIG. 5, the provider dispatch control system 106 determines a multi-outcome transportation-value metric at a current location 502b for a provider device 502a. In addition, as shown in FIG. 5, the provider dispatch control system 106 also determines a multi-outcome transportation-value metric 504b corresponding to a first location 504a, a multi-outcome transportation-value metric 506b corresponding to second location 506a, and a multi-outcome transportation-value metric 508b corresponding to a third location 508a. Then, the provider dispatch control system 106 can compare the multi-outcome transportation-value metrics at the various locations to determine a dispatch strategy for the provider device 502a. For example, the provider dispatch control system 106 can relocate the provider device 502a to the first location 504a upon determining that the multi-outcome transportation-value metric 504b is greater than the other multi-outcome transportation-value metrics. Furthermore, in reference to FIG. 5, the multi-outcome transportation-value metrics 504b, 506b, and 508b can be discounted by a transportation time to the respective locations by the provider dispatch control system 106.

As illustrated in FIG. 5, in one or more embodiments, the provider dispatch control system 106 can determine a multi-outcome transportation-value metric for a provider device at or near a current location of the provider device. Indeed, the determined multi-outcome transportation-value metric corresponding to the current location of the provider device can be utilized by the provider dispatch control system 106 to represent a value of keeping the provider device at the current location.

As further illustrated in FIG. 5, for one or more candidate locations, the provider dispatch control system 106 can determine multi-outcome transportation-value metrics corresponding to the candidate locations. For example, the provider dispatch control system 106 can determine a total value for a candidate location (e.g., destination location) that includes the expected reward for travelling to the candidate location and a multi-outcome transportation value of being at the candidate location. Indeed, the provider dispatch control system 106 can utilize the total value corresponding to the candidate location as the multi-outcome transportation-value metric for the candidate location when there is no expected reward for travel to the candidate location (e.g., a lack of a P2 or P3 state during the relocation).

Furthermore, in one or more embodiments, the provider dispatch control system 106 can generate a discounted multi-outcome transportation-value metric corresponding to the candidate location. For example, the provider dispatch control system 106 can discount the multi-outcome transportation value corresponding to the candidate location by applying the transportation time (of the provider device) to the candidate location. Indeed, the provider dispatch control system 106 can determine (or generate) multi-outcome transportation-value metrics and/or discounted multi-outcome transportation-value metrics for one or more candidate locations in accordance with one or more embodiments herein.

As an example, in reference to FIG. 5, the provider dispatch control system 106 can determine a multi-outcome transportation-value metric of forty dollars for the multi-outcome transportation-value metric at the current location 502b (e.g., $V_{current,1\ PM}=40$). Furthermore, the provider dispatch control system 106 can determine a multi-outcome transportation-value metric of seventy dollars for the multi-outcome transportation-value metric 506b corresponding to the second location 506a after time of travel from the current location ($V_{B,1:30\ PM}=70$). Moreover, the provider dispatch control system 106 can identify that transportation time to the second location 506a for the provider device 502a will take thirty minutes. The provider dispatch control system 106 can determine a discounting rate based on the transportation time (e.g., $e^{-\rho(30\ minutes)}=0.7$ when $\rho=\ln(2)$) and apply the discounted rate to the multi-outcome transportation-value metric 506b (e.g., 70 dollars times 0.7) to generate the discounted multi-outcome transportation-value metric of forty-nine dollars at the second location 506a.

For instance, the provider dispatch control system 106 can determine that a $r(\omega_1)=0$ (e.g., reward for traveling to the second location 506a) and that $t^D(\omega_1)-t^O(\omega_1)=30$ minutes (e.g., the transportation time to the second location 506a). Then, the provider dispatch control system 106 can determine a (discounted) multi-outcome transportation-value metric corresponding to the second location 506a using the following equation:

$$V_{i,t} = \mathbb{E}_{\omega_1}\left[r(\omega_1)e^{-\rho(t^S(\omega_1)-t^O(\omega_1))} + V_{D(\omega_1),t^D(\omega_1)}e^{-\rho(t^D(\omega_1)-t^O(\omega_1))} \,\middle|\, t^O(\omega_1) = t, O(\omega_1) = i\right].$$

Indeed, the provider dispatch control system 106 can generate a discounted multi-outcome transportation-value metric corresponding to the second location as $V_{i,t}=V_{B,1:30\ PM}*(0.7)=49$ because $r(\omega_1)=0$. In one or more embodiments, the provider dispatch control system 106 relocates the provider device 502a if the discounted multi-outcome transportation-value metric at the second location 506a is the highest value (e.g., $V_{i,t}>V_{current,1\ PM}$).

Indeed, the provider dispatch control system 106 can determine multi-outcome transportation-value metrics corresponding to each candidate location for a provider device as described above. Then, the provider dispatch control system 106 can identify which multi-outcome transportation-value metric has the highest value from the multi-outcome transportation-value metrics. Moreover, the provider dispatch control system 106 can relocate the provider device to the location that corresponds to the highest multi-outcome transportation-value metric. By doing so, the provider dispatch control system 106 can optimize the efficiency of the provider device.

Furthermore, in one or more embodiments, the provider dispatch control system 106 determines that the multi-outcome transportation-value metric at a current location of a provider device is greater than other multi-outcome transportation-value metrics at candidate locations. In such a case, the provider dispatch control system 106 can take no action and let the provider device remain at the current location. In other words, the provider dispatch control system 106 can determine not to relocate a provider device when the current location has the highest multi-outcome transportation-value metric.

In addition, the provider dispatch control system 106 can determine multi-outcome transportation-value metrics corresponding to one or more candidate locations for multiple provider devices. Indeed, the provider dispatch control system 106 can determine multi-outcome transportation-value metrics for a variety of provider devices at one or more locations to dispatch the variety of provider devices. Indeed, the provider dispatch control system 106 can relocate multiple provider devices to locations corresponding to their optimal multi-outcome transportation-value metric. By relocating an entire set of provider devices based on their respective multi-outcome transportation-value metrics at one or more locations, the provider dispatch control system 106 can optimize the expected reward or earnings of the dynamic transportation matching system 104.

As mentioned above, the provider dispatch control system 106 can also utilize (discounted) multi-outcome transportation-value metrics to dispatch a provider device by selecting the provider device for a transportation request. Specifically, in some embodiments, the provider dispatch control system 106 determines whether to select a provider device for a transportation request based on the multi-outcome transportation-value metric corresponding to the destination location associated with the transportation request. For example, FIG. 6 illustrates the provider dispatch control system 106 utilizing (discounted) multi-outcome transportation-value metrics to dispatch a provider device by selecting the provider device for a transportation request.

Figure 6:
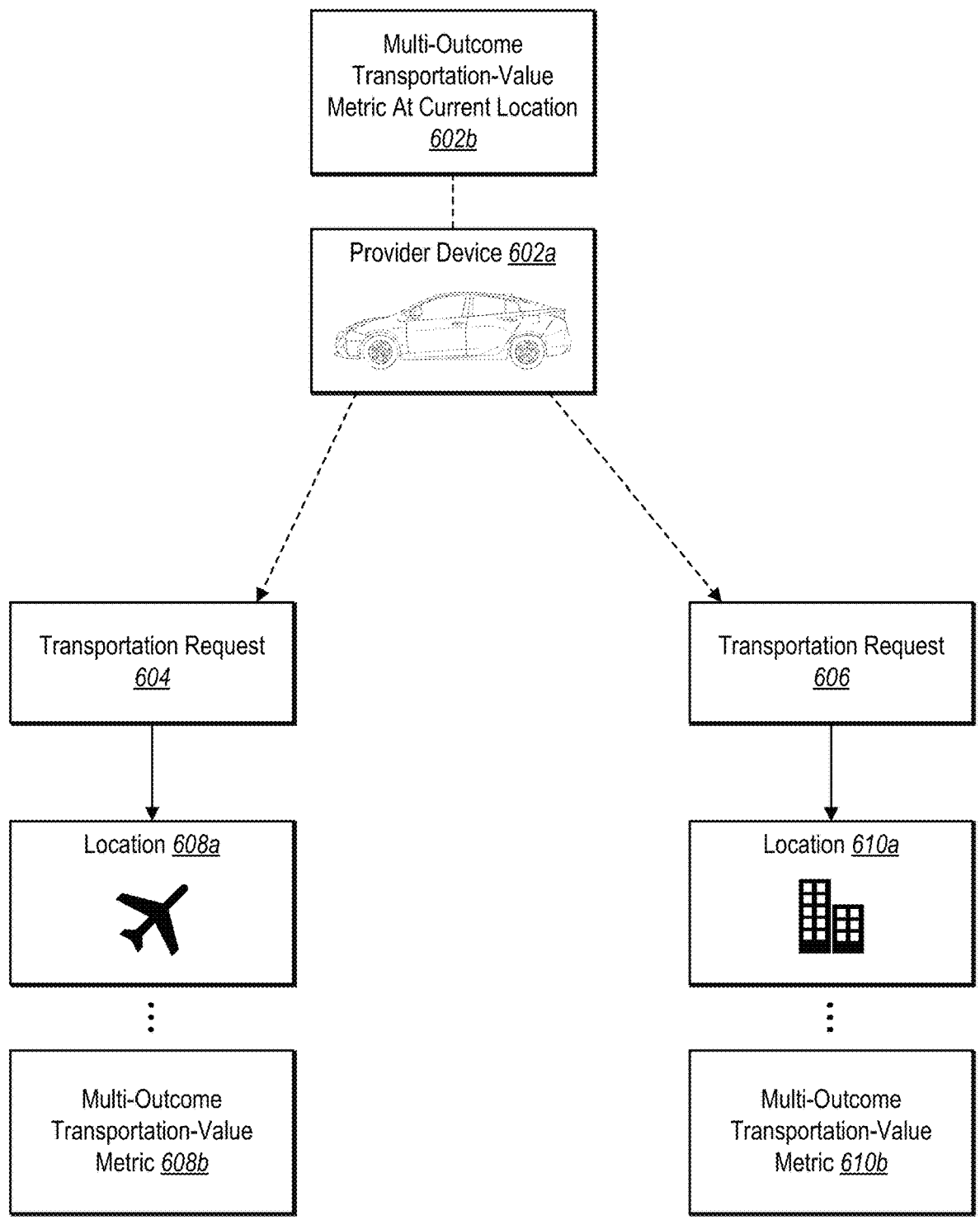
FIG. 6 illustrates a diagram of the provider dispatch control system dispatching a provider device by assigning a transportation request based on a multi-outcome transportation-value metric in accordance with one or more embodiments.

In particular, as shown in FIG. 6, the provider dispatch control system 106 identifies a first transportation request 604 and a second transportation request 606 for a provider device 602a. Moreover, as illustrated in FIG. 6, the provider dispatch control system 106 identifies that the first transportation request 604 corresponds to a first location 608a (i.e., a destination location) and determines a first (discounted) multi-outcome transportation-value metric 608b corresponding to the first location 608a. Likewise, as shown in FIG. 6, the provider dispatch control system 106 identifies that a second transportation request 606 corresponds to a second location 610a and determines a second (discounted) multi-outcome transportation-value metric 610b corresponding to the second location 610a.

Furthermore, as shown in FIG. 6, the provider dispatch control system 106 determines a multi-outcome transportation-value metric at a current location 602b for the provider device 602a. Indeed, in some embodiments, the provider dispatch control system 106 compares the first multi-outcome transportation-value metric 608b and the second multi-outcome transportation-value metric 610b to select a transportation request for the provider device 602a. Indeed, in one or more embodiments, the provider dispatch control system 106 can select the transportation request that is associated with the greatest multi-outcome transportation-value metric. For example, in reference to FIG. 6, if the first multi-outcome transportation-value metric 608b is greater than the second multi-outcome transportation-value metric 610b, the provider dispatch control system 106 can select the first transportation request 604 for the provider device 602a.

To provide additional detail, in reference to FIG. 6, the provider dispatch control system 106 can determine a reward for fulfilling the first transportation request 604 (e.g., $r(\omega_A)$). Then, the provider dispatch control system 106 can determine a multi-outcome transportation value corresponding to the destination location of the first transportation request (e.g., $V_{destination, t^D_{(\omega_A)}}$). Furthermore, the provider dispatch control system 106 can determine the first multi-outcome transportation-value metric 608b for the first transportation request 604 by combining the reward and the (discounted) multi-outcome transportation value corresponding to the destination location, as shown in the following equation:

$$\text{SCORE(transportation request } A) = r(\omega_A) + e^{-\rho(t^D(\omega_A) - t_0)} * V_{destination, t^D_{(\omega_A)}}.$$

Furthermore, the provider dispatch control system 106 can determine multi-outcome transportation-value metrics corresponding to each transportation request. Subsequently, the provider dispatch control system 106 can identify and select the transportation request for the provider device that has the highest multi-outcome transportation-value metric (e.g., the highest total value). In this manner, the provider dispatch control system 106 can optimize the efficiency and value of the provider device when matching transportation requests. Indeed, the provider dispatch control system 106 can utilize the multi-outcome transportation-value metrics determined for transportation requests to consider the sequence of future rides for a provider device instead of solely the transportation requests.

Additionally, the provider dispatch control system 106 can determine that the multi-outcome transportation-value metric at a current location of a provider device is greater than other multi-outcome transportation-value metrics corresponding to the transportation requests. As a result, the provider dispatch control system 106 can take no action and forgo assigning the transportation request to the provider device. In other words, the provider dispatch control system 106 can determine not to select a transportation request for a provider device when the current location has the highest multi-outcome transportation-value metric to optimize the utilization and efficiency of the provider device.

Furthermore, the provider dispatch control system 106 can determine (discounted) multi-outcome transportation-value metrics for multiple provider devices in relation to one or more transportation requests. In particular, the provider dispatch control system 106 can determine a separate (discounted) multi-outcome transportation-value metric for each provider device that is available for a transportation request. Specifically, the provider dispatch control system 106 determines a multi-outcome transportation-value metric for the destination location associated with the transportation request in relation to each provider device. Indeed, as described above, the provider dispatch control system 106 can determine multi-outcome transportation-value metrics that may differ due to location and time of each provider device, attributes associated with the provider devices, and/or performance metrics associated with each provider device. Then, the provider dispatch control system 106 selects a provider device for the transportation request by utilizing the corresponding multi-outcome transportation-value metrics.

Figure 7:
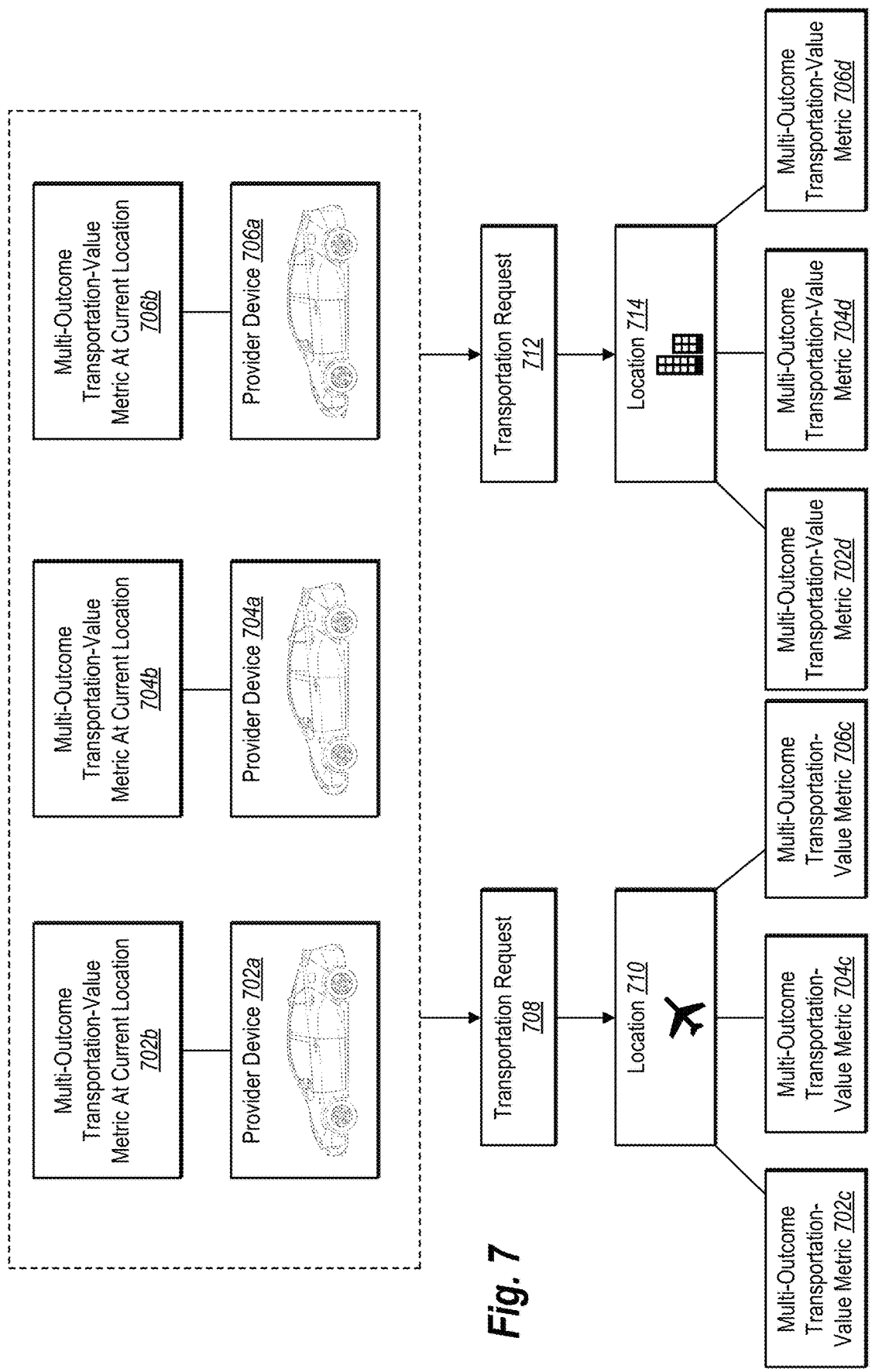
FIG. 7 illustrates a diagram of the provider dispatch control system dispatching multiple provider devices based on multiple multi-outcome transportation-value metrics in accordance with one or more embodiments.

For example, FIG. 7 illustrates the provider dispatch control system 106 determining (discounted) multi-outcome transportation-value metrics for multiple provider devices in relation to multiple transportation requests in accordance with one or more embodiments. As shown in FIG. 7, the provider dispatch control system 106 determines multi-outcome transportation-value metrics for each provider device (e.g., a multi-outcome transportation-value metric at current location 702b for the provider device 702a, a multi-outcome transportation-value metric at current location 704b for the provider device 704a, and a multi-outcome transportation-value metric at current location 706b for the provider device 706a). Furthermore, as illustrated in FIG. 7, the provider dispatch control system 106 identifies a first transportation request 708 and a second transportation request 712.

Furthermore, as shown in FIG. 7, the provider dispatch control system 106 determines a multi-outcome transportation-value metric corresponding to a first location 710 of the first transportation request 708 for each provider device. For example, the provider dispatch control system 106 determines a multi-outcome transportation-value metric 702c corresponding to the provider device 702a, a multi-outcome transportation-value metric 704c corresponding to the provider device 704a, and a multi-outcome transportation-value metric 706c corresponding to the provider device 706a for the first location 710. In addition, the provider dispatch control system 106 also determines a multi-outcome transportation-value metric corresponding to the second location 714 of the second transportation request 712 for each provider device. For instance, the provider dispatch control system 106 determines a multi-outcome transportation-value metric 702d corresponding to the provider device 702a, a multi-outcome transportation-value metric 704d corresponding to the provider device 704a, and a multi-outcome transportation-value metric 706d corresponding to the provider device 706a for the second location 714.

Subsequently, the provider dispatch control system 106 can select a provider device for a transportation request based on the specific multi-outcome transportation-value metrics for each provider device in relation to each transportation request. For example, the provider dispatch control system 106 can match a transportation request with a provider device that results in the highest possible multi-outcome transportation-value metric (across the transportation requests). Then, the provider dispatch control system 106 can select a second provider device that results in the highest multi-outcome transportation-value metric for the second transportation request. Indeed, the provider dispatch control system 106 can continuously determine matches between provider devices and transportation requests that result in the highest multi-outcome transportation-value metrics.

In one or more embodiments, upon dispatching provider devices by utilizing multi-outcome transportation-value metrics, the provider dispatch control system 106 iteratively utilizes outcomes and rewards of these dispatches as historical outcomes and historical rewards. In particular, the provider dispatch control system 106 utilizes the outcomes and rewards of these dispatches to further improve (or condition) the accuracy of a prediction model that estimates the multi-outcome transportation-value metrics. For example, the provider dispatch control system 106 can utilize the outcomes and rewards of these dispatches to further generate an increasingly accurate approximation function by minimizing the error between an estimated multi-outcome transportation value by the approximation function and estimated multi-outcome transportation values from historical outcomes and historical rewards that include the outcomes and rewards of the dispatches that utilize multi-outcome transportation-value metrics.

Furthermore, the provider dispatch control system 106 can utilize a multi-outcome transportation-value metric (determined for a location) for a variety of applications corresponding to a transportation request. For example, the provider dispatch control system 106 can utilize a multi-outcome transportation-value metric corresponding with a destination location of a transportation request to determine a value (e.g., price) for the transportation request. As an example, the provider dispatch control system 106 can increase the value of a transportation request (e.g., increase the pricing of the transportation request or introduce a surge price of the transportation request) when the transportation request corresponds to a low multi-outcome transportation-value metric (e.g., a destination location that is inefficient for a provider device). Likewise, the provider dispatch control system 106 can decrease (or maintain) the value (e.g., pricing) of a transportation request when the transportation request corresponds to a higher multi-outcome transportation-value metric.

As mentioned above, the provider dispatch control system 106 can also utilize (discounted) multi-outcome transportation-value metrics to dispatch provider devices by utilizing the multi-outcome transportation-value metrics as a prioritization metric when provider devices belong to a prioritized transportation dispatch mode. Indeed, as mentioned above, the provider dispatch control system 106 can designate two or more dispatch modes, such as a prioritized dispatch mode and a flexible dispatch mode. The prioritized dispatch mode can be associated with different privileges and a different compensation approach than the flexible dispatch mode. For instance, the prioritized dispatch mode can receive priority assignment to transportation requests, but a different compensation schedule (e.g., a flat hourly compensation rate or a lower per-transaction compensation relative to the flexible dispatch mode). The provider dispatch control system 106 can determine and utilize a multi-outcome transportation-value metric to optimize utilization for a provider device within a prioritized transportation dispatch mode.

Figure 8:
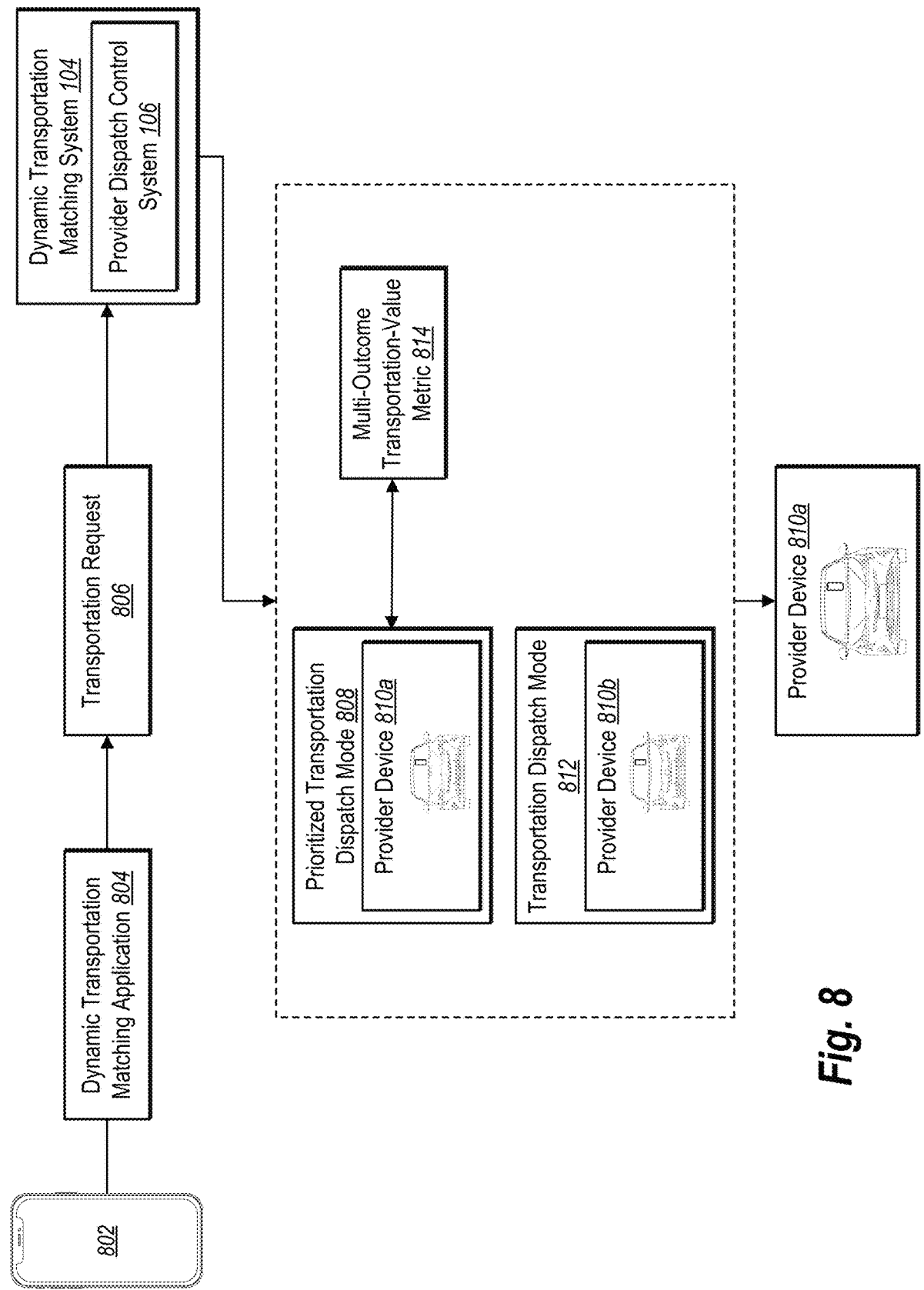
FIG. 8 illustrates a diagram the provider dispatch control system utilizing a multi-outcome transportation-value metric for a provider device in a prioritized transportation dispatch mode in accordance with one or more embodiments.

For example, FIG. 8 illustrates an overview of the provider dispatch control system 106 utilizing (or analyzing) a multi-outcome transportation-value metric as a prioritization metric when a provider device belongs to a prioritized transportation dispatch mode. As shown in FIG. 8, the provider dispatch control system 106 receives a transportation request 806 from a dynamic transportation matching application 804 of a requestor device 802. Furthermore, as illustrated in FIG. 8, the provider dispatch control system 106 determines that provider device 810a belongs to a prioritized transportation dispatch mode 808 and that a provider device 810b belongs to a transportation dispatch mode 812. As shown in FIG. 8, the provider dispatch control system 106, in response to determining that the provider device 810a belongs to the prioritized transportation dispatch mode 808, determines a multi-outcome transportation-value metric 814 corresponding to a destination location of the transportation request 806 for the provider device 810a. As further shown in FIG. 8, the provider dispatch control system 106 selects the provider device 810a for the transportation request 806 using the multi-outcome transportation-value metric 814 (over the provider device 810b that does not belong to the prioritized transportation dispatch mode 808).

For instance, in some embodiments, the provider dispatch control system 106 compares a multi-outcome transportation-value metric for a provider device to a baseline value to determine whether to select a provider device from a prioritized transportation dispatch mode. In addition, in one or more embodiments, the provider dispatch control system 106 utilizes a multi-outcome transportation-value metric to boost a transportation value corresponding to a transportation request for the provider device. Indeed, the provider dispatch control system 106 can utilize the comparison with a baseline value or the boosted transportation value to determine whether to select the provider device associated with the multi-outcome transportation-value metric from the prioritized transportation dispatch mode (e.g., to give the provider device priority over other provider devices that are not in the prioritized transportation dispatch mode). Additional detail regarding utilizing a multi-outcome transportation-value metric as a prioritization metric when a provider device belongs to a prioritized transportation dispatch mode is provided below (e.g., in relation to FIG. 13B).

As mentioned above, the provider dispatch control system 106 can select a provider device to fulfill a transportation request by selecting the provider device from between a prioritized transportation dispatch mode (that uses prioritization metrics) and another transportation dispatch mode. In one or more embodiments, the provider dispatch control system 106 can utilize selection scores corresponding to provider devices to determine a match between a provider device and a transportation request. For instance, FIG. 9 illustrates the provider dispatch control system 106 determining a separate set of selection scores for provider devices in different transportation dispatch modes and utilizing the selection scores to select a provider device.

Figure 9:
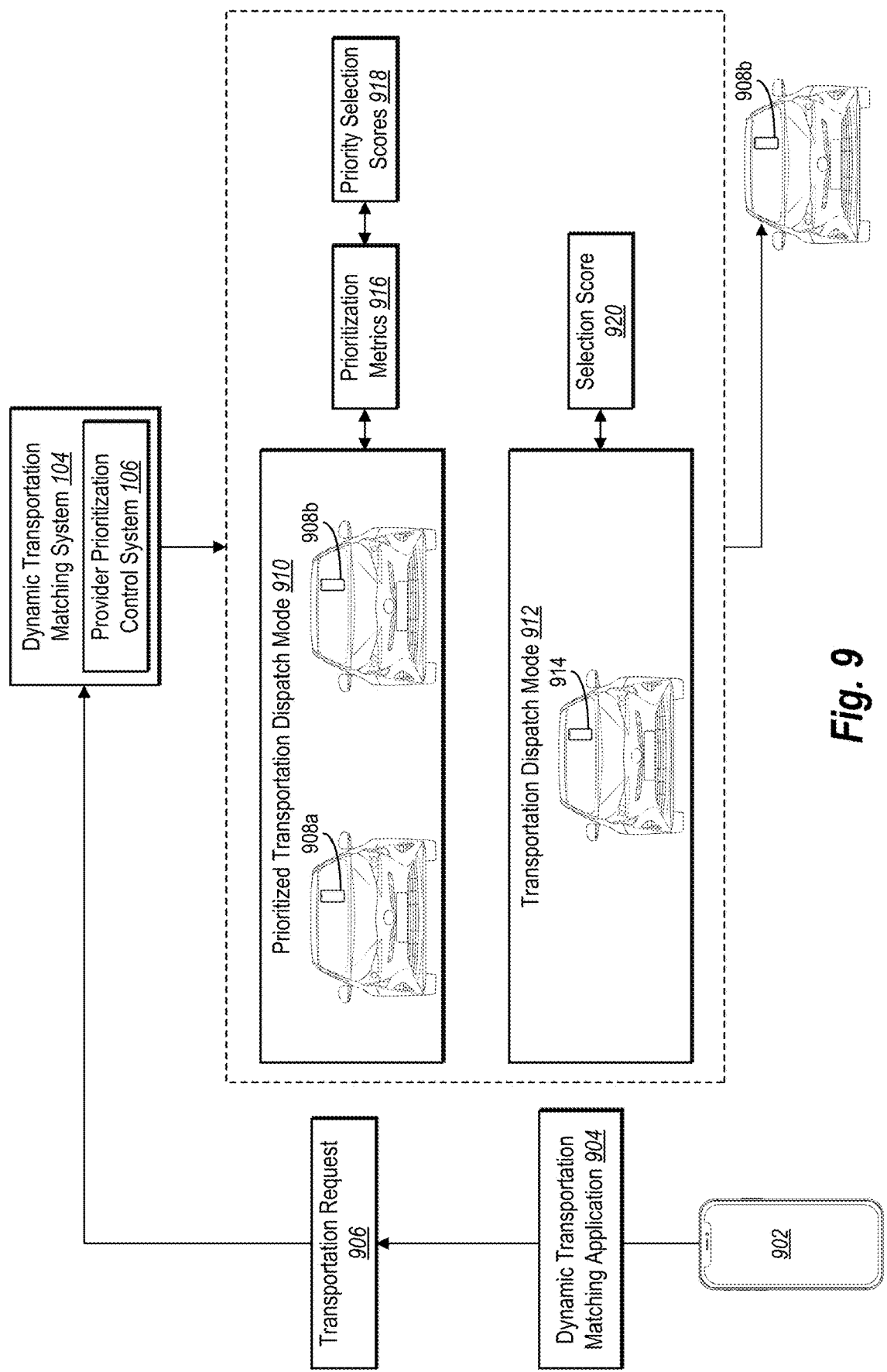
FIG. 9 illustrates a schematic diagram of the provider dispatch control system selecting between a prioritized transportation dispatch mode and an additional transportation dispatch mode for a transportation request in accordance with one or more embodiments.

As shown in FIG. 9, the provider dispatch control system 106 receives a transportation request 906 from a dynamic transportation matching application 904 of a requestor device 902. In addition, as shown in FIG. 9, the provider dispatch control system 106 determines that provider devices 908a and 908b belong to a prioritized transportation dispatch mode 910. Furthermore, as illustrated in FIG. 9, the provider dispatch control system 106 also determines that a provider device 914 belongs to a transportation dispatch mode 912 (e.g., a more flexible transportation dispatch mode).

As also illustrated in FIG. 9, in response to identifying a transportation request 906, the provider dispatch control system 106 determines priority selection scores 918 for the provider devices 908a and 908b in relation to the transportation request 906. Moreover, the provider dispatch control system 106 utilizes prioritization metrics 916 to determine the priority selection scores 918. Furthermore, the provider dispatch control system 106 determines a selection score 920 for the provider device 914. Accordingly, the provider dispatch control system 106 utilizes a different set of selection scores between the different transportation dispatch modes (e.g., priority selection scores 918 for the prioritized transportation dispatch mode 910 and selection score 920 for the transportation dispatch mode 912).

Additionally, as illustrated in FIG. 9, the provider dispatch control system 106 selects provider device 908b as the match for the transportation request 906 (e.g., to fulfill the transportation request 906). For example, the provider dispatch control system 106 can determine which provider device to select by comparing priority selection scores and/or selection scores associated with the provider devices. Indeed, in reference to FIG. 9, the provider dispatch control system 106 can determine that the priority selection score for provider device 908b is greater than the priority selection scores or selection scores associated with the other provider devices. In other words, the provider dispatch control system 106 analyzes the prioritization metrics 916 to select provider device 908b over the other provider devices based on the determined priority selection scores 918.

As an example, in one or more embodiments, the provider dispatch control system 106 determines priority selection scores for the provider devices belonging to the prioritized transportation dispatch mode in a different manner than the selection scores for provider devices belonging to the other transportation dispatch mode (e.g., a more flexible transportation dispatch mode). For example, the provider dispatch control system 106 can determine selection scores for provider devices belonging to the other transportation dispatch mode by using an immediate reward associated with the received transportation request. In contrast, the provider dispatch control system 106 can determine priority selection scores for provider devices belonging to the prioritized transportation dispatch mode by utilizing prioritization metrics based on various prioritized transportation dispatch mode algorithms.

For example, the provider dispatch control system 106 can determine prioritization metrics based on characteristics/features of the destination location corresponding to the transportation request (e.g., idle times, transportation requests, multi-outcome transportation-value metrics at the destination location). Indeed, the provider dispatch control system 106 can utilize such characteristics/features under a destination control transportation dispatch mode for the prioritized dispatch mode provider devices. For instance, the provider dispatch control system 106 can utilize priority selection scores that are based on such prioritization metrics for the prioritized transportation dispatch mode compared to the selection scores of the other transportation dispatch mode to select a provider device from between the dispatch modes.

In addition, the provider dispatch control system 106 can also utilize other approaches to prioritize the prioritized transportation dispatch mode provider devices. For example, the provider dispatch control system 106 can utilize a priority queue approach (e.g., a priority queueing transportation dispatch mode) in which prioritized dispatch mode provider devices are given direct priority over the other transportation dispatch mode when a prioritized provider device is available (e.g., by ensuring priority selection scores are consistently greater than selection scores). In addition, the provider dispatch control system 106 can restrict a location for a prioritized transportation dispatch mode provider device such that the provider device is not assigned a transportation request to the particular location (e.g., a location restriction transportation dispatch mode). For instance, the provider dispatch control system 106 can utilize prioritization metrics to nullify priority selection scores for a particular location (when the location is restricted for prioritized transportation dispatch mode provider devices).

Figure 10:
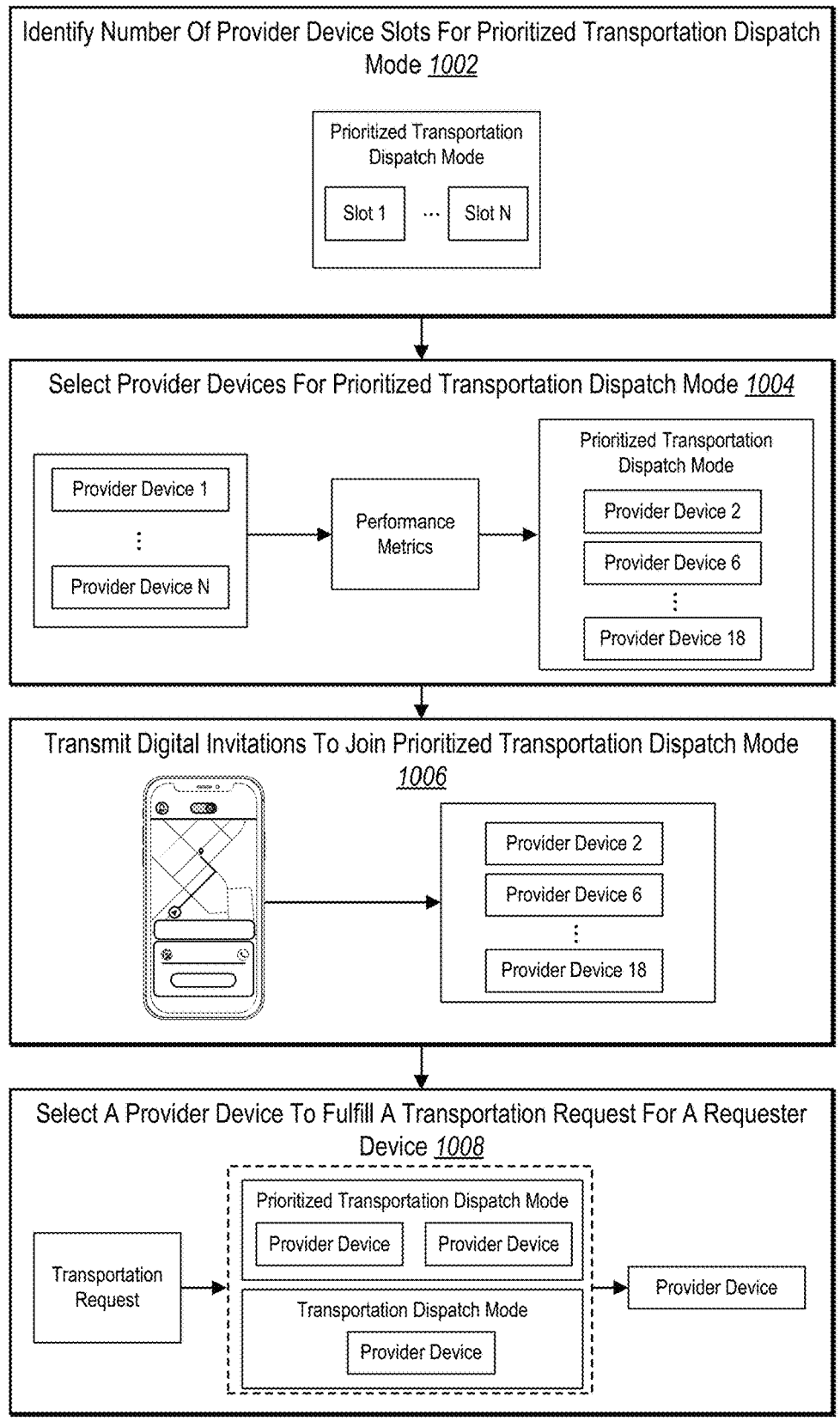
FIG. 10 illustrates an overview diagram of the provider dispatch control system selecting a provider device from a prioritized transportation dispatch mode to fulfill a transportation request in accordance with one or more embodiments.

Furthermore, FIG. 10 illustrates a flowchart of the provider dispatch control system 106 selecting a provider device from between a prioritized transportation dispatch mode and another transportation dispatch mode to fulfill a transportation request. In particular, FIG. 10 illustrates a flowchart of the provider dispatch control system 106 identifying a number of provider device slots for a prioritized transportation dispatch mode, selecting provider devices for the prioritized transportation dispatch mode, and transmitting digital invitations to the selected provider devices to join the prioritized transportation dispatch mode. In addition, the flowchart of FIG. 10 also illustrates the provider dispatch control system 106 selecting a provider device to fulfill a transportation request using a prioritized transportation dispatch mode.

For example, as shown in FIG. 10, the provider dispatch control system 106 identifies a number of provider device slots for a prioritized transportation dispatch mode in an act 1002. In particular, the provider dispatch control system 106 can analyze historical data to model a prioritized transportation dispatch mode algorithm to determine a identify of provider device slots (via a provider device slot selection model). For instance, the provider dispatch control system 106 can estimate transportation-mode value improvement metrics resulting from using various prioritized transportation dispatch mode algorithms (e.g., priority queueing, location restriction, destination control) with various fleet sizes (i.e., number of slots) with historical data. Then, the provider dispatch control system 106 can identify a number of slots (and a prioritized transportation dispatch mode algorithm) that results in a maximum (or greatest) transportation mode value improvement metric. Additional detail for identifying a number of provider device slots for a prioritized transportation dispatch mode is described below (e.g., in relation to FIGS. 11A-11E).

Furthermore, as illustrated in FIG. 10, the provider dispatch control system 106 selects provider devices for the prioritized transportation dispatch mode in an act 1004. As illustrated in FIG. 10, the provider dispatch control system 106 can utilize performance metrics corresponding to provider devices to select one or more provider devices for the prioritized transportation dispatch mode. Indeed, the provider dispatch control system 106 can select one or more provider devices to assign to the (threshold) number of slots determined for the prioritized transportation dispatch mode. Additional detail for selecting provider devices for a prioritized transportation dispatch mode is described below (e.g., in relation to FIG. 12).

Additionally, as shown in FIG. 10, the provider dispatch control system 106 transmits digital invitations to join a prioritized transportation dispatch mode in an act 1006. Indeed, the provider dispatch control system 106 transmits the digital invitations to selected provider devices to provide an option to join the prioritized transportation dispatch mode. Additional detail for transmitting digital invitations to join a prioritized transportation dispatch mode is described below (e.g., in relation to FIG. 12).

Moreover, as illustrated in FIG. 10, the provider dispatch control system 106 selects a provider device to fulfill a transportation request for a requestor device in an act 1008. As shown in FIG. 10, the provider dispatch control system 106 can select a provider device from between provider devices in a prioritized transportation dispatch mode and provider devices in another transportation dispatch mode. For example, as mentioned above, the provider dispatch control system 106 can analyze prioritization metrics corresponding to the provider devices in the prioritized transportation dispatch mode to select a provider device for the transportation request. Additional detail for selecting a provider device for a transportation request from between a prioritized transportation dispatch mode and another transportation dispatch mode is described below (e.g., in relation to FIGS. 13-15).

Figure 11A:
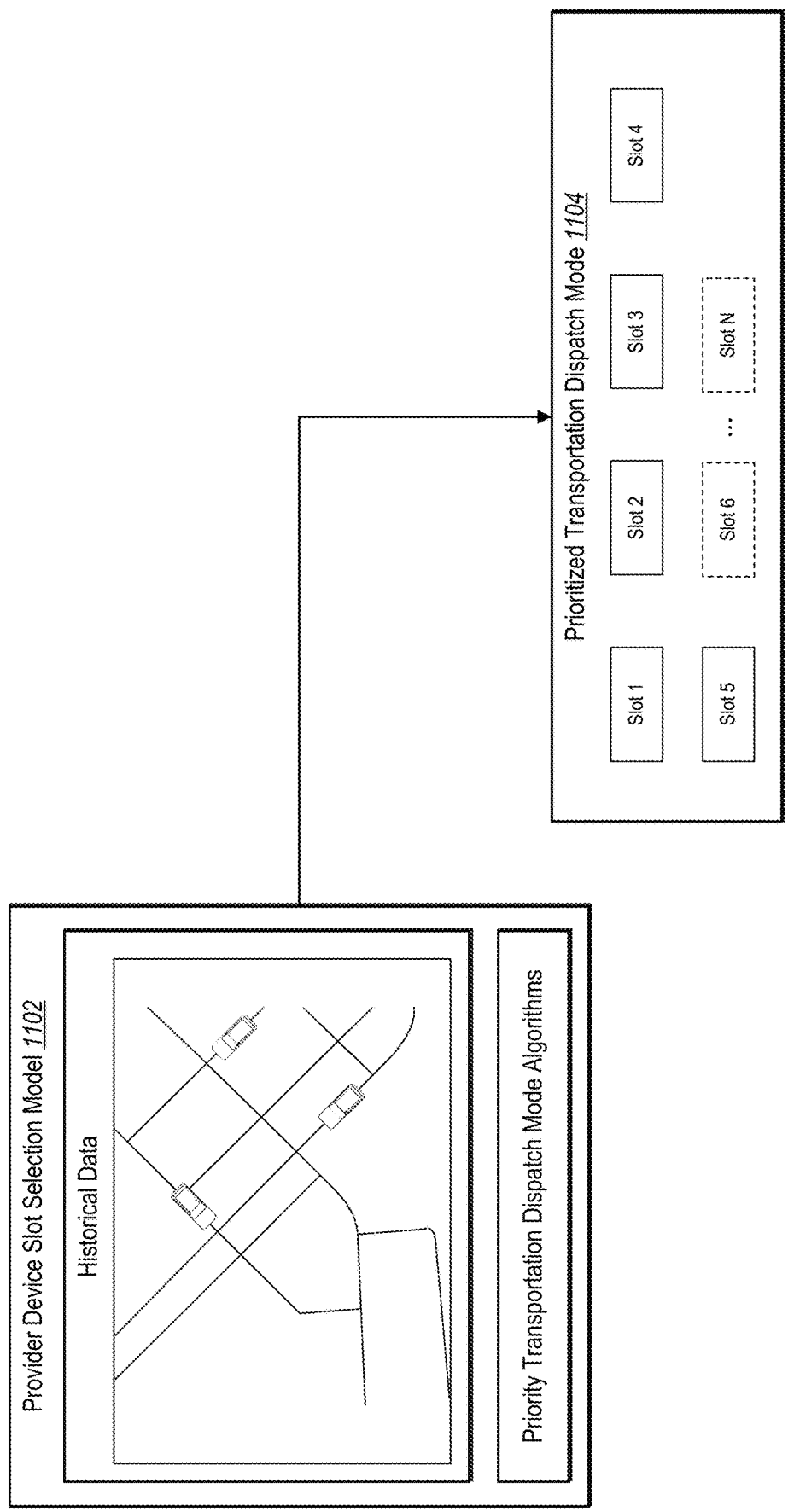
FIGS. 11A-11E illustrate diagrams of the provider dispatch control system analyzing various features in generating and/or filling slots for a prioritized transportation dispatch mode in accordance with one or more embodiments.

As mentioned above, the provider dispatch control system 106 can identify a (threshold) number of provider device slots for a prioritized transportation dispatch mode. For example, FIG. 11A illustrates the provider dispatch control system 106 identifying a number of provider device slots for the prioritized transportation dispatch mode. In particular, as shown in FIG. 11A, the provider dispatch control system 106 utilizes a provider device slot selection model 1102 to identify the number of provider slots (for the prioritized transportation dispatch mode 1104). Indeed, as illustrated in FIG. 11A, the provider dispatch control system 106 can utilize the provider device slot selection model 1102 to analyze historical data with (an implementation of) one or more priority transportation dispatch mode algorithms to estimate a transportation-mode value improvement metric. By using the provider device slot selection model 1102, the provider dispatch control system 106 can determine a number of provider device slots that results in a threshold (or maximized) estimated transportation-mode value improvement metric.

In particular, the provider dispatch control system 106 can, using the slot selection model, analyze historical data to model the dispatch of provider devices using a prioritized transportation dispatch mode. For instance, the provider dispatch control system 106 can model different priority transportation dispatch mode algorithms (for provider devices in the prioritized transportation dispatch mode) using the historical data to identify a number of provider device slots that would provide the greatest improvement in efficiency (e.g., using transportation-mode value improvement metrics, provider device utilization metrics, and/or multi-outcome transportation-value metrics). For example, the provider dispatch control system 106 can utilize historical data such as historical transportation requests, historical provider device activity, historical rewards, historical outcomes corresponding to a geographical area (e.g., as described in FIGS. 11B and 11C). Indeed, the provider dispatch control system 106 can identify a number of provider device slots (and a priority transportation dispatch mode algorithm) that results in a threshold (or greatest) estimated outcome (e.g., a threshold or greatest transportation-mode value improvement metric, provider device utilization metric, and/or multi-outcome transportation-value metric) from the historical data.

As used herein, the term "transportation-mode value improvement metric" refers to a benefit, advantage, profit, or value associated with dispatching a provider device associated with a particular transportation dispatch mode. In particular, the term "transportation-mode value improvement metric" can refer to a relative difference in value or benefit (e.g., a reward) associated with dispatching a provider device associated with a transportation dispatch mode and a provider device associated with another transportation dispatch mode. For example, the prior dispatch control system can compensate provider devices associated with a transportation dispatch mode at a lower rate than another transportation dispatch mode. The transportation-mode value improvement metric can reflect a difference in value resulting from dispatching a provider device from the transportation dispatch mode (having a lower compensation rate). Similarly, a transportation-mode value improvement metric can reflect a difference in efficiency (e.g., the number of transportation requests one or more provider devices fulfill within an interval of time), provider device utilization metrics, or anticipated retention resulting from dispatching a provider device from the prioritized transportation dispatch mode.

In some embodiments, the provider dispatch control system 106 models a destination control transportation dispatch mode (as the priority transportation dispatch mode algorithm) with the historical data to determine estimated transportation-mode value improvement metrics and a number of provider device slots. For instance, the provider dispatch control system 106 can model the destination control transportation dispatch mode to evaluate characteristics (or attributes) at a destination location of a transportation request (e.g., idle time, multi-outcome transportation-value metrics, or provider-device-flow models) to determine a number of slots that maximizes (or optimizes) an estimated transportation-mode value improvement metric (e.g., as described below in FIG. 11D). In one or more embodiments, the provider dispatch control system 106 can also model a priority queue transportation dispatch mode and/or a location restriction transportation dispatch mode (as the priority transportation dispatch mode algorithm) with the historical data to determine estimated transportation-mode value improvement metrics and a number of provider device slots.

For instance, in one or more embodiments, the provider dispatch control system 106 models the priority queue transportation dispatch mode using historical data to identify a number of provider device slots (e.g., as described below in FIG. 11D). In particular, the provider dispatch control system 106 can determine provider device location probabilities from the historical data for one or more locations (e.g., the probability of a provider device fulfilling a transportation request from a particular location). Then, the provider dispatch control system 106 can estimate P1 and P2 times by analyzing the historical data with an implementation of the priority queue transportation dispatch mode. In particular, the provider dispatch control system 106 can estimate and minimize P1 and P2 times by utilizing L1 norms of areas and sizes (e.g., in terms of radii) for one or more locations in the historical data during provider device selection via the modeled priority queue transportation dispatch mode. Then, the provider dispatch control system 106 can utilize the estimated and minimized P1 and P2 times to identify a configuration for the priority queue transportation dispatch mode that maximizes a transportation-mode value improvement metric (and identify a corresponding number of provider device slots for the prioritized transportation dispatch mode).

Furthermore, in some embodiments, the provider dispatch control system 106 models the location restriction transportation dispatch mode using historical data to identify a number of provider device slots (e.g., as described below in FIG. 11D). For instance, the provider dispatch control system 106 can analyze the historical data by implementing a location restriction transportation dispatch mode to restrict one or more locations in order to maximize a transportation-mode value improvement metric. Indeed, the provider dispatch control system 106 can utilize integer optimization and/or greedy heuristics to identify a configuration for the location restriction transportation dispatch mode that maximizes a transportation-mode value improvement metric for the historical data (and identify a corresponding number of provider device slots for the prioritized transportation dispatch mode).

In addition, the provider dispatch control system 106 can model the destination control transportation dispatch mode using historical data to identify a number of provider device slots (e.g., as described below in FIG. 11D). In particular, the provider dispatch control system 106 can modify provider device location probabilities and utilize the modified provider device location probabilities (e.g., to control the number of provider devices in a prioritized transportation dispatch mode travelling to the particular locations) to estimate and minimize P1 and P2 times in the historical data during provider device selection via the modeled destination control transportation dispatch mode. Subsequently, the provider dispatch control system 106 can utilize the estimated and minimized P1 and P2 times to identify a configuration of the destination control transportation dispatch mode that maximizes (using an optimization function) a transportation-mode value improvement metric for the historical data (and identify a corresponding number of provider device slots for the prioritized transportation dispatch mode).

In some embodiments, the provider dispatch control system 106 generates a provider device utilization model (from the provider device slot selection model). In particular, the provider dispatch control system 106 can generate a provider device utilization model that outputs an estimated provider device utilization metric (using the historical data) based on an input (or selected) number of provider device slots within the prioritized transportation dispatch mode (e.g., as described in FIG. 11E). Indeed, the provider dispatch control system 106 can utilize the provider device utilization model to identify a number of provider device slots for the prioritized transportation dispatch mode (for a desired provider device utilization metric).

Figure 11B:
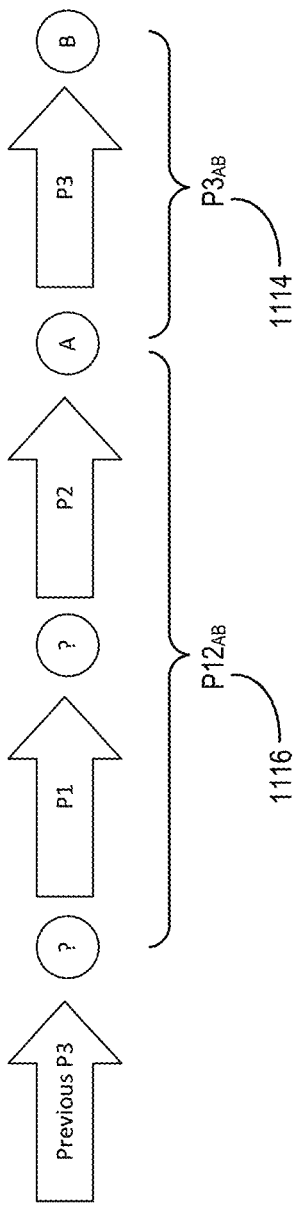
Figure 11C:
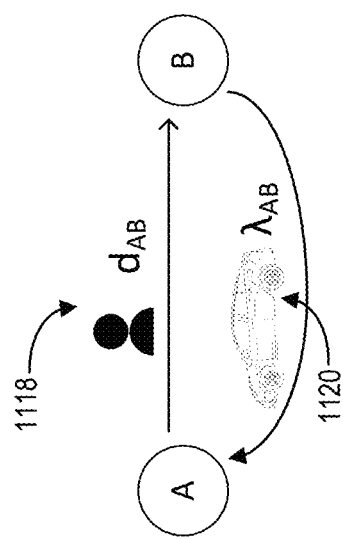

As just mentioned, the provider dispatch control system 106 can analyze historical data to model one or more prioritized transportation dispatch mode algorithms (for the prioritized transportation dispatch mode) to identify a number of provider device slots. Indeed, the provider dispatch control system 106 can utilize historical data such as historical transportation requests, historical provider device activity, historical rewards, historical outcomes corresponding to a geographical area. FIGS. 11B and 11C illustrate an overview of historical data utilized by the provider dispatch control system 106.

For example, in reference to FIG. 11B, the provider dispatch control system 106 can identify, from historical data, a P3 state 1114 between two locations (e.g., location A and B). Indeed, the provider dispatch control system 106 can identify a plurality of P3 states from a variety of provider devices between a variety of locations in a geographical area from historical data. As mentioned above, the P3 state can reflect a time associated with provider devices actively fulfilling transportation requests (e.g., a provider device utilization metric).

In addition, in reference to FIG. 11B, the provider dispatch control system 106 can also identify, from historical data a P1 and P2 state 1116 for a provider device. Furthermore, the provider dispatch control system 106 can identify a plurality of P1 and/or P2 states from a variety of provider devices between a variety of locations in a geographical area from historical data. Indeed, in one or more embodiments, the P1 can reflect an idle time of a provider device and a P2 state can reflect a time of travel to a pickup location corresponding to transportation request.

As shown in FIG. 11C, the provider dispatch control system 106 can identify, from historical data, an average flow of demand 1118 between two locations (e.g., location A and B). In particular, the provider dispatch control system 106 can identify, as the flow of demand, the number of transportation requests between a variety of locations in a geographical area from historical data. Indeed, the provider dispatch control system 106 can identify a flow of demand between a variety of locations in terms of the number of transportation requests between the variety of locations in a given time period (e.g., per hour, per day).

Furthermore, as illustrated in FIG. 11C, the provider dispatch control system 106 can also identify, from historical data, the average number of transportation requests fulfilled 1120 (e.g., served) between two locations (e.g., location A and B). For instance, the provider dispatch control system 106 can identify an average number of transportation requests that are served out of the transportation requests between a variety of locations in a geographical area. Furthermore, the provider dispatch control system 106 can identify the average number of transportation requests fulfilled between a variety of locations in terms of the number of transportation requests fulfilled between the variety of locations in a given time period (e.g., per hour, per day).

As an example, in some embodiments, the provider dispatch control system 106, from historical data in a geographical area, identifies a discretized set of locations $\mathcal{L}=(1, \ldots, N)$ (e.g., from a geohash of size 5 or a geohash of size 6). In addition, the provider dispatch control system 106 can identify an average flow of demand (e.g., in transportation requests per hour) between locations i and j as $d_{ij}$. Furthermore, the provider dispatch control system 106 can identify, from the historical data, an average time in a P3 state for provider devices going from location i to j as $P3_{ij}$. In addition, the provider dispatch control system 106 can identify an average number of transportation requests fulfilled out of the demand $d_{ij}$ between location i to j as $\lambda_{ij}$. The provider dispatch control system 106 can also identify an average time in a P1 and/or P2 state prior to a transportation request from location i to j as $P12_{ij}$. In one or more embodiments, the provider dispatch control system 106 identifies a non-constant $P12_{ij}$ that increases and/or decreases as the number of provider devices increase and/or decrease.

Using the times corresponding to the historical P3 states in a geographical area, the provider dispatch control system 106 can model (or determine) an average time that provider devices are in a P3 state (between pairings of locations and a total number of transportation requests fulfilled between the pairings). For instance, the provider dispatch control system 106 can model an average number of P3 state hours per hour in the geographical area. In addition, the provider dispatch control system 106 can utilize the historical P1 and P2 states to model an average time that provider devices are in a P1 and/or a P2 state (between pairings of locations and a total number of transportation requests fulfilled between the pairings). For example, the provider dispatch control system 106 can model an average number P1 and P2 state hours per hour in the geographical area. In one or more embodiments, the provider dispatch control system 106 utilizes these modeled averages of times of the P1, P2, and P3 states to determine a total number of provider devices that fulfilled transportation requests between the location pairings in the geographical area.

As an example, the provider dispatch control system 106 can model an average number of P3 state hours per hour in a geographical area (from location i to j) as $P3=\Sigma_{ij}\lambda_{ij}P3_{ij}$. In addition, the provider dispatch control system 106 can model an average number of P1 and P2 state hours per hour in a geographical area (from location i to j) as $P12=\Sigma_{ij}\lambda_{ij}P12_{ij}$. In some embodiments, the provider dispatch control system 106 identifies the number of provider devices, within the modeled historical data, as K=P12+P3 (e.g., the average number of P1, P2, and P3 state hours per hour). Furthermore, the provider dispatch control system 106 can, from the historical data, represent the total number of transportation requests fulfilled by provider devices in the geographical area (from location i to j) as $\Sigma_{ij}\lambda_{ij}$. Indeed, in some embodiments, the provider dispatch control system 106 models the provider device utilization (U) as U=P3/(P12+P3)=P3/K.

As previously mentioned, the provider dispatch control system 106 can analyze historical data by implementing (or modeling) one or more prioritized transportation dispatch mode algorithms to identify a number of provider device slots for the prioritized transportation dispatch mode. In particular, FIG. 11D illustrates the provider dispatch control system 106 utilizing one or more prioritized transportation dispatch mode algorithms with historical data to identify number of provider device slots and a corresponding maximized transportation-mode value improvement metric. Indeed, the provider dispatch control system 106 can select a number of provider device slots (and the corresponding prioritized transportation dispatch mode algorithms) having the greatest transportation-mode value improvement metric (to utilize for the prioritized transportation dispatch mode).

Figure 11D:
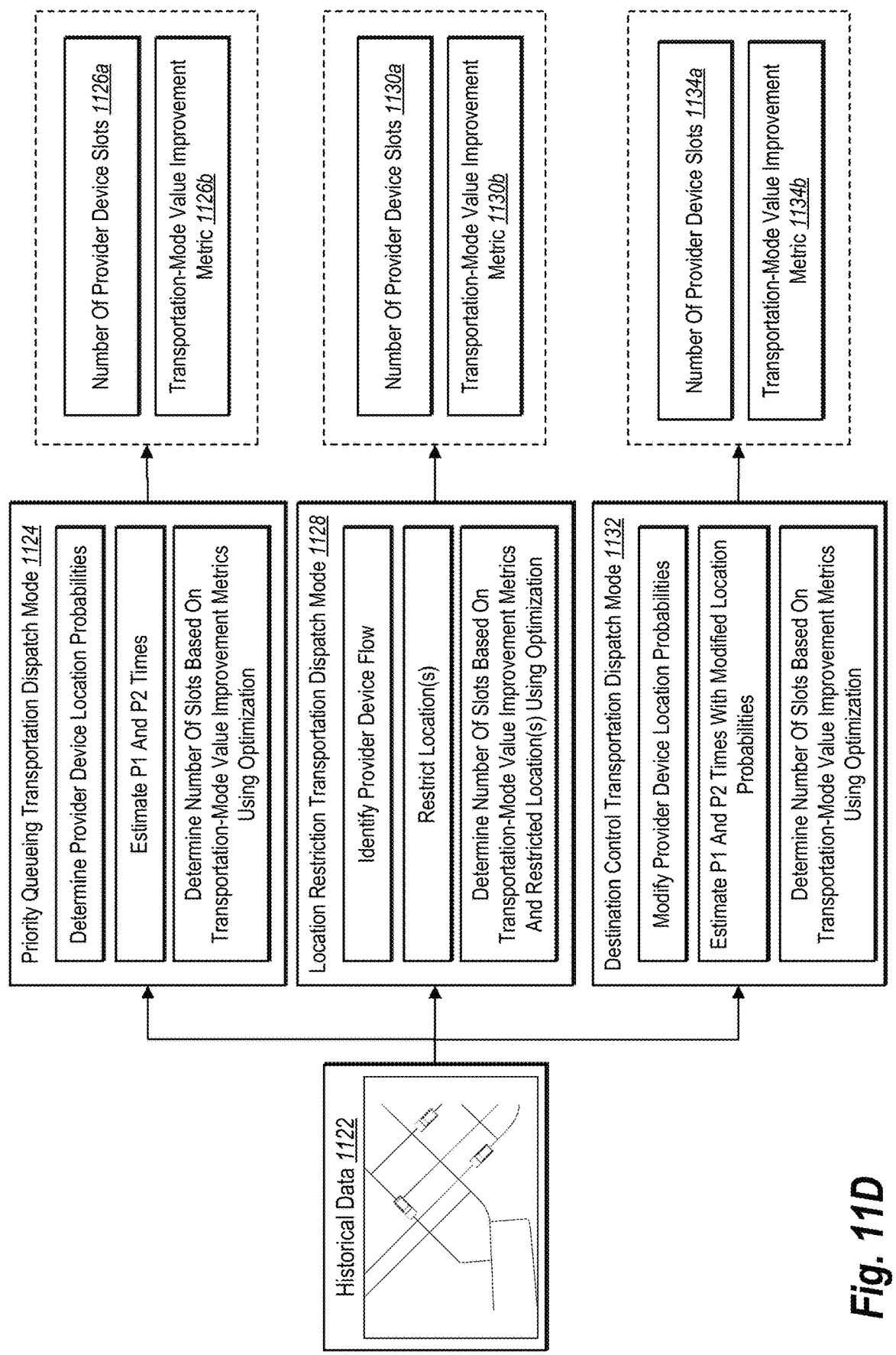

Indeed, as shown in FIG. 11D, the provider dispatch control system 106 analyzes the historical data 1122 with a priority queueing transportation dispatch mode 1124 to identify a number of provider device slots 1126*a* and a corresponding transportation-mode value improvement metric 1126*b*. In addition, as illustrated in FIG. 11D, the provider dispatch control system 106 also analyzes the historical data 1122 with a location restriction transportation dispatch mode 1128 to identify a number of provider device slots 1130*a* and a corresponding transportation-mode value improvement metric 1130*b*. Moreover, as shown in FIG. 11D, the provider dispatch control system 106 analyzes the historical data 1122 with a destination control transportation dispatch mode 1132 to identify a number of provider device slots 1134*a* and a corresponding transportation-mode value improvement metric 1134*b*. Then, in one or more embodiments, the provider dispatch control system 106 selects a number of provider device slots (and a corresponding prioritized transportation dispatch mode algorithm) for the prioritized transportation dispatch mode by selecting between the number of provider device slots 1126*a*, 1130*a*, 1134*a* based on the greatest transportation-mode value improvement metric from the respective transportation-mode value improvement metrics 1126*b*, 1130*b*, 1134*b*.

Although FIG. 11D illustrates the provider dispatch control system 106 identifying a number of provider device slots and corresponding transportation-mode value improvement metrics for various prioritized transportation dispatch mode algorithms, the provider dispatch control system 106 can utilize a single prioritized transportation dispatch mode algorithm to identify a number of provider device slots. For instance, the provider dispatch control system 106 can analyze the historical data by modeling the destination control transportation dispatch mode to identify a number of provider device slots that maximizes a transportation-mode value improvement metric under the destination control transportation dispatch mode. For instance, the provider dispatch control system 106 can utilize the destination control transportation dispatch mode as the implementation for the prioritized transportation dispatch mode. Indeed, the provider dispatch control system 106 can utilize the identified number of provider device slots for the destination control transportation dispatch mode for the prioritized transportation dispatch mode.

For instance, (in reference to each of the prioritized transportation dispatch mode algorithms) the provider dispatch control system 106 can estimate an average amount of time (e.g., in hours) that provider devices will be in a P3 state when the historical data is analyzed in light of the various prioritized transportation dispatch mode algorithms. Then, the provider dispatch control system 106 can determine the average provider device utilization by calculating a proportion between the estimated average amount of time in a P3 state by the number of provider device slots corresponding to the prioritized dispatch mode. For instance, the provider dispatch control system 106 can identify a target number of provider device slots for the prioritized dispatch mode that maximizes the average provider device utilization in the geographical area (from the simulation of historical data). Indeed, as an example, the provider dispatch control system 106 can select a number of provider device slots K and maximize the average provider device utilization (U) by maximizing the modeled average number of P3 state hours per hour using the following equation:

$$U=P3/K.$$

Subsequently, the provider dispatch control system 106 can determine a number of provider device slots in a prioritized transportation dispatch mode by maximizing a transportation-mode value improvement metric. In some embodiments, the provider dispatch control system 106 can determine an estimated transportation-mode value improvement metric in a geographical area in response to selecting a number of provider device slots corresponding to a prioritized transportation dispatch mode. For example, the provider dispatch control system 106 can determine a difference between an estimated utilization metric (e.g., time in a P3 state) for the prioritized transportation dispatch mode (with the selected number of provider device slots) and a determined utilization metric from historical data that utilizes another transportation dispatch mode (e.g., a current or another transportation dispatch mode). In particular, the provider dispatch control system 106 can determine an estimated amount of time within a P3 state result from a selected number of provider device slots corresponding to a prioritized transportation dispatch mode. Then, the provider dispatch control system 106 can compare this with a current utilization (e.g., time in a P3 state) served by the same number of provider devices (as the provider device slots) within the historical data.

Moreover, the provider dispatch control system 106 can utilize the difference between the estimated amount of time within a P3 state for the prioritized transportation dispatch mode and the current utilization served by the same number of provider devices within historical data as the transportation-mode value improvement metric. In some embodiments, the transportation-mode value improvement metric can represent the incremental number of estimated P3 state hours served by provider devices in a prioritized transportation dispatch mode over the P3 state hours served by provider devices in another transportation dispatch mode from the historical data.

Furthermore, the provider dispatch control system 106 can identify a maximized transportation-mode value improvement metric by identifying a solution that includes a marginal amount of estimated P3 state hours corresponding to the prioritized transportation dispatch mode. For example, in one or more embodiments, the provider dispatch control system 106 utilizes a solution that uses a derivative respective to a selected number of provider device slots for a prioritized transportation dispatch mode and a number of estimated P3 state hours (for the number of provider device slots). Indeed, the provider dispatch control system 106 can identify a maximized transportation-mode value improvement metric that satisfies a desired marginal amount of estimated P3 state hours corresponding to the prioritized transportation dispatch mode. For instance, the marginal amount of estimated P3 state hours can include an amount of estimated P3 state hours that equals the derivative respective to a selected number of provider device slots for a prioritized transportation dispatch mode and a number of estimated P3 state hours from historical data.

As an example, the provider dispatch control system 106 can determine a transportation-mode-value (e.g., $S_\gamma$) using the following equation:

$$S_\gamma = P3 - \gamma(P12+P3) = P3 - \gamma K = K(U-\gamma).$$

For instance, the provider dispatch control system 106 represents $S_\gamma$ as the extra amount of P3 hours that occur (for a selected number of provider device slots) compared to a utilization value $\gamma$ that is estimated from historical data for the same number of provider devices using another transportation dispatch mode (e.g., $S_\gamma = K(U-\gamma)$). Furthermore, the provider dispatch control system 106 can determine a derivative with respect to the number of provider devices K in which satisfying $dP3/dK=\gamma$ maximizes the transportation-mode value improvement metric $S_\gamma$. Indeed, in one or more embodiments, the provider dispatch control system 106 identifies a solution that has a marginal amount of estimated P3 state hours corresponding to the prioritized transportation dispatch mode $\gamma$ to maximize the transportation-mode value improvement metric $S_\gamma$. Furthermore, the provider dispatch control system 106 maximizes the transportation-mode value improvement metric $S_\gamma$ with a desired $\gamma$ to identify a number of provider device slots to utilize in the prioritized transportation dispatch mode.

In order to determine a maximized transportation-mode value improvement metric, the provider dispatch control system 106 identifies an average number of transportation requests fulfilled out of the demand $d_{ij}$ between location i to j (e.g., $(\lambda_{ij})_{ij}$). Indeed, the provider dispatch control system 106 can determine one or more feasible $(\lambda_{ij})_{ij}$ and can determine how $P12_{ij}$ varies with the one or more feasible $(\lambda_{ij})_{ij}$. For example, the provider dispatch control system 106 can determine $(\lambda_{ij})_{ij}$ and a varying $P12_{ij}$ to maximize a transportation-mode value improvement metric under the various prioritized transportation dispatch mode algorithms (e.g., the algorithms shown in FIG. 11D).

For example, as shown in FIG. 11D, the provider dispatch control system 106 identifies a number of provider device slots 1126a and a corresponding transportation-mode value improvement metric 1126b using the priority queueing transportation dispatch mode 1124. Indeed, as further illustrated in FIG. 11D, the provider dispatch control system 106 first determines provider device location probabilities from the historical data while using the priority queueing transportation dispatch mode 1124. Then, the provider dispatch control system 106 estimates P1 and P2 times under the priority queueing transportation dispatch mode 1124 (e.g., using location sizes in terms of radii). Finally, the provider dispatch control system 106 determines a number of provider device slots based on a transportation-mode value improvement metric using optimization (to find a maximized transportation-mode value improvement metric under the priority queueing transportation dispatch mode implementation as described below).

Indeed, in one or more embodiments, the provider dispatch control system 106 can prioritize provider devices in a prioritized transportation dispatch mode by providing the provider devices priority to match with transportation requests over other provider devices (e.g., that are not in the prioritized transportation dispatch mode). Indeed, the provider dispatch control system 106 can introduce priority dispatch for a selected number of provider devices to model a transportation-mode value in historical data. For instance, the provider dispatch control system 106 can determine one or more probabilities of a provider device beginning a transportation request at a particular location. Then, the provider dispatch control system 106 can utilize the probabilities to identify a maximum number of transportation requests that can be taken from between the locations through provider device flows between the location (e.g., the average number of transportation requests fulfilled out of the demand between locations). Additionally, the provider dispatch control system 106 can utilize the maximum number of transportation requests that can be taken from between the locations through provider device flows to determine a maximized transportation-mode value improvement metric in a priority dispatch approach.

As an example, the provider dispatch control system 106 can determine a probability $p_i$ of a random transportation request of a provider device from historical data starting at location i. In other words, the provider dispatch control system 106 can determine a distribution of one or more provider device pickup locations in a steady state from transportation requests corresponding to the historical data. For instance, the provider dispatch control system 106 can represent demand of transportation requests at the location i be $d_i = \Sigma_j d_{ij}$. Subsequently, the provider dispatch control system 106 can determine the probability ($p_{ij}$) for a provider device travelling, for a transportation request, from location i to a location j using the demand of transportation requests between location i and j (e.g., $d_{ij}$) and the demand of transportation requests at location i (e.g., $d_i$). For example, the provider dispatch control system 106 can determine (or imply) the probability $p_{ij}$ using the following equation:

$p_{ij} = d_{ij}/d_i.$

Then, the provider dispatch control system 106 can determine a probability $p_i$ that verifies (or satisfies) one or more equilibrium equations based on the probabilities of provider devices fulfilling transportation requests from location i conditioned on the location j of the origin of the provider devices previously fulfilled transportation request. Indeed, the provider dispatch control system 106 can represent the probability $p_i$ using the following equation:

$p_i = \Sigma_j p_j p_i$

For instance, the provider dispatch control system 106 can combine the probabilities at location i and location j to obtain a function $(P'-1)p=0$ in which P represents a matrix with coefficients $p_{ij}$. In some embodiments, the provider dispatch control system 106 can determine $\Sigma_i p_i = 1$ in which the $p_i$ values represent a probability distribution. In one or more embodiments, the provider dispatch control system 106 utilizes the above system of equations to determine values of probability $p_i$. Furthermore, the provider dispatch control system 106 determines values of probability $p_i$ that are proportional to the values of $\lambda_i$ (e.g., a number of transportation requests fulfilled by provider devices from location i).

As an example, the provider dispatch control system 106 can determine a probability $p_i$ by computing a probability distribution. For instance, the provider dispatch control system 106 can utilize a matrix A at a first location (with a probability $p_1 > 0$) and set the matrix A to equal P' (e.g., A=P'). Indeed, the provider dispatch control system 106 can replace the first row of A with ones and set a vector b having N zeros except for $b_1 = 1$. The provider dispatch control system 106 can, with $\epsilon \ll 1$, solve the following equation:

$(A-(1-\epsilon)I)p=b.$

Furthermore, the provider dispatch control system 106 can set the probability to zero in one or more geographical areas (e.g., subregions) that are not connected to the geographical area for the above described probability distribution.

For instance, the provider dispatch control system 106 can determine the following matrix P for the probability (or proportion) of transportation requests between three locations A, B, and C in which $\lambda_{AB}=2$, $\lambda_{BC}=3$, and $\lambda_{AC}=0$ in both directions:

$$P = \begin{bmatrix} 0 & 1 & 0 \\ 0.4 & 0 & 0.6 \\ 0 & 1 & 0 \end{bmatrix}.$$

Using the equation above (e.g., $(A-(1-\epsilon)I)p=b$), the provider dispatch control system 106 can determine a solution for p in accordance with the following:

$$\begin{bmatrix} 0 & 1 & 0 \\ 0.4 & 0 & 0.6 \\ 0 & 1 & 0 \end{bmatrix} p = \begin{bmatrix} 1 \\ 0 \\ 0 \end{bmatrix} \text{ which yields } p = \begin{bmatrix} 0.2 \\ 0.5 \\ 0.3 \end{bmatrix}.$$

In particular, the provider dispatch control system 106 can utilize p to represent a proportions (or ratios) corresponding to where transportation requests originate from with respect to locations A, B, and C.

Upon determining one or more probabilities $(p_i)_i$ (e.g., probability of a random transportation request of a provider device starting at location i), the provider dispatch control system 106 can determine an average number of transportation requests fulfilled out of the demand $d_{ij}$ between location i to j (e.g., $(\lambda_{ij})_{ij}$) up to a constant. In particular, the provider dispatch control system 106 can identify a value $\alpha$ (e.g., a value $\alpha \geq 0$) in which $\lambda_i = \alpha p_i$. Indeed, the provider dispatch control system 106 can utilize a to represent the maximum number of hourly transportation requests in a geographical area. Then, the provider dispatch control system 106 can determine a by utilizing the following equations:

$\lambda_{ij} = \alpha p_i p_{ij}$; and $\Sigma_{ij}\lambda_{ij} = \Sigma_{ij}\alpha p_i p_{ij} = \alpha \Sigma_i p_i \Sigma_j p_{ij} = \alpha \Sigma_i p_i = \alpha.$ In one or more embodiments, if the provider dispatch control system 106 utilizes a fixed number of provider devices, the provider dispatch control system 106 can identify an $\alpha$ that solves the equation: P12+P3=K (e.g., as described above, P12+P3 corresponds to a number of provider devices with a high provider device utilization). Indeed, the provider dispatch control system 106 can further represent P12+P3 using the following equation in which $(\lambda_{ij})_{ij}$ is dependent on a:

$P12+P3=\Sigma_{ij}\lambda_{ij}(P12_{ij}(\lambda)+P3_{ij})=\Sigma_{ij}\alpha p_i p_{ij}(P12_{ij}(\lambda(\alpha))+P3_{ij}).$ By using an $\alpha$ that depends on P12+P3, in one or more embodiments, the provider dispatch control system 106 solves the one-dimensional equation $P12(\alpha)+P3(\alpha)=K$ in order to identify a value for $\alpha$.

Subsequently, the provider dispatch control system 106 can utilize the value of $\alpha$ to determine a maximized transportation-mode value improvement metric (e.g., determine a $\lambda_{ij}$ to determine a number of provider devices in a prioritized transportation dispatch mode). For instance, the provider dispatch control system 106 can maximize a transportation-mode-value using the value of $\alpha$ with the following equation:

$P3-\gamma(P12+P3)=P3(\alpha)-\gamma(P12(\alpha)+P3(\alpha)).$

In one or more embodiments, the provider dispatch control system 106 solves a one-dimensional maximization problem to maximize a transportation-mode value improvement metric, where $\lambda_{ij}$ is dependent of a using the following equation:

$$\text{maximize}_\alpha (1-\gamma)P3(\alpha) - \gamma P12(\alpha).$$

Furthermore, in order to estimate and optimize the number of providers for a prioritized transportation dispatch mode (e.g., to maximize a transportation-mode-surplus value), the provider dispatch control system 106 solves a linear system of size N. For instance, the provider dispatch control system 106 can numerically solve a one-dimensional root-finding or maximization problem (as described above) for a linear system of size N. By solving a linear system of size N, the provider dispatch control system 106 can efficiently identify a number of providers for a prioritized transportation dispatch mode (e.g., to maximize a transportation-mode-surplus value) at numerous locations (e.g., thousands) quickly (e.g., in a fraction of a second).

As mentioned above, in order to determine a maximized transportation-mode value improvement metric and a corresponding number of provider device slots, the provider dispatch control system 106 also can estimate an average time in a P1 and P2 state before a traveling from location i to j (e.g., P12$_{ij}$). Indeed, the provider dispatch control system 106 can model historical data by simulating a prioritized dispatch mode approach to estimate P12$_{ij}$ in regards to an average number of transportation requests fulfilled out of the demand d$_{ij}$ between location i to j (e.g., $(\lambda_{ij})_{ij}$). In particular, the provider dispatch control system 106 can estimate (or evaluate) the function P12$_{ij}(\lambda_{ij})$ (e.g., the average P1 and P2 time before traveling from location i to j).

Furthermore, the provider dispatch control system 106 can utilize one or more simplifications to estimate P12$_{ij}$. In some embodiments, the provider dispatch control system 106 utilizes a time that is independent of a destination location j due to the P1 and/or P2 state occurring before travelling to the destination location j. As such, in one or more embodiments, the provider dispatch control system 106 utilizes a total location demand $d_i = \Sigma_j d_{ij}$ to estimate P12$_{ij}$. Furthermore, the provider dispatch control system 106 can utilize transportation request flows $\lambda_{ji}$ going to location i to estimate P12$_{ij}$ (e.g., the provider dispatch control system 106 utilizes the overall frequency $\lambda_i = \Sigma_j \lambda_{ij}$). Indeed, in one or more embodiments, the provider dispatch control system 106 utilizes the above simplifications to estimate P12$_i(\lambda_i)$ as a function of d$_i$ (e.g., the demand of transportation requests at location i).

In some embodiments, the provider dispatch control system 106 can estimate P1 times for a prioritized transportation dispatch mode that selects provider devices using a priority queue approach. For example, the provider dispatch control system 106 can use a priority queue approach that queues provider devices and when a transportation request is received, the provider dispatch control system 106 prioritizes provider devices from the prioritized transportation dispatch mode for the incoming transportation requests. In particular, the provider dispatch control system 106 can estimate P1 times at a location i by assuming Poisson arrivals of provider devices and requestor devices with a rate d$_i$ and $\lambda_i$ and applying a M/M/1 queueing theory approach.

For instance, the provider dispatch control system 106 can assimilate requestor devices within a queue (e.g., a queue within server device(s) 102) corresponding to location i and identify provider devices as arrivals. Then, the provider dispatch control system 106 can determine an estimated wait time (i.e., P1 time) using a Markov Chain steady state in accordance with the following equation:

$$\frac{1}{d_i \lambda_i}.$$

Indeed, in one or more embodiments, the provider dispatch control system 106 determines the estimated wait time to be $$\frac{1}{d_i}$$

when $\lambda_i \ll 1$. In such a case, the provider dispatch control system 106 determines that there is a low supply of provider devices at location i and a provider device will be assigned a transportation request with a minimal wait time. As $\lambda_i$ increases, the provider dispatch control system 106 can estimate that the number of provider devices will also increase and, accordingly, so will the wait time.

Furthermore, the provider dispatch control system 106 can estimate a P2 time along a P1 time (e.g., the time of travel to a pickup location of a transportation request) for a prioritized transportation dispatch mode that selects provider devices using a priority queue approach. In particular, the provider dispatch control system 106 can estimate a P1 and P2 time for a priority queue approach by limiting each provider device to a sub-location and estimating the average P1 and P2 times in a location i as a function of the radius (or distance) of an assigned sub-location of location i. Indeed, the provider dispatch control system 106 can select a distance (radius) for a sub-location that minimizes an estimated P1 and P2 time to estimate the P12$_i(\lambda_i)$ time.

For instance, the provider dispatch control system 106 can partition a location i into a tessellation of squares having a radius r (e.g., sub-locations). For example, the provider dispatch control system 106 can partition a location into sub-locations with boundaries with each sub-location having a radius for each of the sub-locations. In some embodiments, the provider dispatch control system 106 partitions a location into sub-locations having a smaller radii to increase the number of sub-locations (e.g., for a high-density area) within the location (or vice versa). Furthermore, the provider dispatch control system 106 can use a radius that is larger than a location and, therefore, results in a sub-location that encompasses the entire location (e.g., for a low-density area).

Furthermore, the provider dispatch control system 106 can determine the size of a sub-location to minimize a P1 and P2 time of provider devices within a location (e.g., determine a radius that minimizes P1 and P2 time estimations). For instance, the provider dispatch control system 106 can first define sub-locations with a radius r as disks of radius r in L1 (Manhattan) norm. In other words, the provider dispatch control system 106 can determine a set of points x such that $\|x-c\|_1 \geq r$ in which c is the center of a sub-location (e.g., a tessellation square). Then, the provider dispatch control system 106 can utilize each square of radius r at a location as a sub-location. The provider dispatch control system 106 can associate a provider device with a sub-location and select transportation requests for that provider device when the transportation requests are within the sub-location. Within the sub-location and for a transportation request that occurs within the sub-location, the provider dispatch control system 106 can utilize a priority queue that prioritizes provider devices corresponding to a prioritized transportation dispatch mode (e.g., the priority queueing approach described above) regardless of distance away from a pickup location.

Moreover, the provider dispatch control system 106 can utilize the sub-locations to estimate P1$_i$ and P2$_i$ (the average P1 and P2 times of provider devices in location i) as a function of radius r of the sub-locations. In particular, the provider dispatch control system 106 can determine a number of provider devices and requestor devices within a time period (e.g., per hour) that arrive in each sub-location. For instance, the provider dispatch control system 106 can determine $\lambda_i 2r^2 / \mathcal{A}_i$ (flow of provider devices) and $d_i 2r^2 / \mathcal{A}_i$ (number of requestor devices in terms of demand) within an area ($2r^2$) of a sub-location ($\mathcal{A}_i$).

The provider dispatch control system 106 can then estimate a P1 time using the number of provider devices and requestor devices within a time period (e.g., per hour) that arrive in each sub-location. For instance, the provider dispatch control system 106 can estimate P1 times (for a priority queueing approach) using the following equation:

$$P1_i(r) = \frac{1}{\frac{d_i 2r^2}{\mathcal{A}_i} - \frac{\lambda_i 2r^2}{\mathcal{A}_i}} = \frac{\mathcal{A}_i}{2(d_i - \lambda_i)} \frac{1}{r^2}.$$

In particular, the provider dispatch control system 106 can estimate a P1 time that decreases when radius r increases since the sub-location becomes larger and includes more potential transportation requests.

Furthermore, the provider dispatch control system 106 can estimate P2 times using the number of provider devices and requestor devices within a time period (e.g., per hour) that arrive in each sub-location. In one or more embodiments, the provider dispatch control system 106 determines a P2 time by using an average time between two random points (i.e., locations) within a sub-location of radius r (from historical data). In particular, the provider dispatch control system 106 can utilize an expected Manhattan distance between two random points in a L1-disk of a radius r (e.g., computed as 14/15r or approximately 0.93r).

Moreover, the provider dispatch control system 106 can utilize historical data associated with the location for a speed parameter $v_i$ (e.g., speed of vehicles associated with provider devices) and a constant wait parameter $w_i$. In some embodiments, the provider dispatch control system 106 utilizes a linear regression model to determine the constant wait parameter $w_i$. Furthermore, in one or more embodiments, the provider dispatch control system 106 utilizes region-wide parameter w and v that are independent of location i. The provider dispatch control system 106 can estimate the P2 times using the following equation:

$$P2_i(r) = w_i + [L1 \text{ distance}]/v_i = w_i + \frac{14}{15v_i} r.$$

Then, the provider dispatch control system 106 can select a radius r by minimizing P1 and P2 to obtain a P12$_i(\lambda_i)$. In particular, the provider dispatch control system 106 can select a radius r to minimize P1 and P2 using the following equation:

$$P12_i(\lambda_i) = \min_r P1_i(r) + P2_i(r) =$$

$$\min_r \frac{\mathcal{A}_i}{2(d_i - \lambda_i)} \frac{1}{r^2} + w_i + \frac{14}{15v_i} r = w_i + \frac{3}{2} \left(\frac{14}{15v_i}\right)^{\frac{2}{3}} \left(\frac{\mathcal{A}_i}{d_i - \lambda_i}\right)^{\frac{1}{3}}.$$

Indeed, the provider dispatch control system 106 can utilize the above equation in the maximization problem (described above) to maximize a transportation-mode value improvement metric and to identify a number of provider devices in a prioritized transportation dispatch mode. In some embodiments, the provider dispatch control system 106 utilizes a similar provider device and demand density for neighboring locations of the location and accounts for this in the estimation of P12$_i(\lambda_i)$.

Furthermore, in some embodiments, the provider dispatch control system 106 can identify bottlenecks at one or more locations. In particular, the provider dispatch control system 106 can determine that a number of provider devices arriving at a location is greater than a demand of transportation requests at the location. For instance, the provider dispatch control system 106 can, at each location i, capture $\lambda_i = \alpha p_i$ transportation requests from a demand. If $\lambda_i > d_i$, the provider dispatch control system 106 can determine that a bottleneck exists at location i. For example, the provider dispatch control system 106 can identify a location i that limits the value of $\alpha$ (e.g., a maximum number of hourly transportation requests in a geographical area) using the following equation:

$$\alpha p_i \leq d_i \ \forall i \in \mathcal{L} \Leftrightarrow \alpha \leq \min_i \frac{d_i}{p_i}.$$

In some embodiments, the provider dispatch control system 106 can relocate prioritized dispatch mode provider devices, utilize location restriction for the prioritized dispatch mode provider devices, and/or destination control approaches (in accordance with one or more embodiments) for the prioritized dispatch mode provider devices in response to identifying bottlenecks between one or more locations.

As mentioned above, the provider dispatch control system 106 can maximize a transportation-mode value improvement metric for (or utilization of) provider devices in a prioritized transportation dispatch mode by restricting locations for the provider devices (e.g., to remove bottlenecks). For example, as shown in FIG. 11D, the provider dispatch control system 106 identifies a number of provider device slots 1130a and a corresponding transportation-mode value improvement metric 1130b using the location restriction transportation dispatch mode 1128. As illustrated in FIG. 11D, the provider dispatch control system 106 first determines provider device flows (between locations) from the historical data while using the location restriction transportation dispatch mode 1128. Subsequently, the provider dispatch control system 106 restricts location(s) (for provider devices in the prioritized transportation dispatch mode) under the location restriction transportation dispatch mode 1128. Finally, the provider dispatch control system 106 determines a number of provider device slots based on a transportation-mode value improvement metric and the restricted location(s) using optimization (to find a maximized transportation-mode value improvement metric under the location restriction transportation dispatch mode implementation as described below).

Indeed, the provider dispatch control system 106 can model behavior of provider devices with restricted locations to determine a maximized transportation-mode value improvement metric and a corresponding number of provider device slots for the prioritized transportation dispatch mode. In some embodiments, the provider dispatch control system 106 utilizes integer optimization to determine an optimal location service area design for the prioritized transportation dispatch mode (e.g., to maximize transportation-mode value improvement metric or a provider device utilization).

For example, the provider dispatch control system 106 can determine a maximized transportation-mode value improvement metric utilizing the following integer optimization formulation:

$$\max_{\lambda, \alpha, b} \sum_{ij} \lambda_{ij} \left( (1-\gamma)P3_{ij} - \gamma \left( w_i + \frac{3}{2} \left( \frac{14}{15 v_i} \right)^{\frac{2}{3}} \left( \frac{\mathcal{A}_i}{d_i - \lambda_i} \right)^{\frac{1}{3}} \right) \right).$$

In particular, the provider dispatch control system 106 can utilize a flow of transportation provider taking transportation requests from location i to j ($\lambda_{ij}$) as being greater than 0. Furthermore, the provider dispatch control system 106 can represent a fraction of the transportation request demand flow in location i that is fulfilled as $0 \leq \alpha_i \leq 1$. In addition, in reference to the above integer optimization formulation, the provider dispatch control system 106 can utilize a variable $b_i \in \{0,1\}$ where the provider dispatch control system 106 restricts (or removes) location i when $b_i=0$, or otherwise keeps location i when $b_i=1$.

Moreover, the provider dispatch control system 106 determines (or represents) a provider device flow balance at each location:

$$\Sigma_j \lambda_{ij} = \Sigma_j \lambda_{j,i} = \lambda_i \ \forall i \in \mathcal{L}.$$

For example, in one or more embodiments, the provider dispatch control system 106 utilizes a provider device flow of $\lambda_{ij} \leq \alpha_i d_{ij}$. Indeed, the provider dispatch control system 106 can discontinue a flow of provider devices when a location is restricted (e.g., $\lambda_{ij} \leq d_{ij} b_j$). Furthermore, in some embodiments, the provider dispatch control system 106 utilizes a flow of provider devices $\lambda_{ij} = \alpha_i d_{ij}$ (e.g., where $\lambda_{ij} \geq d_{ij}(\alpha_i + b_j - 1)$). Indeed, the provider dispatch control system 106 can utilize the above integer optimization formulation with linear constraints and non-linear (although concave) maximization objectives to determine a maximized transportation-mode value improvement metric for (or utilization of) provider devices in a prioritized transportation dispatch mode and a corresponding number of provider device slots for the prioritized transportation dispatch mode. In some embodiments, the provider dispatch control system 106 solves the above integer optimization formulation with a non-linear integer optimization solver.

Additionally, in some embodiments, the provider dispatch control system 106 can determine a maximized transportation-mode value improvement metric for (or utilization of) provider devices in a prioritized transportation dispatch mode and a corresponding number of provider device slots for the prioritized transportation dispatch mode in a location restriction approach by utilizing a greedy heuristic. For instance, the provider dispatch control system 106 can restrict one location at a time to evaluate a result of the maximization problem for maximizing a transportation-mode value improvement metric (as described above) due to the restricted location. Then, the provider dispatch control system 106 can determine a one or more restricted locations and a number of provider device slots for the prioritize transportation dispatch mode that will have the location restrictions after evaluating the results.

For example, the provider dispatch control system 106 can determine a maximized transportation-mode value improvement metric with all locations available. Then, the provider dispatch control system 106 can select a single location to restrict (until each location has been evaluated) to evaluate the maximization problem in light of the restricted location. In particular, after selecting a location to restrict, the provider dispatch control system 106 can utilize the maximization problem to determine a maximized transportation-mode value improvement metric and/or a number of provider device slots for the prioritized transportation dispatch mode resulting from the restricted location. If the restricted location results in a better maximized transportation-mode value improvement metric, the provider dispatch control system 106 restricts the location and evaluates the next location to restrict until each location has been evaluated. If the restricted location does not result in a better maximized transportation-mode value improvement metric, the provider dispatch control system 106 does not restrict the location and evaluates the next available location. In one or more embodiments, the provider dispatch control system 106 utilizes this approach to remove one or more locations with a bottleneck and/or a high P1/P2 time.

As mentioned above, the provider dispatch control system 106 can also utilize a destination control approach for provider devices in a prioritized transportation dispatch mode. For example, as shown in FIG. 11D, the provider dispatch control system 106 identifies a number of provider device slots 1134a and a corresponding transportation-mode value improvement metric 1134b using the destination control transportation dispatch mode 1132. As shown in FIG. 11D, the provider dispatch control system 106 modifies provider device location probabilities from the historical data while using the destination control transportation dispatch mode 1134. Then, the provider dispatch control system 106 estimates P1 and P2 times with the modified provider device location probabilities under the destination control transportation dispatch mode 1132. Finally, the provider dispatch control system 106 determines a number of provider device slots based on a transportation-mode value improvement metric using optimization (to find a maximized transportation-mode value improvement metric under the destination control transportation dispatch mode implementation as described below).

In particular, the provider dispatch control system 106 can prioritize selecting transportation requests corresponding to particular destination locations and control (or reduce) selection of other transportation requests corresponding to destination locations that are associated with a low utilization (or transportation-mode value improvement metric) for prioritized provider devices. For example, the provider dispatch control system 106 can control the number of matches for transportation requests corresponding to destination locations that will result in a lower utilization or transportation-mode value improvement metric for provider devices belonging to the prioritized transportation dispatch mode.

In some embodiments, the provider dispatch control system 106 models historical data to maximize the transportation-mode value improvement metrics or provider device utilization metrics by modifying (provider device) destination location probabilities for one or more locations. In particular, the provider dispatch control system 106 can determine one or more provider device flows A and estimate P1 and P2 times that maximize the transportation-mode value improvement metrics or provider device utilization metrics. By doing so, the provider dispatch control system 106 can determine destination control rules that result in a maximized transportation-mode value improvement metrics or provider device utilization metrics and a number of provider device slots to utilize for a prioritized transportation dispatch mode in the geographical area.

In one or more embodiments, the provider dispatch control system 106 can control destination locations for provider devices in the prioritized transportation dispatch mode (at a starting location) by limiting a number of provider devices that are assigned transportation requests to a first location while favoring (prioritizing) a second location. Indeed, in some embodiments, the provider dispatch control system 106 selects transportation requests corresponding to the first location (the controlled location) when the P1 and/or P2 time is low while selecting transportation requests corresponding to the second location (the prioritized location) even when the P1 and/or P2 time is higher.

For instance, in order to model and estimate destination control rules that result in a maximized transportation-mode value improvement metrics or provider device utilization metrics and a number of provider device slots to utilize for a prioritized transportation dispatch mode, the provider dispatch control system 106 can artificially reduce a demand of transportation requests between a location and a destination location for the prioritized provider devices. For example, the provider dispatch control system 106 can control provider devices traveling from a location B to a location C by reducing the demand level $d_{BC}$ (e.g., if the demand was 30 transportation requests, the provider dispatch control system 106 can artificially reduce the demand to 10 transportation requests). Then, the provider dispatch control system 106 can evaluate the maximization problem (as described above) in light of the reduced demand.

Indeed, as described above, the provider dispatch control system 106 can model provider device arrivals as Poisson processes. As such, in some embodiments, the provider dispatch control system 106 artificially reduces the demand between two locations by randomly rejecting a proportion of provider devices that travel between the two locations (from the prioritized transportation dispatch mode) (e.g., using a splitting property of the Poisson process). In particular, the provider dispatch control system 106 controls how many provider devices go to a particular destination location by randomly rejecting some of the provider devices based on a proportion. In one or more embodiments, the provider devices that are selected to be rejected for travel between the two locations are selected using distance from the destination location or pickup location. By doing so, the provider dispatch control system 106 in one or more embodiments, generates a reduced demand $\bar{d}$ (e.g., that verifies $\bar{d}_{ij} \leq d_{ij}$) to change destination location probabilities at each location and to maximize transportation-mode value improvement metrics or provider device utilization metrics.

Furthermore, in one or more embodiments, the provider dispatch control system 106 can estimate P1 and P2 times for the modeled data to determine the maximized transportation-mode value improvement metrics or provider device utilization metrics and a number of provider device slots to utilize for a prioritized transportation dispatch mode. In particular, the provider dispatch control system 106 can estimate P1 and P2 times using the modified demand $\bar{d}$. For example, the provider dispatch control system 106 can minimize P1 and P2 to estimate $P12_{ij}(\lambda_{ij})$ by utilizing the following equation:

$$P12_i((\lambda_{ij})_j) = w_i + \frac{3}{2}\left(\frac{14}{15v_i}\right)^{\frac{2}{3}}\left(\frac{\mathcal{A}_i}{\sum_j \bar{d}_{ij} - \sum_j \lambda_{ij}}\right)^{\frac{1}{3}}.$$

As shown in the above equation, the provider dispatch control system 106 utilizes the modified demand $\bar{d}$. Indeed, the provider dispatch control system 106 utilizes the above equation, given target provider device flows $(\lambda_{ij})_j$ leaving from location i, to identify (or determine) the highest possible values $\bar{d}_{ij}$ that verify the desired destination probability (i.e., a $\bar{d}_{ij}$ that is proportional to $\lambda_{ij}$).

Furthermore, the provider dispatch control system 106 can identify (or determine) a highest possible constant $A_i$ such that:

$$\bar{d}_{ij} = A_i \lambda_{ij} \;\forall j \in \mathcal{L}.$$

In one or more embodiments, the provider dispatch control system 106 utilizes a constant $\lambda_i$ that respects the following constraints:

$$A_i \lambda_{ij} \leq d_{ij} \;\forall j \in \mathcal{L}.$$

As such, the provider dispatch control system 106 can utilize a constant $A_i$ and a modified demand $\bar{d}_{ij}$ in accordance with the following equations:

$$A_i = \min_j \frac{d_{ij}}{\lambda_{ij}} \text{ and } \bar{d}_{ij} = \lambda_{ij} \min_j \frac{d_{ij}}{\lambda_{ij}}.$$

Indeed, the provider dispatch control system 106 can utilize this constant $A_i$ and modified demand $\bar{d}_{ij}$ to minimize P1 and P2 to estimate $P12_{ij}(\lambda_{ij})$ (e.g., a destination controlled wait time that allows the use of flows $\lambda_{ij}$ that may not respect the origin destination probability) by utilizing the following equation:

$$P12_i((\lambda_{ij})_j) = w_i + \frac{3}{2}\left(\frac{14}{15v_i}\right)^{\frac{2}{3}}\left(\frac{\mathcal{A}_i}{\sum_j \lambda_{ij}\left(\min_j \frac{d_{ij}}{\lambda_{ij}} - 1\right)}\right)^{\frac{1}{3}}.$$

Upon estimating a $P12_{ij}(\lambda_{ij})$ value, the provider dispatch control system 106 can utilize an optimization formulation to maximize transportation-mode value improvement metrics or provider device utilization metrics and to select a corresponding number of provider device slots from using a destination control approach for the prioritized transportation dispatch mode. In particular, the provider dispatch control system 106 can utilize the estimated $P12_{ij}(\lambda_{ij})$ with the maximization problem (described above as P3–γ(P12+P3)) to maximize a transportation-mode value improvement metric using the following equation:

$$\max_\lambda \sum_{ij} \lambda_{ij}\left((1-\gamma)P3_{ij} - \gamma\left(w_i + \frac{3}{2}\left(\frac{14}{15v_i}\right)^{\frac{2}{3}}\left(\frac{\mathcal{A}_i}{\sum_j \lambda_{ij}\left(\min_j \frac{d_{ij}}{\lambda_{ij}} - 1\right)}\right)^{\frac{1}{3}}\right)\right)$$

where $0 \leq \lambda_{ij} \leq d_{ij} \;\forall i, j \in \mathcal{L}$ and

-continued $$\sum_j \lambda_{ij} = \sum_j \lambda_{j,i} \ \forall \ i \in \mathcal{L}.$$

In one or more embodiments, the provider dispatch control system 106 utilizes the aforementioned optimization problem to determine a flow of provider devices throughout the dynamic transportation matching system 104 (e.g., at multiple geographical locations). The provider dispatch control system 106 also can determine the demand restrictions (e.g., the destination control demands $$\bar{d}_{ij} = \lambda_{ij} \min_j d_{ij}/\lambda_{ij})$$

that are implemented for the provider devices in the prioritized transportation dispatch mode when selecting a provider device for a transportation request. Furthermore, the provider dispatch control system 106 can utilize the above optimization problem to determine (or identify) provider device utilizations, transportation-mode value improvement metrics for the modeled prioritized transportation dispatch mode, and/or a number of provider device slots for the prioritized transportation dispatch mode (e.g., in relation to FIG. 3A).

Furthermore, the provider dispatch control system 106 can determine optimal solutions to the above optimization problem by utilizing a projected subgradient descent. For instance, the provider dispatch control system 106 can add a variable $\alpha_i$ (e.g., $1/\alpha_i$) to replace the minimum term $$\min_j \frac{d_{ij}}{\lambda_{ij}}.$$

In particular, the provider dispatch control system 106 can to maximize a transportation-mode value improvement metric by utilizing the following optimization formulation:

$$\max_{\lambda,\alpha} \sum_{ij} \lambda_{ij} \left( (1-\gamma)P3_{ij} - \gamma \left( w_i + \frac{3}{2}\left(\frac{14}{15v_i}\right)^{\frac{2}{3}} \left(\frac{\mathcal{A}_i}{\sum_j \lambda_{ij}(1/\alpha_i - 1)}\right)^{\frac{1}{3}}\right)\right)$$

where $0 \leq \lambda_{ij} \leq d_{ij} \ \forall \ i, j \in \mathcal{L}$, $$\sum_j \lambda_{ij} = \sum_j \lambda_{j,i} \quad \forall \ i \in \mathcal{L},$$

$\lambda_{ij} \leq \alpha_i d_{ij}$, and $0 \leq \alpha_i \leq 1.$

Indeed, the provider dispatch control system 106 can utilize a variable $\alpha_i$ as the maximum fraction of demand taken across all destination locations. The provider dispatch control system 106 can solve the above optimization formulation with a projected subgradient descent paired with an accelerated algorithm (e.g., an Adam optimizer).

In some embodiments, the provider dispatch control system 106 utilizes a linear programming heuristic to maximize transportation-mode value improvement metrics or provider device utilization metrics and to select a corresponding number of provider device slots from using a destination control approach for the prioritized transportation dispatch mode. In particular, in one or more embodiments, the provider dispatch control system 106 utilize wait times $P12_i$ with a lower bound in accordance with the following:

$$P12_i = w_i + \left(\frac{14}{15v_i}\right)^{\frac{2}{3}} \left(\frac{\mathcal{A}_i}{d_i}\right)^{\frac{1}{3}}.$$

Then, the provider dispatch control system 106 can optimize the destination controlled demand values $\bar{d}_{ij}$. Indeed, the provider dispatch control system 106 can identify a destination controlled demand value that maximizes transportation-mode value improvement metrics or provider device utilization metrics using a constant $P12_i$ values. For example, the provider dispatch control system 106 utilize such an approach to determine an approximation of the transportation-mode value improvement metrics in accordance with the following formulation:

$$\max_{\bar{d}} \sum_{ij} \bar{d}_{ij}((1-\gamma)P3_{ij} - \gamma P12_i),$$

where $0 \leq \bar{d}_{ij} \leq d_{ij} \ \forall \ i, j \in \mathcal{L}$ and $$\sum_j \bar{d}_{ij} = \sum_j \bar{d}_{ij} \quad \forall \ i \in \mathcal{L}.$$

Subsequently, the provider dispatch control system 106 can determine a $\lambda$ (e.g., a provider device flow) by utilizing the controlled demand value with the integer optimization formulation (e.g., described above in relation to location restriction). Furthermore, the provider dispatch control system 106 can iterate the above approach and replace the constant $P12_i$ values by their values from a previous iteration. By utilizing the above approach, the provider dispatch control system 106 can quickly and efficiently determine maximized transportation-mode value improvement metrics or provider device utilization metrics and select a corresponding number of provider device slots from using a destination control approach for the prioritized transportation dispatch mode (e.g., by solving a linear program in addition to the one dimensional maximization problem described above) from modeled historical data. In some embodiments, the provider dispatch control system 106 can utilize the linear programming heuristic to determine quicker results compared to the subgradient descent approach.

Although one or more embodiments describe the provider dispatch control system 106 maximizing a transportation-mode value improvement metric to identify a number of provider device slots via the various prioritized transportation dispatch mode algorithms, the provider dispatch control system 106 can identify the number of provider device slots by maximizing various other metrics. For instance, the provider dispatch control system 106 can identify a number of provider device slots via the various prioritized transportation dispatch mode algorithms that maximizes a multi-outcome transportation-value metric (in the historical data). Indeed, by doing so, the provider dispatch control system 106 can identify a number of provider device slots for the prioritized transportation dispatch mode based on a multi-outcome transportation-value metric (e.g., an implementation of the prioritized transportation dispatch mode that results in a threshold or greatest multi-outcome transportation-value metric in the historical data).

Additionally, as previously mentioned, the provider dispatch control system 106 can generate a provider device utilization model from the historical data to identify a number of provider device slots. As used herein, the term "utilization model" (sometimes referred to as "provider device utilization model") refers to a computer-implemented algorithm, function, or representation that relates utilization metrics and a number of provider devices utilizing a transportation dispatch mode. For example, a utilization model can include a function (or graph) that outputs an estimated provider device utilization metric for an input number of provider devices within a transportation dispatch mode (e.g., a trade-off curve between a provider device utilization metric and a number of provider devices within the transportation dispatch mode).

Figure 11E:
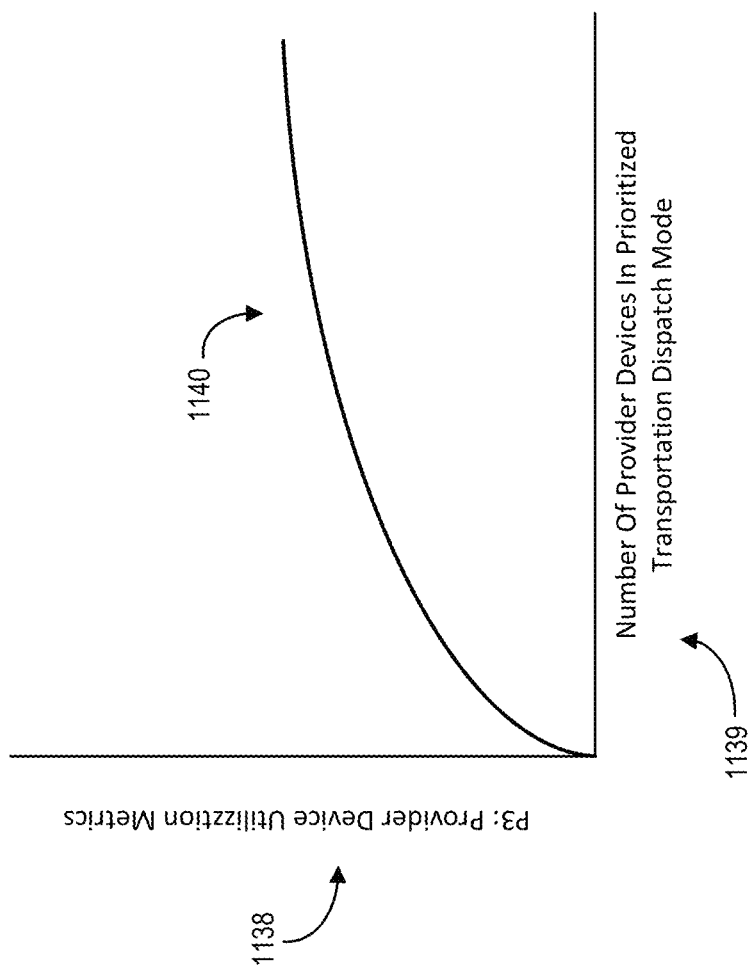

For instance, as shown in FIG. 11E, the provider dispatch control system 106 can utilize results from the modeled historical data to generate a trade-off curve 1140 (as a utilization model). In particular, the provider dispatch control system 106 can utilize one or more of the approaches described above to determine an estimated provider device utilization metric 1138 for a given (or selected) number of provider devices in a prioritized transportation dispatch mode 1139. Indeed, the provider dispatch control system 106 can utilize the trade-off curve 1140 to determine a number of provider device slots for the prioritized transportation dispatch mode in terms of a desired provider device utilization metric. Although FIG. 11E illustrates a trade-off curve in terms of provider device utilization, the provider dispatch control system 106 can similarly utilize a trade-off curve in terms of various rewards (in accordance with one or more embodiments) such as a transportation-mode value improvement metric, a multi-outcome transportation-value metric, or a total estimated monetary value from transportation requests due to a selected number of provider device slots for the prioritized transportation dispatch mode.

Additionally, in one or more embodiments, the provider dispatch control system 106 can model historical data to estimate one or more metrics (as described above) while accounting for ETA constraints. In particular, the provider dispatch control system 106 can select a provider device for a transportation device from the prioritized transportation dispatch mode when the transportation request is below a threshold ETA (in addition to one or more selection criteria in accordance with one or more embodiments herein). Indeed, the provider dispatch control system 106 select a provider device that is below a threshold ETA to prevent selection of a provider device that may result in an abnormal ETA for the transportation request. The provider dispatch control system 106 can utilize such an ETA constraint when estimating the one or more metrics (as described above) to select a number of provider device slots for a prioritized transportation dispatch mode.

Furthermore, in some embodiments, the provider dispatch control system 106 utilizes historical data to estimate one or more metrics (as described above) for another transportation dispatch mode (e.g., a non-prioritized transportation dispatch mode). The provider dispatch control system 106 can utilize the estimated metrics from the other transportation dispatch mode to improve modeled estimated metrics determined for the prioritized transportation dispatch mode. In addition, the provider dispatch control system 106 can also account for consequences on provider devices that are not within the prioritized transportation dispatch mode when utilizing the model based on historical data to estimate the one or more metrics of using the prioritized transportation dispatch mode (e.g., with various numbers of provider device slots in the prioritized transportation dispatch mode).

Although one or more embodiments above model historical data for a geographical area to identify a number of provider device slots for the geographical area, the provider dispatch control system 106 can utilize the above approach for a number of geographical areas. Indeed, in some embodiments, the provider dispatch control system 106 can identify a number of provider device slots for numerous markets of the dynamic transportation matching system 104 as the various geographical areas. Additionally, the provider dispatch control system 106 can utilize a varying sizes of geographical areas (e.g., via location clustering to account for different geohash sizes) to identify different numbers of provider device slots for specific geographical areas.

As mentioned above, the provider dispatch control system 106 can select provider devices for a prioritized transportation dispatch mode. In particular, the provider dispatch control system 106 can identify and select one or more provider devices for a number of provider device slots corresponding to the prioritized transportation dispatch mode. For instance, the provider dispatch control system 106 can analyze one or more performance metrics that correspond to identified provider devices. Subsequently, the provider dispatch control system 106 can select from the provider devices based on the analyzed performance metrics.

Figure 12:
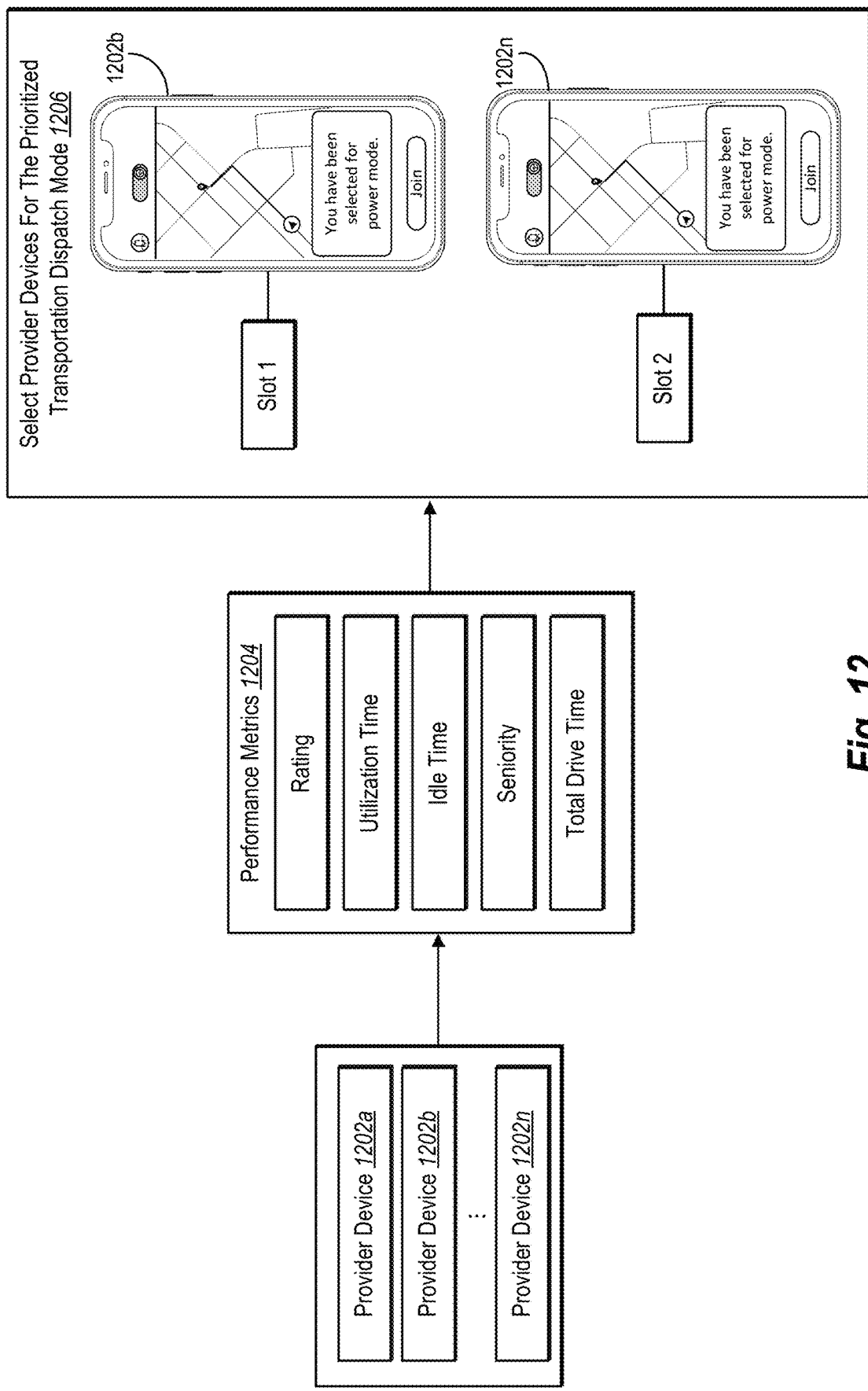
FIG. 12 illustrates a diagram of the provider dispatch control system selecting provider devices for a prioritized transportation dispatch mode in accordance with one or more embodiments.

For example, FIG. 12 illustrates the provider dispatch control system 106 selecting provider devices for a prioritized transportation dispatch mode. As shown in FIG. 12, the provider dispatch control system 106 identifies a set of provider devices 1202a-1202n (e.g., that correspond to a geographical area). Furthermore, as illustrated in FIG. 12, the provider dispatch control system 106 analyzes performance metrics 1204 for each provider device from the set of provider devices 1202a-1202n. In particular, as shown in FIG. 12, performance metrics 1204 include ratings, utilization times, idle times, (driver) seniority, and/or total drive times that correspond to the set of provider devices 1202a-1202n. Indeed, as illustrated in FIG. 12 (in an act 1206), the provider dispatch control system 106 selects provider device 1202b for a first slot in the prioritized transportation dispatch mode and selects provider device 1202n for a second slot. Then, as shown in FIG. 12, the provider dispatch control system 106 provides digital invitations to join (e.g., with a selectable option to join) the prioritized transportation dispatch mode for display on the provider devices 1202b and 1202n.

For instance, in one or more embodiments, the provider dispatch control system 106 identifies a rating associated with a provider device (e.g., driver rating). In particular, the provider dispatch control system 106 can identify and analyze a driver rating that is created by the dynamic transportation matching system 104. For example, the provider dispatch control system 106 can base a driver rating on various other factors of the provider device such as, but not limited to, earnings, passenger reviews/feedback, drive time, efficiency, and/or other factors described below.

Additionally, the provider dispatch control system 106 can also identify and analyze a utilization time corresponding to a provider device (e.g., driver utilization time). In particular, the provider dispatch control system 106 can identify and analyze a utilization time as described above (e.g., a time within a P3 state). For example, the provider dispatch control system 106 can identify an average utilization time that is associated with a provider device (e.g., across a set of transportation requests fulfilled by the provider device). In some embodiments, the provider dispatch control system 106 also identifies and analyzes a total drive time. For instance, the provider dispatch control system 106 can determine an accumulated amount of time associated with the provider device actively fulfilling transportation requests (e.g., a total amount of time in a P3 state). In some embodiments, the provider dispatch control system 106 can determine a total earnings from the provider device based on the utilization time and/or total driver time.

Furthermore, the provider dispatch control system 106 can identify and analyze a driver idle time corresponding to a provider device. More specifically, the provider dispatch control system 106 can identify and analyze an amount of time the provider device is within an idle state (e.g., not fulfilling transportation requests). Indeed, the provider dispatch control system 106 can identify and analyze a total driver idle time or an average driver idle time (e.g., the average amount of time the provider device waits in between transportation requests).

Moreover, the provider dispatch control system 106 can identify and analyze driver seniority associated with a provider device. In particular, the provider dispatch control system 106 can identify and analyze the amount of time a provider device has been actively using a dynamic transportation matching application of the dynamic transportation matching system 104. For example, the driver seniority can include an amount of time (or age) in which the provider device has been fulfilling transportation requests using the dynamic transportation matching application of the dynamic transportation matching system 104.

In one or more embodiments, the provider dispatch control system 106 analyzes one or more of the above mentioned performance metrics to rank provider devices in order for selection in the prioritized transportation dispatch mode. In particular, the provider dispatch control system 106 can determine weights and scores associated with the one or more performance metrics to rank a provider device respective to other provider devices. For example, the provider dispatch control system 106 can determine a greater weight for driver rating and driver utilization time and provider a higher rank to provider devices corresponding to higher driver ratings and driver utilization times. Indeed, the provider dispatch control system 106 can utilize performance metrics associated with the provider devices to generate a ranked list of provider devices. Then, the provider dispatch control system 106 can select provider devices for a number of provider device slots of a prioritized transportation dispatch mode by selecting from the ranked list of provider devices (e.g., beginning from a top ranked provider device).

In some embodiments, the provider dispatch control system 106 can utilize one or more thresholds associated with the provider device performance metrics to select the provider devices for the provider device slots in the prioritized transportation dispatch mode. For instance, the provider dispatch control system 106 can analyze performance metrics associated with a provider device to identify whether they meet thresholds for those performance metrics. Then, the provider dispatch control system 106 can select the provider device for the prioritized transportation dispatch mode if the performance metrics do meet the thresholds for the performance metrics. For example, the provider dispatch control system 106 can compare a driver utilization time of a provider device to a threshold driver utilization time. Moreover, the provider dispatch control system 106 can select the provider device if the provider device's driver utilization time meets a threshold driver utilization time.

Indeed, the provider dispatch control system 106 can select a provider device for the prioritized transportation dispatch mode upon identifying whether one or more performance metrics meet respective thresholds for those performance metrics. In some embodiments, the provider dispatch control system 106 selects the provider device when each of these thresholds are met. In one or more embodiments, the provider dispatch control system 106 selects the provider device when at least one (or some other threshold number) of performance metric thresholds are met. Indeed, the provider dispatch control system 106 can determine thresholds for the performance metrics based on an analysis of historical data (e.g., in accordance with one or more embodiments herein) or can receive the thresholds from an administrator of the dynamic transportation matching system 104.

In addition, the provider dispatch control system 106 can utilize various combinations of performance metrics to select one or more provider devices for the prioritized transportation dispatch system. For example, the provider dispatch control system 106 can utilize each or various subsets of the performance metrics described in one or more embodiments. Furthermore, the provider dispatch control system 106 can also utilize various other performance metrics associated with the provider devices to select one or more provider devices for the prioritized transportation dispatch system.

In some embodiments, the provider dispatch control system 106 can utilize machine learning to analyze performance metrics and select one or more provider devices for the prioritized transportation dispatch mode. In particular, the provider dispatch control system 106 can utilize a machine learning model (e.g., a neural network based model) to select provider devices that is likely to maximize a transportation-mode value improvement metric (as described above) by analyzing performance metrics of the provider device with the historical data in the geographical area corresponding to the prioritized transportation dispatch mode. Indeed, the provider dispatch control system 106 can utilize a variety of machine learning models to analyze performance metrics and select one or more provider devices for the prioritized transportation dispatch mode.

In one or more embodiments, the provider dispatch control system 106 can select one or more provider devices for the prioritized transportation dispatch mode using a first come, first serve approach. For instance, the provider dispatch control system 106 can detect a provider device becoming active on the dynamic transportation matching application and select the provider device for the prioritized transportation dispatch mode. Indeed, the provider dispatch control system 106 can utilize the first come, first serve approach to select provider devices for each available slot of the prioritized transportation dispatch mode. In some embodiments, the provider dispatch control system 106 removes a provider device from the prioritized transportation dispatch mode upon detecting the provider device becoming inactive (or logging off) on the dynamic transportation matching application.

In addition, the provider dispatch control system 106 can actively select provider devices for the prioritized transportation dispatch mode to maintain provider devices within the maximum number of provider device slots corresponding to the prioritized transportation dispatch mode. In some embodiments, the provider dispatch control system 106 can dynamically control the number of provider devices selected by actively determining a number of provider device slots for the prioritized transportation dispatch mode (in accordance with one or more embodiments). For example, the provider dispatch control system 106 can determine a change in a number of provider device slots (in accordance with one or more embodiments) and select (or remove) provider devices for (or from) the prioritized transportation dispatch mode in accordance with the newly determined number of provider device slots.

Furthermore, in some embodiments, the provider dispatch control system 106 can select a provider device for the prioritized dispatch mode even when the provider device is selected for a transportation request in another transportation dispatch mode. In addition, the provider dispatch control system 106 can select a provider device for the prioritized transportation dispatch mode for a predetermined amount of time. For example, the provider dispatch control system 106 can select a provider device for the prioritized transportation dispatch mode for a predetermined time interval (e.g., half hour, one hour, two hours).

Upon selecting a provider device for the prioritized transportation dispatch mode, the provider dispatch control system 106 can transmit a digital invitation to join the prioritized transportation dispatch mode to the selected provider device. For instance, the provider dispatch control system 106 can transmit the digital invitation to cause the provider device to display the digital invitation within a user interface of a dynamic transportation matching application. In some embodiments (e.g., as shown in FIG. 12), the provider dispatch control system 106 can provide for display a digital invitation that with a selectable option to join the prioritized transportation dispatch mode. Indeed, upon receiving an indication of a user interaction with the selectable option, the provider dispatch control system 106 can place the provider device in the prioritized transportation dispatch mode and match transportation requests in accordance with one or more embodiments (below).

In addition, the provider dispatch control system 106 can provide a variety of information for display on the digital invitation (or other user interface) of the prioritized transportation dispatch mode. For example, the provider dispatch control system 106 can provide for display a time interval for the prioritized transportation dispatch mode. In addition, the provider dispatch control system 106 can also transmit navigational information for a transportation request dispatched using the prioritized transportation dispatch mode.

Furthermore, the provider dispatch control system 106 can allocate a transportation provider compensation value to a provider device in the prioritized transportation dispatch mode that is different from the transportation provider compensation value of another transportation dispatch mode. As used herein, the term "transportation provider compensation value" refers to a value assigned to a provider device for compensation to transportation provider associated with the provider device. In particular, the term "transportation provider compensation value" can refer to an amount of monetary compensation or a rate of monetary compensation allocated to a provider device for fulfilling one or more transportation requests. For example, a transportation provider compensation value can include a pay rate for a transportation provider corresponding to a provider device.

For instance, the provider dispatch control system 106 can allocate a lower transportation provider compensation value (e.g., a lower compensation) per transportation request fulfilled in the prioritized transportation dispatch mode. In one or more embodiments, the provider dispatch control system 106 allocates the different transportation provider compensation value by utilizing a different compensation rate for the provider devices in the prioritized transportation dispatch mode. Indeed, the provider dispatch control system 106 can allocate the lower transportation provider compensation value to increase a gain (e.g., in terms of a transportation-mode value improvement metric) realized per transportation request from the prioritized transportation dispatch mode while maintaining or reducing the costs to requestor devices for the transportation requests. In addition, due to the increased (or efficient) provider device utilization within the prioritization transportation dispatch mode, the provider dispatch control system 106 enables a provider device to increase total earnings for the provider device account even while allocating a lower transportation provider compensation value. For example, the provider dispatch control system 106 can increase the number of transportation requests (or the efficiency of transportation requests) in the prioritized transportation dispatch mode to increase total earnings for provider devices while also allocating the lower transportation provider compensation value.

As mentioned above, the provider dispatch control system 106 can select a provider device to fulfill a transportation request by selecting the provider device from between a prioritized transportation dispatch mode and another transportation dispatch mode. For instance, in one or more embodiments, the provider dispatch control system 106 prioritizes a provider device that corresponds to the prioritized transportation dispatch mode for a transportation request using various approaches. For instance, the provider dispatch control system 106 can analyze prioritization metrics to adjust selection scores corresponding to provider devices in the prioritized transportation dispatch mode and/or determine when and where provider devices that are in the prioritized transportation dispatch mode are sent to particular destination locations (e.g., location restriction or destination control). By doing so, the provider dispatch control system 106 is able to increase the utilization of such provider devices and increase earnings for the dynamic transportation matching system 104 (and the provider devices) while maintaining or decreasing costs to requestors (or requestor devices).

For example, the provider dispatch control system 106 can analyze prioritization metrics corresponding to provider devices in the prioritized transportation dispatch mode in order to determine dispatch rules (i.e., a prioritized transportation dispatch mode algorithm) that increase provider device utilization, a transportation-mode value improvement metric, or multi-outcome transportation-value metric. In some embodiments, the provider dispatch control system 106 determines dispatch rules such as destination control, location restriction, and priority queueing (as described above in relation to FIGS. 11A and 11D) for the prioritized transportation dispatch mode. The provider dispatch control system 106 can analyze prioritization metrics to determine priority selection scores that result in dispatch rules that account for various combinations of destination control, location restriction, and/or priority queueing for the prioritized transportation dispatch mode provider devices.

For instance, in some embodiments, the provider dispatch control system 106 can determine prioritization metrics based on a destination location by restricting the location for provider devices in the prioritized transportation dispatch mode (e.g., location restriction transportation dispatch mode). In other words, the provider dispatch control system 106 can identify that a destination location (from a transportation request) corresponds to a location that is a potential bottleneck location (e.g., using the historical data modeling of FIG. 11D). Then, the provider dispatch control system 106 can determine prioritization metrics (e.g., set a priority selection score to a significantly low value such as zero) that rejects transportation requests to that location for provider devices in a prioritized transportation dispatch mode (e.g., provides the transportation requests to another transportation dispatch mode). In some embodiments, the provider dispatch control system 106 utilizes prioritization metrics that rejects every transportation request to the restricted location for the prioritized provider devices or randomly rejects a ratio of transportation requests to the restricted location.

In one or more embodiments, the provider dispatch control system 106 can determine prioritization metrics based on a destination location by controlling the number of transportation requests (for the destination location) given to the provider devices in the prioritized transportation dispatch mode (e.g., destination control transportation dispatch mode). In particular, the provider dispatch control system 106 can utilize historical data modeled for a destination location (e.g., as described above in relation to FIG. 11D) to determine whether to prioritize (or disincentivize) the destination location for the prioritized provider devices. For example, in some embodiments, the provider dispatch control system 106 can utilize prioritization metrics to increase priority selection scores (e.g., to prioritize the prioritized provider devices) for destination locations that are prioritized (e.g., are associated with a high modified demand from the modeled historical data in relation to FIG. 11D). In addition, the provider dispatch control system 106 can utilize prioritization metrics to decrease priority selections cores (e.g., to disincentivize the prioritized provider devices) for destination locations that are disincentivized (e.g., are associated with a low modified demand from the modeled historical data in relation to FIG. 11D).

In some embodiments, the provider dispatch control system 106 utilizes a priority queue for the provider devices in the prioritized transportation dispatch mode by determining prioritization metrics that prioritize the prioritized provider devices for each transportation request at a destination location (e.g., priority queueing transportation dispatch mode). In particular, the provider dispatch control system 106 can assign a transportation request to a provider device in the prioritized transportation dispatch mode before another provider device in another transportation dispatch mode. Additionally, in some embodiments the provider dispatch control system 106 can utilize a priority queue for the provider devices in the prioritized transportation dispatch mode within a sub-location of a location (as described in relation to FIG. 11D).

Figure 13A:
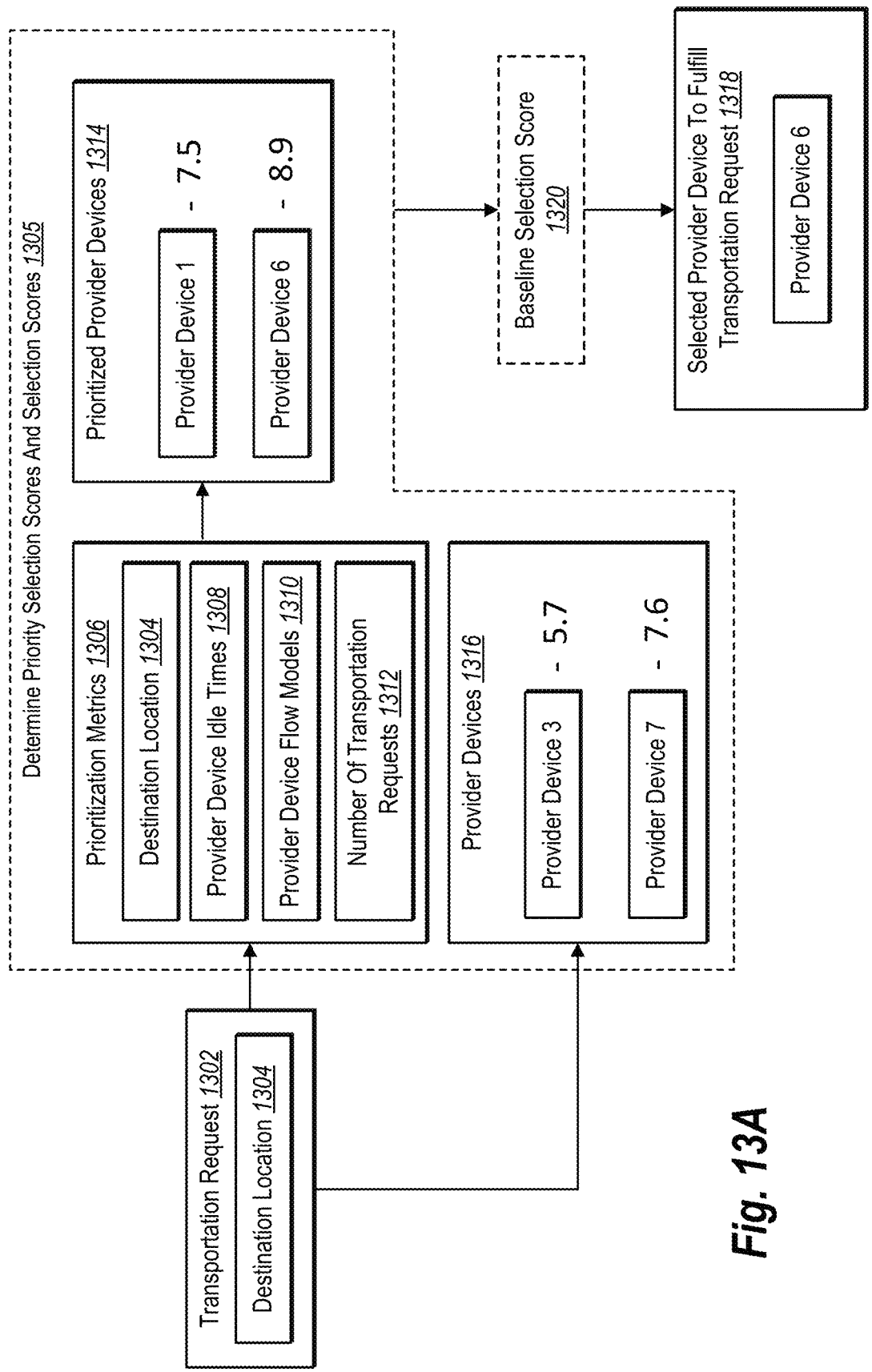
FIGS. 13A and 13B illustrate diagrams of the provider dispatch control system analyzing prioritization metrics to select a provider device from a prioritized transportation dispatch mode to fulfill a transportation request in accordance with one or more embodiments.

For example, FIG. 13A illustrates the provider dispatch control system 106 selecting a provider device to fulfill a transportation request by selecting the provider device from between a prioritized transportation dispatch mode and another transportation dispatch mode. As shown in FIG. 13A, the provider dispatch control system 106 can identify a transportation request 1302 and a destination location 1304 corresponding to the transportation request 1302. Then, the provider dispatch control system 106 can determine priority selection scores and selection scores in an act 1305 for prioritized provider devices 1314 (e.g., within a prioritized transportation dispatch mode) and provider devices 1316 (e.g., not within the prioritized transportation dispatch mode). As shown in FIG. 13A, the provider dispatch control system 106 can utilize the priority selection scores and the selection scores to select a provider device 1318 (e.g., provider device 6) to fulfill the transportation request.

Indeed, as further illustrated in FIG. 13A, the provider dispatch control system 106 can determine priority selection scores for the prioritized provider devices 1314 by analyzing (and/or applying) one or more prioritization metrics 1306. For example, as shown in FIG. 13A, the prioritization metrics 1306 can be based on the destination location 1304, provider device idle times 1308 at the destination location, provider device flow models 1310 at the destination location, and/or a number of transportation requests 1312 at the destination location. In some embodiments, the provider dispatch control system 106 analyzes the prioritization metrics 1306 to determine priority selection scores for the prioritized provider devices 1314 in a different manner than the selection scores for the provider devices 1316. Then, the provider dispatch control system 106 utilizes the priority selection scores and the selection scores to select the provider device 1318 (e.g., provider device 6) to fulfill the transportation request (e.g., from the prioritized transportation dispatch mode).

Furthermore, as illustrated in FIG. 13A, the provider dispatch control system 106 can also utilize a baseline selection score 1320 to select a provider device to fulfill a transportation request from between a prioritized transportation dispatch mode and a transportation dispatch mode. In particular, the provider dispatch control system 106 can determine a baseline selection score (e.g., a threshold) based on an analysis of historical data (e.g., in accordance with one or more embodiments herein) or from an administrator of the dynamic transportation matching system 104. Then, the provider dispatch control system 106 can compare the priority selection scores to the baseline selection score 1320 to determine whether to select a provider device from the prioritized transportation dispatch mode for the transportation request 1302.

In particular, the provider dispatch control system 106 can utilize a baseline selection score to determine whether a transportation request corresponds to a value that is sufficient to select a provider device from the prioritized transportation dispatch mode. For example, the provider dispatch control system 106 can avoid selecting a provider device from the prioritized transportation dispatch mode when priority selection scores corresponding to the prioritized transportation dispatch mode do not meet (or satisfy) the baseline selection score. In particular, the provider dispatch control system 106 selects a provider device from the other transportation dispatch mode. In some embodiments, the provider dispatch control system 106 utilizes a provider device from the prioritized transportation dispatch mode when one or more priority selection scores meet the baseline selection score.

In addition, in one or more embodiments, the provider dispatch control system 106 determines a selection score (e.g., a dispatch score) for a provider device by utilizing a probability of conversion and a value of a transportation request. For example, the provider dispatch control system 106 can determine a probability of conversion (e.g., a probability of whether a transportation request will be fulfilled or canceled). Additionally, the provider dispatch control system 106 can combine the probability of a conversion with a value of the transportation request (e.g., a value associated with the request after costs of fulfilling the transportation request) to generate the selection score. In one or more embodiments, the provider dispatch control system 106 utilizes a probability of conversion and/or value of a transportation request (e.g., as a result of travel to a pickup location, vehicle type, time of day, distance, ETA) that is specific to a provider device to determine the selection score for the provider device in relation to the transportation request.

Furthermore, the provider dispatch control system 106 can determine priority selection scores for provider devices in a prioritized transportation dispatch mode using selection scores and prioritization metrics. For instance, the provider dispatch control system 106 can first determine a selection score for a provider device in the prioritized transportation dispatch mode. Then, the provider dispatch control system 106 can analyze one or more prioritization metrics associated with the provider device to determine a priority selection score. Indeed, the provider dispatch control system 106 can utilize one or more prioritization metrics to increase or decrease selection scores to determine the priority selection scores (e.g., as described in FIGS. 14A and 14B). In addition, the provider dispatch control system 106 can utilize multi-outcome transportation-value metrics as a prioritization metric and increase or decrease selection scores to determine the priority selection scores (e.g., as described in FIG. 13B). By doing so, the provider dispatch control system 106 determines optimized matches between transportation requests and provider devices that evaluate beyond a reward of the transportation request itself to increase efficiency for prioritized transportation dispatch mode provider devices.

In some embodiments, the provider dispatch control system 106 utilizes a single prioritization metric criteria (e.g., destination location, provider device idle times, provider device flow models, or number of transportation requests) to determine priority selection scores. Additionally, in one or more embodiments, the provider dispatch control system 106 utilizes a combination of two or more prioritization metric criteria to determine priority selection scores. For example, the provider dispatch control system 106 can utilize provider device idle times at the destination location and a number of transportation requests at the destination location to determine a priority selection score for a provider device. Furthermore, in some embodiments, the provider dispatch control system 106 can determine most relevant prioritization metrics to utilize for determining priority selections scores based on the geographical area. For instance, the provider dispatch control system 106 can analyze different prioritization metrics for different geographical areas or zones.

Figure 13B:
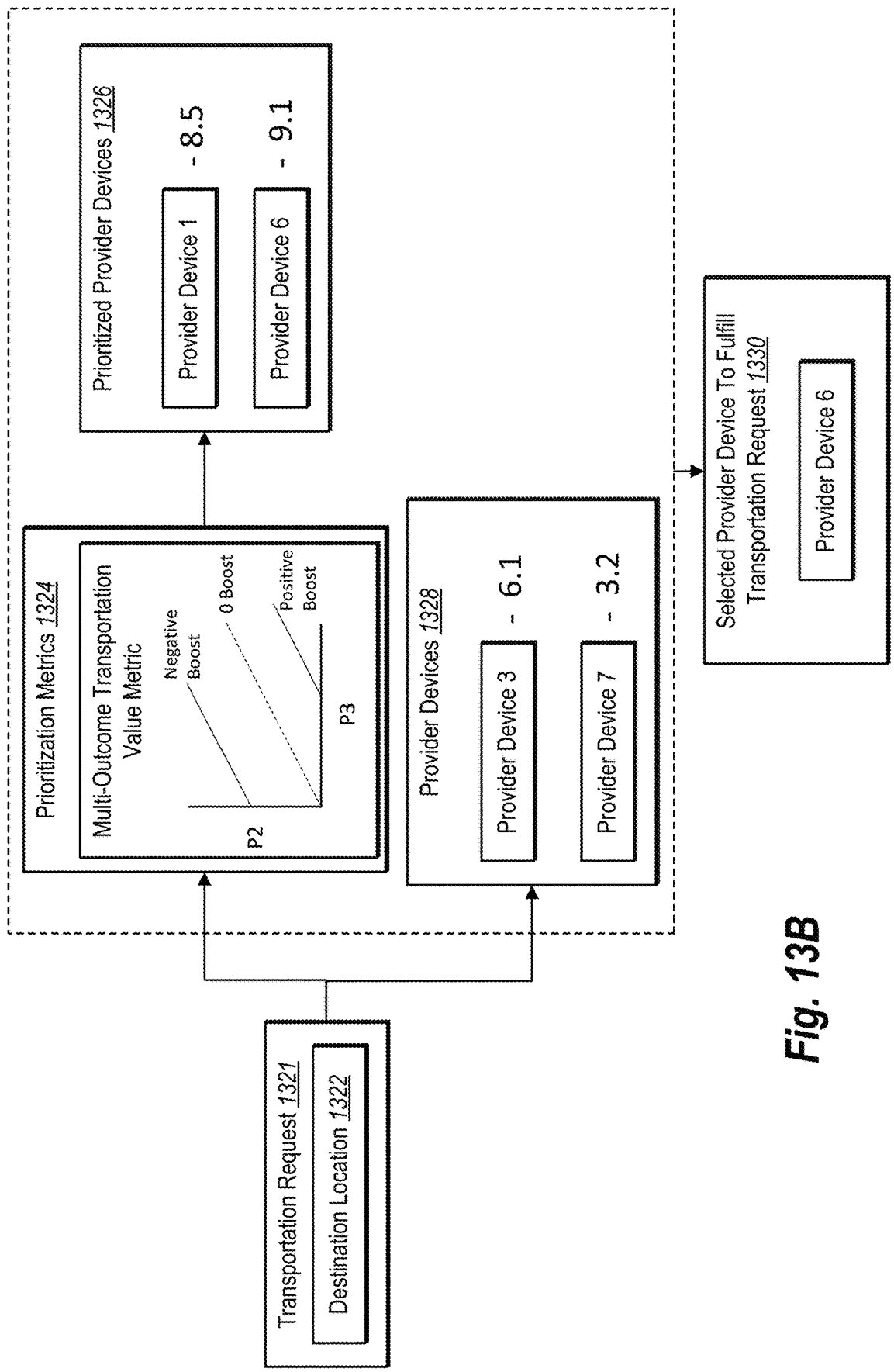

As mentioned above, the provider dispatch control system 106 can utilize (discounted) multi-outcome transportation-value metrics as prioritization metrics to increase or decrease selection scores to determine the priority selection scores. For instance, FIG. 13B illustrates the provider dispatch control system 106 utilizing multi-outcome transportation-value metrics to apply a positive or negative boost to a priority selection score for a provider device within a prioritized transportation dispatch mode. For instance, as shown in FIG. 13B, the provider dispatch control system 106 receives a transportation request 1321 which corresponds to a destination location 1322. Then, the provider dispatch control system 106 utilizes prioritization metrics 1324 (e.g., multi-outcome transportation-value metrics) to provide a positive or negative boost to selection scores of provider devices to generate priority selection scores (for the prioritized provider devices 1326).

Indeed, as illustrated in FIG. 13B, the provider dispatch control system 106 determines priority selection scores for the prioritized provider devices 1326 (in a prioritized transportation provider mode) using multi-outcome transportation-value metrics as prioritization metrics 1324. In addition, as shown in FIG. 13B, the provider dispatch control system 106 also determines selection scores for the provider devices 1328 (e.g., in another transportation provider mode). Subsequently, in reference to FIG. 13B, the provider dispatch control system 106 can compare the priority selection scores of the prioritized provider devices 1326 with the selection scores of the provider devices 1328. As shown in FIG. 13B, the provider dispatch control system 106 selects provider device 6 (in an act 1330) from the prioritized provider devices 1326 for the transportation request 1321 (e.g., based on the priority selection score being the highest).

In one or more embodiments, the provider dispatch control system 106 can determine a (discounted) multi-outcome transportation-value metric corresponding to a destination location using historical data. For instance, the provider dispatch control system 106 can determine a (discounted) multi-outcome transportation-value metric using historical outcomes and historical rewards (as described in one or more embodiments above). The provider dispatch control system 106 can utilize the determined multi-outcome transportation-value metric as a prioritization metric to determine whether to select a provider device from the prioritized transportation dispatch mode for the transportation request.

In particular, the provider dispatch control system 106 can determine a reward associated with the transportation request based on a probability of conversion and cancellation. In particular, the provider dispatch control system 106 can determine a score (s(P)) for the transportation request (or plan) by utilizing the following equation:

$$s(P) = \mathbb{P}(\text{conversion}) \times (\text{reward of given plan conversion}).$$

In particular, the provider dispatch control system 106 can score a plan having a set of outcomes o∈P. For each outcome o, the provider dispatch control system 106 can represent r(o) as the reward for the plan outcome and T(o) as the expected time of the end of the outcome (e.g., as the time of arrival at the destination location). Furthermore, the provider dispatch control system 106 can represent orig(P)=orig(o), dest(o)∈ $\mathcal{L}$ as the origin and destination of the plan outcome (e.g., the pickup location and destination location).

Furthermore, the provider dispatch control system 106 can represent, $\mathbb{P}$(o) as the probability of the outcome o of a supply plan. Indeed, a supply plan can include a potential set of actions for a provider device (e.g., doing nothing or staying in a P1 state, assignment of a transportation request, continuing an ongoing transportation request, an ordered assignment of multiple transportation requests, or a supply plan swap with another provider device). In addition, the provider dispatch control system 106 can represent t(o)=t(P) as the time at which the supply plan was created and/or assigned. Using these values, the provider dispatch control system 106 can score (e.g., a selection score) a supply plan as:

$$s(P) = \Sigma_{o \in P}(o)r(o).$$

Indeed, this supply plan score accounts for a reward of the supply plan and not for future outcomes after the supply plan. Additionally, in one or more embodiments, the provider dispatch control system 106 does not consider the cost of a P1 state in the score of the supply plan. In one or more embodiments, the provider dispatch control system 106 utilizes such a selection score (e.g., supply plan score) for the additional (or other) transportation dispatch mode.

Then, the provider dispatch control system 106 can determine a discounted multi-outcome transportation-value metric for a provider device in a prioritized transportation dispatch mode. For instance, the provider dispatch control system 106 can determine a discounted multi-outcome transportation-value metric as described above (e.g., $V_{i,t_0} = \mathbb{E}_{r,t} [\Sigma_{k \geq 1} e^{-\rho(t_k - t_0)} r_k |$ provider device is in location i at time $t_0$]). In some embodiments, the provider dispatch control system 106 can determine a multi-outcome transportation-value metric for each provider device or collectively for the provider devices in the prioritized transportation dispatch mode.

Then, the provider dispatch control system 106 can determine a priority selection score (e.g., a priority supply plan score) by combining the multi-outcome transportation-value metric (as a reward) with the conversion probability of the transportation request. For example, using the transportation request as the first outcome $o_1$, the provider dispatch control system 106 can determine the priority selection score s(P) using the following equation for the plan P that includes the transportation request:

$$s(P) = E\left[\sum_i r_{PM}(o_i) e^{-\rho(t(o_i) - t(o_1))} \,\middle|\, o_1 \in P\right] =$$

$$E\left[r_{PM}(o_1) + \sum_{i \geq 2} r_{PM}(o_i) e^{-\rho(t(o_i) - t(o_1))} \,\middle|\, o_1 \in P\right] =$$

$$\sum_{o \in P} P(o) E\left[r_{PM}(o_1) + \sum_{i \geq 2} r_{PM}(o_i) e^{-\rho(t(o_i) - t(o_1))} \,\middle|\, o_1 = o\right] = \sum_{o \in P} P(o)$$

$$\left(r_{PM}(o) + e^{-\rho T(o)} E\left[\sum_{i \geq 2} r_{PM}(o_i) e^{-\rho(t(o_i) + T(o) - t(o))} \,\middle|\, orig(o_2) = dest(o)\right]\right) =$$

$$\sum_{o \in P} P(o) \left(r_{PM}(o) + e^{-\rho T(o)} V_{dest(o),(t(o) + T(o))}\right)$$

Indeed, the provider dispatch control system 106 utilizes the above equation to determine a priority selection score by combining a probability of conversion of the transportation request by the multi-outcome transportation-value metric corresponding to the destination location in accordance with one or more embodiments herein. For instance, the provider dispatch control system 106 can determine the priority selection score using the following equation (in accordance with one or more embodiments above):

$$s(P) = \Sigma_{o \in P} P(o) (r_{PM}(o) + e^{-\rho T(o)} V_{dest(o)}).$$

As an example, the provider dispatch control system 106 can utilize historical data of provider devices that interacted with a location i (e.g., arrived at location i for a previous transportation request or activated the dynamic transportation matching application at location i to fulfill a transportation request). Using such $n_i$ historical data points with a corresponding first outcome $o_j$ and arrival time $t_j$ in location i, the provider dispatch control system 106 can determine an equivalent $V_i$ (e.g., a discounted multi-outcome transportation-value metric) using the following equation:

$$n_i V_i = \left(\sum_{j=1}^{n_i} r_{PM}(o_j) e^{-\rho(t(o_j) - t_j)}\right) + \sum_{i' \in N} V_{i'} \left(\sum_{j \text{ s.t. } dest(o_j) = i'} e^{-\rho(t(o_j) + T(o_j) - t_j)}\right)$$

$\Rightarrow n^T V = b + AV$ when combining all equations in matrix form.

The provider dispatch control system 106 can also add a prior $(|\mathcal{L}| - 1) V_i = \Sigma_{j \neq i} V_j$ as a regularization when a location does not have enough historical data (e.g., to push values to be equal). As described above (e.g., in relation to FIGS. 3 and 4), the provider dispatch control system 106 can determine the discounted multi-outcome transportation-value metric by solving a linear system.

Additionally, in one or more embodiments, the provider dispatch control system 106 can utilize a positive and/or negative boost to generate priority selection scores for a provider device in a prioritized transportation dispatch mode. In particular, the provider dispatch control system 106 can determine a positive or negative boost for a prioritized provider device by determining a value that represents the level of dispatch priority given to the prioritized provider device for a transportation request over another provider device based on the transportation request reward and a multi-outcome transportation-value metric. For instance, the provider dispatch control system 106 can utilize a multiplier $\alpha$ that determines an amount of gain realized for using a prioritized provider device over another provider device. For example, an $\alpha$ value of 0.25 can correspond to a realization of 25% provider device cost savings on top of the normal reward of assigning a transportation request (or plan P) to the provider device.

As an example, the provider dispatch control system 106 can determine the value that represents the level of dispatch priority given to the prioritized provider device for a transportation request over another provider device based on the transportation request reward and a multi-outcome transportation-value metric (e.g., a prioritized transportation dispatch mode boost $\Delta_S(P)$) by using the following equation:

$$\Delta_S(P) = \alpha (\Sigma_{o \in P} \mathbb{P}(o) (r_{PM}(o) + e^{-\rho T(o)} V_{dest(o)}) - V_{orig(P)}).$$

In reference to the above difference of score ($\Delta_S(P)$), the provider dispatch control system 106 can incentivize the transportation request for the prioritized provider device when $\Delta_S(P)$ is positive. Furthermore, the provider dispatch control system 106 can avoid assigning the transportation request to the prioritized provider device when $\Delta_S(P)$ is negative. Indeed, the provider dispatch control system 106 prioritization of a provider device is minimized as $\alpha$ approaches zero.

In some embodiments, when $\rho$ is approaching zero, the provider dispatch control system 106 can utilize a $\Delta_S(P)$ that is equivalent to:

$$\Delta_S(P) = \alpha (\Sigma_{o \in P} P(o) r_{PM}(o)).$$

For instance, the provider dispatch control system 106 assigns a transportation request to a provider device in the prioritized transportation dispatch mode when $\rho$ is approaching zero. In one or more embodiments, the provider dispatch control system 106 utilizes $\Delta_S(P)$ to boost or reduce a priority selection score associated with a provider device in a prioritized transportation dispatch mode.

As an example, the provider dispatch control system 106 can utilize the $\Delta_S(P)$ boost to determine a priority selection score. In one or more embodiments, the provider dispatch control system 106 sets $V_i$ to V where $\forall i \in \mathcal{L}$. Then, the provider dispatch control system 106 simplifies the prioritized transportation dispatch mode boost $\Delta_S(P)$ using the following equation:

$$\Delta_S(P) = \alpha \left(\sum_{o \in P} P(o) (r_{PM}(o) + e^{-\rho T(o)} V - V)\right) \approx \alpha \left(\sum_{o \in P} P(o) (r_{PM}(o) - \rho T(o) V)\right).$$

Then, the provider dispatch control system 106 can determine $v = \rho V$ and, with a plan P corresponding to the transportation request having two outcomes (e.g., conversion with probability p or immediate cancellation with probability 1−p), can determine an approximate boost $\Delta_S(P)$ in accordance with the following equation:

$$\Delta_S(P) \approx \alpha(p(r_{PM}(o)-T(o)v)+(1-p)(V-V)=\alpha p(r_{PM}(o)-T(o)v).$$

Using the above approximate boost $\Delta_S(P)$, the provider dispatch control system 106 sets the prioritized transportation dispatch boost $\Delta_S(P)$ to be dependent on whether the reward associated with the plan (or transportation request) is above or under a fixed reward-rate threshold. For instance, when the reward is proportional to the P3 time of the plan (or transportation request), the provider dispatch control system 106 utilizes a boost $\Delta_S(P)$ equivalent to $\alpha'p(P2)(P3-\mu(P2+P3))$ where $\mu$ is a target P3 utilization level and P2 and P3 are the P2 and P3 times of the plan.

Indeed, in one or more embodiments, the provider dispatch control system 106 selects transportation requests (or plans) for a provider device within a prioritized transportation dispatch mode that verifies $$P2 \leq \frac{1-\mu}{\mu}P3.$$

As such, (e.g., in reference to FIG. 13B), the provider dispatch control system 106 provides an increasingly positive boost to a priority selection score of a provider device in a prioritized transportation mode when P2 time decreases and P3 time increases. Likewise, in accordance with the approach described above, the provider dispatch control system 106 provides an increasingly smaller boost (and then a negative boost) to a priority selection score when P2 time increases and P3 time decreases.

Figure 14A:
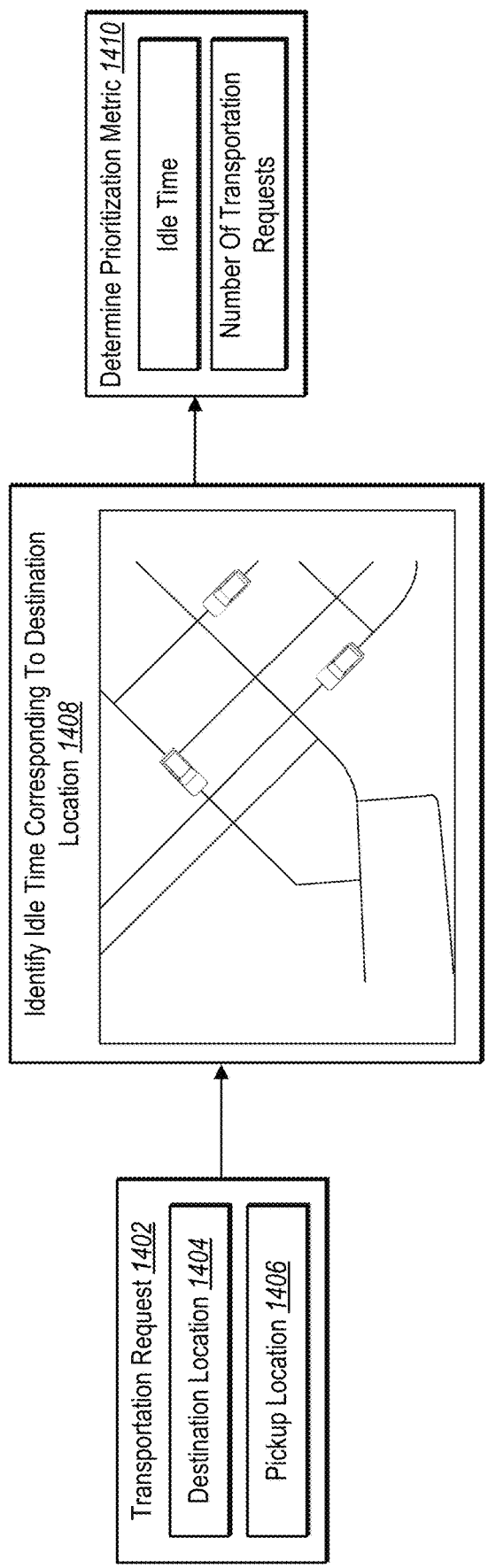
FIGS. 14A and 14B illustrate diagrams of the provider dispatch control system determining prioritization metrics for a prioritized transportation dispatch mode in accordance with one or more embodiments.
Figure 14B:
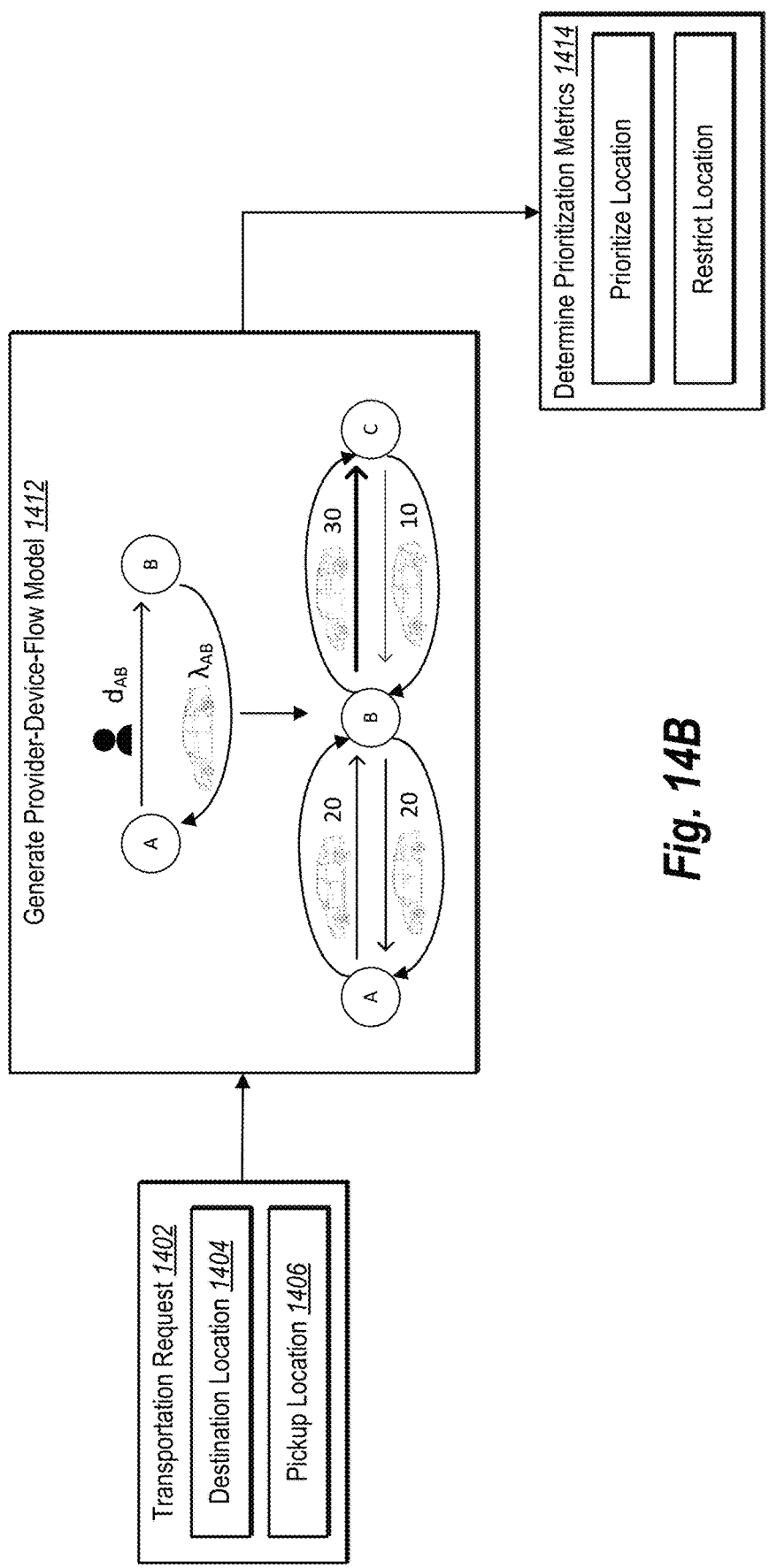

As mentioned above, the provider dispatch control system 106 can determine prioritization metrics based on idle time at a destination location. For instance, FIGS. 14A and 14B illustrate the provider dispatch control system 106 utilizing idle time (or other information) corresponding to a destination location to determine prioritization metrics. Indeed, the provider dispatch control system 106 can utilize information corresponding to a destination location to determine prioritization metrics that are analyzed to select a provider device from a prioritized transportation dispatch mode. In some embodiments, the prioritization metrics are utilized to increase or decrease a priority selection score.

For example, as shown in FIG. 14A, the provider dispatch control system 106 can utilize a destination location 1404 and a pickup location 1406 corresponding to a transportation request 1402 to determine prioritization metrics in an act 1410. In particular, as shown in FIG. 14A, the provider dispatch control system 106 utilizes the destination location 1404 to identify idle times corresponding to the destination location in an act 1408. For example, in or more embodiments, the provider dispatch control system 106 identifies an average amount of idle time (e.g., of provider devices) corresponding to the destination location 1404 (e.g., the amount of time provider devices wait between transportation requests on average). Then, the provider dispatch control system 106 can utilize the idle times to determine whether to utilize the prioritization metric (from act 1410) to increase or decrease a priority selection score. In some embodiments, the provider dispatch control system 106 determines whether the transportation request 1402 should be assigned to a provider device in a prioritized transportation dispatch mode.

For example, in one or more embodiments, the provider dispatch control system 106 utilizes a threshold idle time to determine whether to utilize a prioritization metric to increase or decrease a priority selection score. For example, in some embodiments, if the average idle time at a destination location is below a threshold idle time (e.g., the wait time is low), the provider dispatch control system 106 can utilize the prioritization metric to increase a priority selection score. Moreover, in one or more embodiments, if the average idle time meets or is above the threshold idle time, then the provider dispatch control system 106 can utilize the prioritization metric to decrease a priority selection score.

Furthermore, as shown in FIG. 14A, the provider dispatch control system 106 can utilize the destination location 1404 to identify a number of transportation requests corresponding to (or originating from) the destination location 1404 in the act 1408. For instance, the provider dispatch control system 106 can identify a total number of transportation requests within an interval of time or an average number of transportation requests that occur within a specific amount of time (e.g., the average number of transportation requests per hour). Subsequently, the provider dispatch control system 106 can utilize the number of transportation requests to determine whether to utilize the prioritization metric (from act 1410) to increase or decrease a priority selection score. For example, can determine whether transportation request 1402 should be assigned to a provider device in a prioritized transportation dispatch mode.

For instance, the provider dispatch control system 106 can utilize a threshold number of transportation requests (or a threshold rate of transportation requests) to determine whether to utilize a prioritization metric to increase or decrease a priority selection score. In some embodiments, if the number of transportation requests at a destination location is a threshold number of transportation requests, the provider dispatch control system 106 can utilize the prioritization metric to increase a priority selection score. Moreover, in one or more embodiments, if the number of transportation requests at the destination location meets or is above the threshold number of transportation requests, then the provider dispatch control system 106 can utilize the prioritization metric to decrease a priority selection score.

Indeed, the provider dispatch control system 106 can utilize information corresponding to a destination location of a transportation request as prioritization metrics to increase and/or decrease priority selection scores to control where provider devices in a prioritized transportation dispatch mode travel. By doing so, the provider dispatch control system 106 can control and minimize the P1 and P2 states of provider devices in a prioritized transportation dispatch mode. In particular, the provider dispatch control system 106 can increase priority selection scores using prioritization metrics to prioritize a provider device in a prioritized transportation dispatch mode for a destination location. Additionally, the provider dispatch control system 106 can decrease a priority selection score using prioritization metrics to lessen the likelihood of dispatching a provider device in a prioritized transportation dispatch mode to a destination location.

Although idle time corresponding to a destination location is illustrated in FIG. 14A, the provider dispatch control system 106 can utilize a variety of features or characteristics corresponding to a destination location, pickup location, and/or a provider device to determine the prioritization metrics. For instance, the provider dispatch control system 106 can identify and utilize a number of provider devices corresponding to a destination location for the prioritization metrics. In addition, as an example, the provider dispatch control system 106 can identify and utilize a transportation value (or average transportation value) between a pickup location and a destination location for the prioritization metrics.

Furthermore, the provider dispatch control system 106 can utilize a provider-device-flow model to determine prioritization metrics. For example, as used herein, the term "provider-device-flow model" refers to a computer-implemented algorithm, function, graph, or representation that determines, predicts, reflects, or estimates travel of provider devices between locations (or geographical areas). In particular, the term "provider-device-flow model" can refer to a model that indicates an estimated number of provider devices travelling between a first location (or geographical area) and a second location. Furthermore, the term "provider-device-flow model" can refer to a model that indicates an estimated demand of provider devices between multiple locations (or geographical areas).

For instance, FIG. 14B illustrates the provider dispatch control system 106 utilizing a provider-device-flow model to determine prioritization metrics. As illustrated in FIG. 14B, the provider dispatch control system 106 utilizes the destination location 1404 and the pickup location 1406 of the transportation request 1402 to generate a provider-device-flow model in an act 1412. Further, as shown in FIG. 14B, the generated provider-device-flow model can include (average) demand (e.g., transportation demand) $d_{AB}$ between locations in a geographical area (e.g., between a locations A and B). In addition, as shown in FIG. 14B, the generated provider-device-flow model can include an average number of transportation requests fulfilled out of the demand $d_{AB}$ between location A to B.

Furthermore, as shown in FIG. 14B, the provider dispatch control system 106 determines demand and an average number of transportation requests between locations to generate a provider-device-flow model between locations A, B, and C (in the act 1412). In particular, as shown in FIG. 14B, the provider dispatch control system 106 can utilize the provider-device-flow model to identify that the average demand and the average number of transportation requests being fulfilled out of that average demand between locations A and B are in equilibrium and may result in an increased provider device utilization. Furthermore, as shown in FIG. 14B, the provider dispatch control system 106 can identify that the average demand and the average number of transportation requests being fulfilled out of that average demand between locations B and C are not in equilibrium (e.g., unbalanced) and may result in a decreased provider device utilization at location C (e.g., location C may be a bottleneck for provider devices).

As shown in FIG. 14B, the provider dispatch control system 106 determines prioritization metrics 1414 using the generated provider-device-flow model (from the act 1412). For instance, as shown in FIG. 14B, the provider dispatch control system 106 determine prioritization metrics 1414 to prioritize a location and/or restrict a location. For example, in reference to FIG. 14B, the provider dispatch control system 106 can determine prioritization metrics 1414 that prioritize transportation requests between locations A and B for provider devices in a prioritized transportation dispatch mode due to the provider-device-flow model between locations A and B indicating a high provider device utilization. In other words, due to the average demand and the average number of transportation requests being fulfilled out of that average demand between locations A and B being in equilibrium, the provider dispatch control system 106 can determine that there will be a minimal P1 and/or P2 related time for provider devices between locations A and B. Accordingly, the provider dispatch control system 106 can prioritize provider devices in the prioritized transportation dispatch mode for transportation requests between locations A and B.

In addition, in reference to FIG. 14B, the provider dispatch control system 106 can determine prioritization metrics 1414 that restrict matching transportation requests between locations B and C to provider devices in a prioritized transportation dispatch mode. In particular, the provider dispatch control system 106 can withhold transportation requests between locations B and C from provider devices in the prioritized transportation dispatch mode due to the provider-device-flow model between locations B and C indicating a low provider device utilization. In other words, due to the average demand and the average number of transportation requests being fulfilled out of that average demand between locations B and C not being in equilibrium (e.g., causing a bottleneck at location C), the provider dispatch control system 106 can determine that there will be a greater P1 and/or P2 related time for provider devices between locations B and C. As such, the provider dispatch control system 106 can restrict provider devices in the prioritized transportation dispatch mode for transportation requests between locations B and C.

In one or more embodiments, the provider dispatch control system 106 can generate a provider-device-flow model using historical data. For instance, the provider dispatch control system 106 can determine a demand $d_{ij}$ between location i to j using historical data in accordance with one or more embodiments. Furthermore, the provider dispatch control system 106 can determine an average number of transportation requests fulfilled out of the demand $d_{ij}$ between location i to j (e.g., $(\lambda_{ij})_{ij}$) using historical data in accordance with one or more embodiments. Then, the provider dispatch control system 106 can utilize such demands and numbers of transportation requests fulfilled out of the demands between various combinations of locations to generate provider-device-flow models.

Furthermore, in one or more embodiments, the provider dispatch control system 106 determines a prioritization metric from a provider-device-flow model to determine a priority selection score (e.g., increase or decrease a priority selection score) for a transportation request. For example, the provider dispatch control system 106 can utilize the prioritization metric to increase a priority selection score for a provider device in a prioritized transportation dispatch mode when the provider-device-flow model indicates the average demand and the average number of transportation requests being fulfilled between locations are closer to equilibrium. In some embodiments, the provider dispatch control system 106 utilizes the prioritization metric to decrease a priority selection score for a provider device in a prioritized transportation dispatch mode when the provider-device-flow model indicates the average demand and the average number of transportation requests being fulfilled are further away from equilibrium.

In addition, the provider dispatch control system 106 can utilize machine learning to analyze information identified at a destination location of a transportation request (e.g., in relation to FIG. 14A) and/or a provider-device-flow model (e.g., in relation to FIG. 14B) to determine prioritization metrics. More specifically, the provider dispatch control system 106 can utilize a machine learning model (e.g., a neural network based model) to determine prioritization metrics that are likely to maximize efficiency for provider devices in a prioritized transportation dispatch mode.

Indeed, the provider dispatch control system 106 can utilize prioritization metrics learned from a machine learning model to adjust priority selection scores corresponding to provider devices in the prioritized transportation dispatch mode.

Furthermore, in one or more embodiments, the provider dispatch control system 106 utilizes a current location of a provider device and a pickup location (in addition to prioritization metrics) to determine a priority selection score. For example, the provider dispatch control system 106 can account for the time of travel to the pickup location of a transportation request (e.g., time in a P2 state) to adjust priority selection scores (e.g., to increase priority to provider devices that are closer to the pickup location). By doing so, the provider dispatch control system 106 can select a provider device from amongst provider devices in a prioritized transportation dispatch mode based on the priority score and a distance of each provider device to the pickup location corresponding to the transportation request. Furthermore, the provider dispatch control system 106 can also utilize an ETA constraint while selecting a provider device for a transportation request (as described above).

In one or more embodiments, the provider dispatch control system 106 can relocate provider devices that correspond to the prioritized transportation dispatch mode using multi-outcome transportation-value metrics. For instance, the provider dispatch control system 106 can determine one or more multi-outcome transportation-value metrics for a provider device in the prioritized transportation dispatch mode. Then, the provider dispatch control system 106 can dispatch the provider devices by relocating the provider device to a location that corresponds to the highest multi-outcome transportation-value metric for the provider device (e.g., within a geographical area).

Moreover, in some embodiments, the provider dispatch control system 106 utilizes multi-outcome transportation-value metrics and/or a prioritized transportation dispatch mode to dispatch provider devices to fulfill various types of services. For example, the provider dispatch control system 106 can maximize a provider device utilization for provider devices that are delivering items (e.g., shipment packages, mail, food delivery). Indeed, the provider dispatch control system 106 can utilize multi-outcome transportation-value metrics and/or a prioritized transportation dispatch mode to efficiently dispatch provider devices to fulfill various types of services in a manner that increases provider device utilization times.

For example, the provider dispatch control system 106 can utilize a prioritized transportation dispatch mode for provider devices that deliver items. In particular, the provider dispatch control system 106 can select between provider devices in a prioritized transportation dispatch mode and an additional transportation dispatch mode using prioritization metrics to fulfill an item delivery. For instance, the provider dispatch control system 106 can determine the prioritization metrics based on a provider-device-flow model of item deliveries and/or idle times at a destination location for the item deliveries (e.g., in accordance with one or more embodiments).

Furthermore, in some embodiments, the provider dispatch control system 106 determines multi-outcome transportation-value metrics for provider devices that deliver items. More specifically, the provider dispatch control system 106 can determine multi-outcome transportation-value metrics in correspondence to one or more destination locations of one or more item deliveries. Then, the provider dispatch control system 106 can utilize the multi-outcome transportation-value metrics to dispatch a provider device for item deliveries. For instance, the provider dispatch control system 106 can utilize the multi-outcome transportation-value metrics to relocate a provider device to a location for an increased provider device utilization of item deliveries, select an item delivery for the provider device that is associated with the most optimal item delivery, and/or as prioritization metrics for a provider device in a prioritized transportation dispatch mode for item deliveries.

Additionally, in one or more embodiments, the provider dispatch control system 106 selects between a transportation request and an item delivery request for a provider device using multi-outcome transportation-value metrics and/or a prioritized transportation dispatch mode. For example, the provider dispatch control system 106 can determine a separate multi-outcome transportation-value metric for a provider device in relation to a transportation request and an item delivery request. Then, the provider dispatch control system 106 can select between the multi-outcome transportation-value metrics to dispatch the provider device to either fulfill the transportation request or the item delivery request. In some embodiments, the provider dispatch control system 106 determines prioritization metrics for both a transportation request and an item delivery request and utilizes the prioritization metrics to select between the transportation request and the item delivery request for a provider device in a prioritized transportation dispatch mode.

Moreover, in some embodiments, the provider dispatch control system 106 utilizes multi-outcome transportation-value metrics to dispatch autonomous vehicles in accordance with one or more embodiments. In particular, the provider dispatch control system 106 utilizes multi-outcome transportation-value metrics to dispatch autonomous vehicles by using multi-outcome transportation-value metrics to relocate autonomous vehicles, to select a transportation request for an autonomous vehicle, and/or as prioritization metrics for an autonomous vehicle in a prioritized transportation dispatch mode. Moreover, the provider dispatch control system 106 can select between autonomous vehicles in a prioritized transportation dispatch mode (using prioritization metrics) and provider devices in another transportation dispatch mode (without using prioritization metrics) to fulfill a transportation request.

Although one or more embodiments illustrate the provider dispatch control system 106 selecting provider devices from a prioritized transportation dispatch mode or dispatching provider devices using multi-outcome transportation-value metrics to increase (or maximize) a provider device utilization, the provider dispatch control system 106 can utilize the approaches described above to increase (or maximize) various types of rewards for a provider device (or the dynamic transportation matching system 104). For example, the provider dispatch control system 106 can increase a transportation-mode value improvement metric, a transportation value, monetary value earned from one or more transportation requests, and/or the number of transportation requests in a geographical area. Indeed, the provider dispatch control system 106 can utilize one or more approaches described above to increase (or maximize) these various types of rewards across all provider device or on average per all provider devices operating within the dynamic transportation matching system 104.

As mentioned above, the provider dispatch control system 106 can utilize a prioritized transportation dispatch mode to increase efficient provider device utilization to increase cost savings (or earnings) for both provider devices and the dynamic transportation matching system 104 while maintaining or reducing costs to requestor devices. For example, experimenters applied an embodiment of the provider dispatch control system 106 in a simulation for multiple geographical areas. Indeed, the experimenters simulated utilizing a prioritized transportation dispatch mode in accordance with one or more embodiments herein.

During the experiments, the provider dispatch control system 106 was able to serve 40-60% of transportation requests in the geographical areas through provider devices in a prioritized transportation dispatch mode. Additionally, in the experiments, the provider dispatch control system 106 supported an incremental 10-30% of the total P3 hours across the geographical areas as the transportation-mode value improvement metric (e.g., surplus). For instance, during the simulation, the provider dispatch control system 106 was able to realize a gain of 10-30% P3 hours for the dynamic transportation matching system 104 while maintaining costs per ride (per transportation request) and also while increasing the earnings of provider devices in the prioritized transportation dispatch mode. Indeed (during the experiment), the 10-30% gain in P3 hours as the transportation-mode value improvement metric translated to 1-3 dollars gain per ride for the dynamic transportation matching system 104 without increasing costs per ride (per transportation request).

Figure 15:
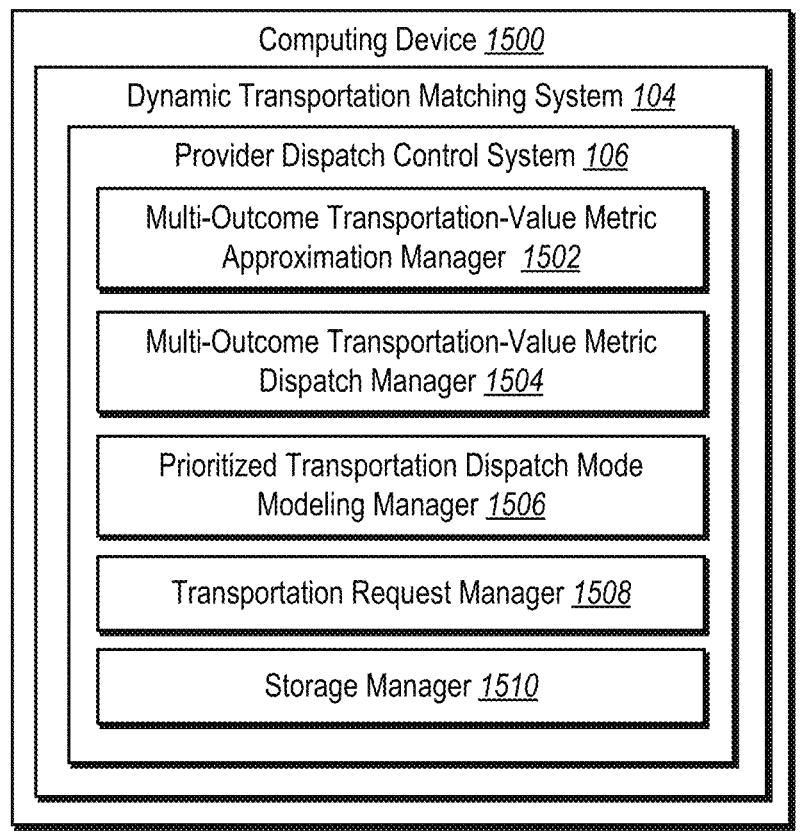
FIG. 15 illustrates a block diagram of a provider dispatch control system in accordance with one or more embodiments.

Turning now to FIG. 15, additional detail will be provided regarding components and capabilities of one embodiment of the provider dispatch control system. In particular, FIG. 15 illustrates an embodiment of an example provider dispatch control system 106 executed by a computing device 1500 (e.g., the server device(s) 102). As shown by the embodiment in FIG. 15, the computing device 1500 can include or host the dynamic transportation matching system 104 and the provider dispatch control system 106. The provider dispatch control system 106 can include a multi-outcome transportation-value metric approximation manager 1502, a multi-outcome transportation-value metric dispatch manager 1504, a prioritized transportation dispatch mode modeling manager 1506, a transportation request manager 1508, and a storage manager 1510.

As just mentioned and as illustrated in the embodiment in FIG. 15, the provider dispatch control system 106 can include the multi-outcome transportation-value metric approximation manager 1502. For instance, the multi-outcome transportation-value metric approximation manager 1502 can determine (or generate) analyze historical outcomes and/or historical rewards to determine multi-outcome transportation-value metrics corresponding to locations as described above (e.g., in relation to FIGS. 3 and 4). Additionally, the multi-outcome transportation-value metric approximation manager 1502 can use transportation times to a location to generate discounted multi-outcome transportation-value metric corresponding to the location as described above (e.g., in relation to FIGS. 3 and 4).

Moreover, as shown in FIG. 15, the provider dispatch control system 106 can include the multi-outcome transportation-value metric dispatch manager 1504. For example, the multi-outcome transportation-value metric dispatch manager 1504 can dispatch a provider device using multi-outcome transportation-value metrics corresponding to a variety of locations as described above (e.g., in relation to FIGS. 5, 6, 7, and 8). In particular, the multi-outcome transportation-value metric dispatch manager 1504 can relocate a provider device, assign a transportation request to a provider device, or prioritize a provider device in a prioritized transportation dispatch mode using a variety of multi-outcome transportation-value metrics corresponding to a variety of locations as described above (e.g., in relation to FIGS. 5, 6, 7, and 8).

Furthermore, as illustrated in FIG. 15, the provider dispatch control system 106 can include the prioritized transportation dispatch mode modeling manager 1506. For example, the prioritized transportation dispatch mode modeling manager 1506 can utilize historical data to simulate and evaluate the outcomes of utilizing a prioritized transportation dispatch mode as described above (e.g., in relation to FIGS. 11 and 12). In particular, the prioritized transportation dispatch mode modeling manager 1506 can utilize estimated provider device utilization metrics, transportation-mode value improvement metrics, and/or provider utilization models based on modeled historical data to select a number of provider device slots for a prioritized dispatch mode as described above (e.g., in relation to FIGS. 11 and 12). Furthermore, the prioritized transportation dispatch mode modeling manager 1506 can also select provider devices for the prioritized transportation dispatch mode as described above (e.g., in relation to FIGS. 11 and 12).

In addition, as shown in FIG. 15, the provider dispatch control system 106 can include the transportation request manager 1508. For example, the transportation request manager 1508 can select a provider device from between a prioritized transportation dispatch mode and another transportation dispatch mode for a transportation request as described above (e.g., in relation to FIGS. 8, 9, 13, and 14). In particular, the transportation request manager 1508 can determine one or more prioritization metrics based on the destination location to select a provider device from between a prioritized transportation dispatch mode and another transportation dispatch mode for a transportation request as described above (e.g., in relation to FIGS. 8, 9, 13, and 14).

Moreover, as shown in FIG. 15, the provider dispatch control system 106 can include the storage manager 1510. The storage manager 1510 can communicate with any of the other components of the provider dispatch control system 106 to obtain and/or provide data. For example, the storage manager 1510 can include data such as historical outcomes and historical rewards utilized to determine multi-outcome transportation-value metrics, multi-outcome transportation-value metrics for a variety of locations, data for a prediction model, and transportation request data. Furthermore, the storage manager 1510 can include data such as prioritized transportation dispatch mode data (e.g., number of slots, provider device assignments), historical data for evaluation of provider device utilization metrics, transportation-mode value improvement metrics, and/or provider utilization models, prioritization metrics data (e.g., idle times, number of transportation requests, provider-device-flow models), and/or performance metrics (e.g., ratings, utilization times, idle times, seniority, total drive times corresponding to provider devices).

In one or more embodiments, each of the components of the provider dispatch control system 106 are in communication with other components using any suitable communication technologies. Additionally, the components of the provider dispatch control system 106 can be in communication with one or more other devices including other computing devices of a user, server devices (e.g., cloud storage devices), licensing servers, or other devices/systems. It will be recognized that although the components of the provider dispatch control system 106 are shown to be separate in FIG. 15, any of the subcomponents may be combined into fewer components, such as into a single component, or divided into more components as may serve a particular implementation. Furthermore, although the components of FIG. 15 are described in connection with the provider dispatch control system 106, at least some of the components for performing operations in conjunction with the provider dispatch control system 106 described herein may be implemented on other devices within the environment.

The components of the provider dispatch control system 106 can include software, hardware, or both. For example, the components of the provider dispatch control system 106 can include one or more instructions stored on a computer-readable storage medium and executable by processors of one or more computing devices (e.g., the computing device 1500). When executed by the one or more processors, the computer-executable instructions of the provider dispatch control system 106 can cause the computing device 1500 to perform the operations described herein. Alternatively, the components of the provider dispatch control system 106 can include hardware, such as a special purpose processing device to perform a certain function or group of functions. Additionally, or alternatively, the components of the provider dispatch control system 106 can include a combination of computer-executable instructions and hardware.

Furthermore, the components of the provider dispatch control system 106 performing the functions described herein with respect to the provider dispatch control system 106 may, for example, be implemented as part of a stand-alone application, as a module of an application, as a plug-in for applications, as a library function or functions that may be called by other applications, and/or as a cloud-computing model. Thus, the components of the provider dispatch control system 106 may be implemented as part of a stand-alone application on a personal computing device or a mobile device.

Figure 16:
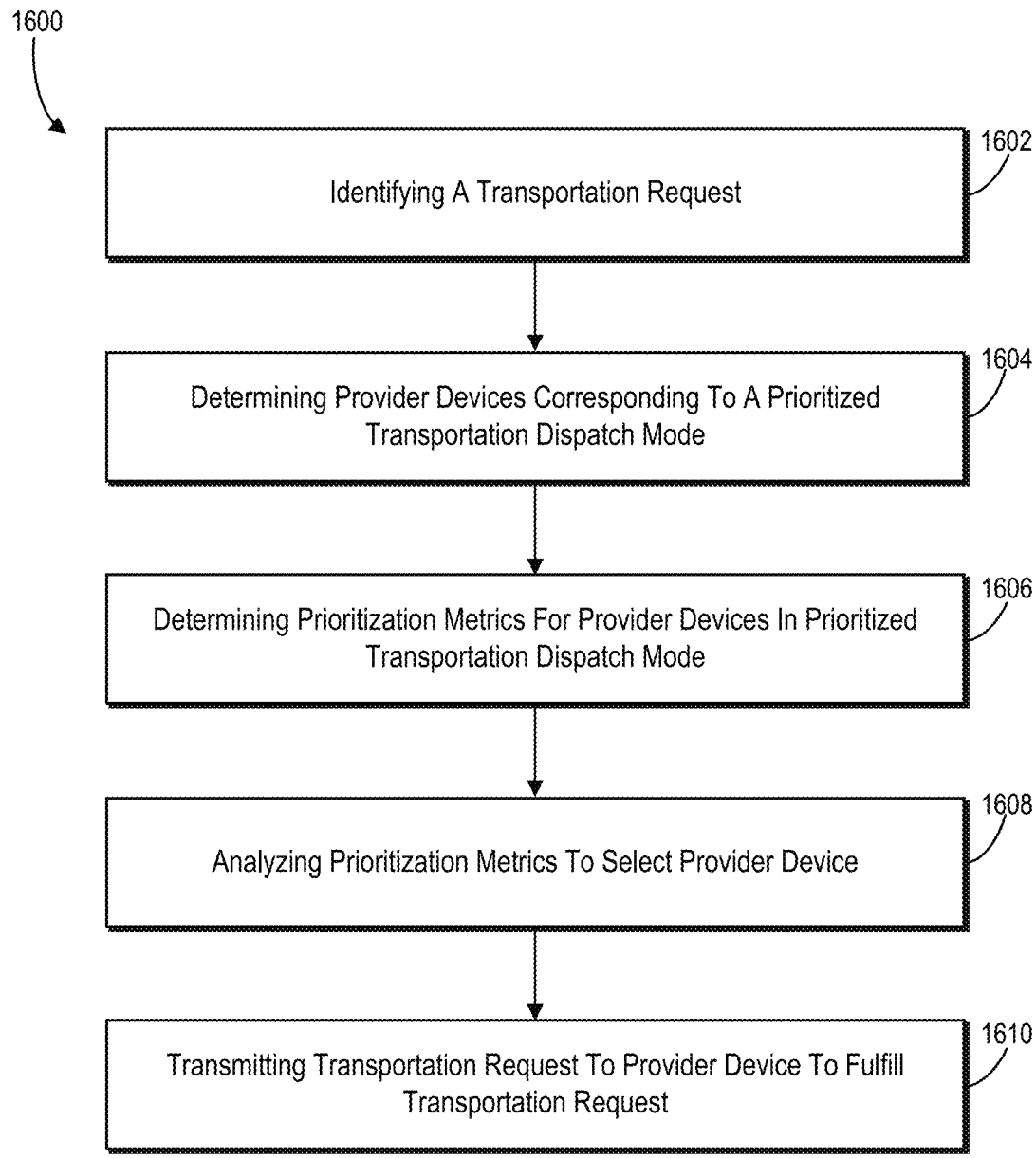
FIG. 16 illustrates a flowchart of a series of acts for selecting a provider device from a prioritized transportation dispatch mode for a transportation request in accordance with one or more embodiments.

Turning now to FIG. 16, this figure shows a flowchart of a series of acts 1600 of selecting a provider device from a prioritized transportation dispatch mode for a transportation request. While FIG. 16 illustrates acts according to one embodiment, alternative embodiments may omit, add to, reorder, and/or modify any of the acts shown in FIG. 16. The acts of FIG. 16 can be performed as part of a method. Alternatively, a non-transitory computer readable storage medium can comprise instructions that, when executed by one or more processors, cause a computing device to perform the acts depicted in FIG. 16. In still further embodiments, a system can perform the acts of FIG. 16.

As shown in FIG. 16, the series of acts 1600 include an act 1602 of identifying a transportation request. In particular, the act 1602 can include identifying a transportation request from a request device to a destination location. Furthermore, the series of acts 1600 include an act 1604 of determining provider devices corresponding to a prioritized transportation dispatch mode. In particular, the act 1604 can include determining a first set of provider devices corresponding to a prioritized transportation dispatch mode and a second set of provider devices corresponding to an additional transportation dispatch mode.

Furthermore, the act 1604 can include determining a first set of provider devices corresponding to a prioritized transportation dispatch mode by determining a threshold number of provider device slots for a prioritized transportation dispatch mode and selecting provider devices to satisfy the threshold number of provider device slots. In addition, the act 1604 can include identifying a threshold number of provider device slots by determining a transportation-mode value improvement metric reflecting a difference in reward between selecting potential provider devices from a first set of provider devices (corresponding to a prioritized transportation dispatch mode) and a second set of provider devices (corresponding to an additional transportation dispatch mode) and selecting the threshold number of provider device slots based on the transportation-mode value improvement metric. Moreover, the act 1604 can include identifying a threshold number of provider device slots by determining a provider device utilization metric reflecting time associated with provider devices actively fulfilling transportation requests and selecting the threshold number of provider device slots based on the provider device utilization metric.

Additionally, the act 1604 can include selecting provider devices for a prioritized transportation dispatch mode based on one or more performance metrics corresponding to the provider devices. For example, the one or more performance metrics can include at least one of a driver rating, driver utilization time, driver idle time, driver seniority, or total drive time. Moreover, the act 1604 can include transmitting digital invitations to join a prioritized transportation dispatch mode to selected provider devices. In addition, the act 1604 can include allocate a first transportation provider compensation value to a first set of provider devices (corresponding to a prioritized transportation dispatch mode) and a second transportation provider compensation value to a second set of provider devices (corresponding to an additional transportation dispatch mode). For example, a first transportation provider compensation value can be different from a second transportation provider compensation value.

Furthermore, the act 1604 can include generating a provider utilization model indicating estimated provider utilization metrics for different numbers of provider devices in a prioritized transportation dispatch mode. Moreover, the act 1604 can include determining a first set of provider devices (corresponding to a prioritized transportation dispatch mode) by determining a threshold number of provider device slots for a prioritized transportation dispatch mode by selecting the threshold number of provider device slots based on a provider utilization model and selecting provider devices to satisfy the threshold number of provider device slots.

As shown in FIG. 16, the series of acts 1600 include an act 1606 of determining prioritization metrics for provider devices in a prioritized transportation dispatch mode. In particular, the act 1606 can include, in response to determining that a first set of provider devices correspond to a prioritized transportation dispatch mode, determining prioritization metrics for the first set of provider devices based on a destination location. Furthermore, the act 1606 can include determining prioritization metrics based on a destination location by identifying an idle time of provider devices corresponding to the destination location and determining the prioritization metrics based on the idle time of provider devices corresponding to the destination location. In addition, the act 1606 can include, in response to determining that an idle time of provider devices corresponding to a destination location satisfies an idle time threshold, determining an increased prioritization metric.

Moreover, the act 1606 can include determining prioritization metrics based on a destination location by generating a provider-device-flow model between a destination location and a pickup location corresponding to a transportation request and determining the prioritization metrics based on the provider-device-flow model. In addition, the act 1606 can include determining prioritization metrics based on a destination location by identifying a number of transportation requests at the destination location and determining the prioritization metrics based on the number of transportation requests. Furthermore, the act 1606 can include determining prioritization metrics based on dispatch rules of destination location control, destination location restriction, and/or priority queueing for provider devices in a prioritized transportation dispatch mode.

As shown in FIG. 16, the series of acts 1600 include an act 1608 of analyzing prioritization metrics to select a provider device (for a transportation request). In particular, the act 1608 can include analyzing prioritization metrics to select a provider device by determining priority selection scores for a first set of provider devices (corresponding to a prioritized transportation dispatch mode) by applying prioritization metrics and determining selection scores corresponding to a second set of provider devices (corresponding to an additional transportation dispatch mode). Furthermore, the act 1608 can include analyzing prioritization metrics to select a provider device by comparing priority selection scores and selection scores to select a provider device (e.g., from between a prioritized transportation dispatch mode and an additional transportation dispatch mode). In addition, the act 1608 can include determining an increased priority selection score based on a prioritization metric and selecting a provider device from a first set of provider devices (corresponding to a prioritized transportation dispatch mode) based on the increased priority selection score.

Additionally, as shown in FIG. 16, the series of acts 1600 can include an act 1610 of transmitting a transportation request to a provider device to fulfill a transportation request. In particular, the act 1610 can include transmitting a transportation request to a provider device in a prioritized transportation dispatch mode to fulfill a transportation request. Furthermore, the act 1610 can include transmitting a transportation request to a provider device in a prioritized transportation dispatch mode based on the provider device having a priority selection score that is greater selection scores corresponding to a second set of provider devices (corresponding to an additional transportation dispatch mode).

Figure 17:
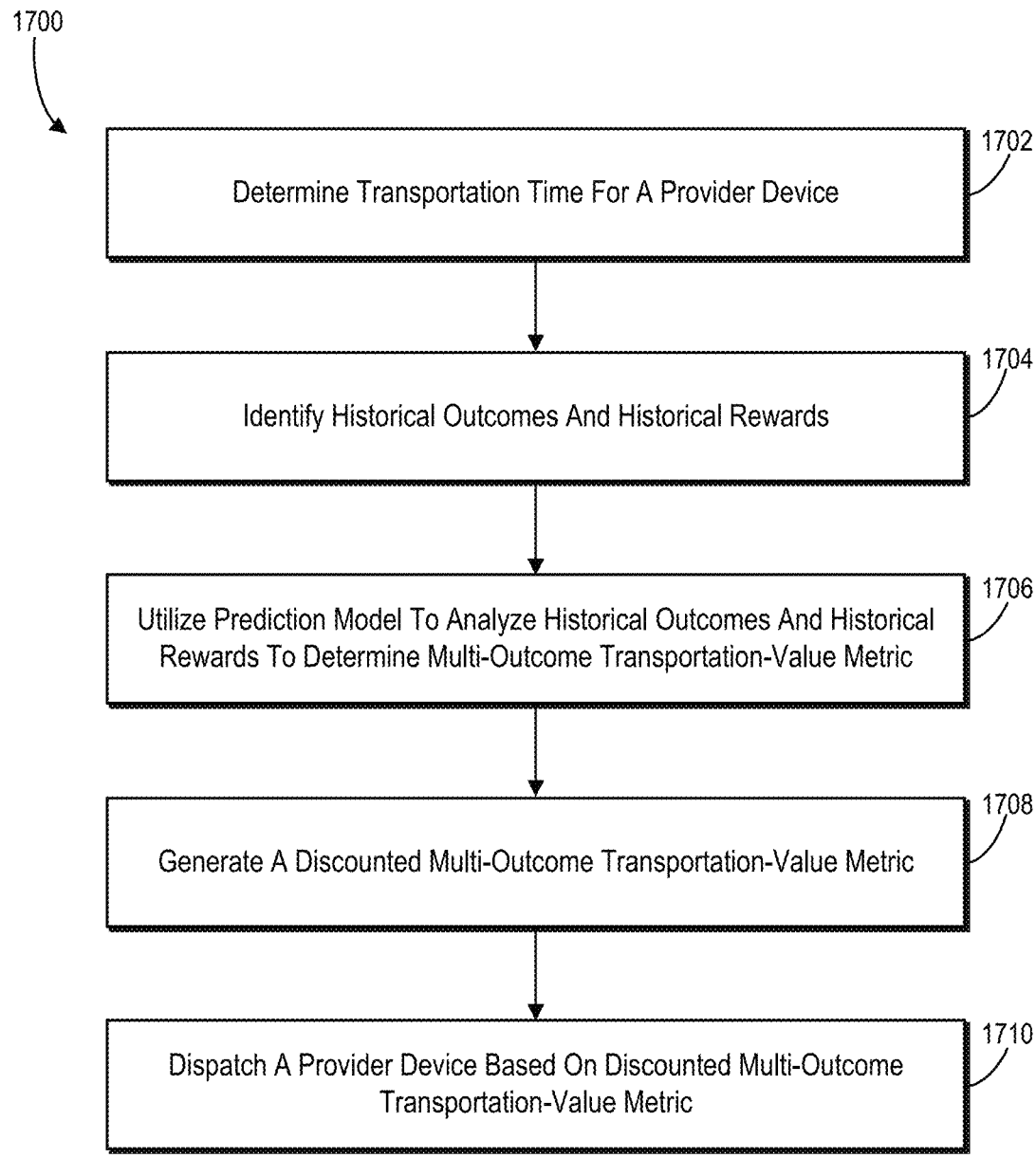
FIG. 17 illustrates a flowchart of a series of acts for utilizing a (discounted) multi-outcome transportation-value metric to dispatch a provider device in accordance with one or more embodiments.

Turning now to FIG. 17, this figure shows a flowchart of a series of acts 1700 of utilizing a (discounted) multi-outcome transportation-value metric to dispatch a provider device. While FIG. 17 illustrates acts according to one embodiment, alternative embodiments may omit, add to, reorder, and/or modify any of the acts shown in FIG. 17. The acts of FIG. 17 can be performed as part of a method. Alternatively, a non-transitory computer readable storage medium can comprise instructions that, when executed by one or more processors, cause a computing device to perform the acts depicted in FIG. 17. In still further embodiments, a system can perform the acts of FIG. 17.

As shown in FIG. 17, the series of acts 1700 can include an act 1702 of determining a transportation time for a provider device. In particular, the act 1702 can include determining a transportation time for a provider device to a destination location. Furthermore, the act 1702 can include identifying a transportation request from a requestor device to a destination location. Furthermore, the act 1702 can include identifying a current location of a provider device. Moreover, the act 1702 can include identifying a first transportation request from a first requestor device corresponding to a destination location and/or a second transportation request from a second requestor device corresponding to an additional destination location.

As shown in FIG. 17, the series of acts 1700 can include an act 1704 of identifying historical outcomes and historical rewards. In particular, the act 1704 can include identifying a set of historical outcomes and historical rewards corresponding to providing transportation services from a destination location. For example, a set of historical outcomes and historical rewards corresponding to providing transportation services from a destination location can include a first set of historical outcomes and historical rewards for providing transportation services from a destination location to successive destination locations and a second set of historical outcomes and historical rewards for providing transportation services from the successive destination locations.

As shown in FIG. 17, the series of acts 1700 can include an act 1706 of utilizing a prediction model to analyze historical outcomes and historical rewards to determine a multi-outcome transportation-value metric. In particular, the act 1706 can include utilizing a prediction model to analyze a set of historical outcomes and historical rewards to determine a multi-outcome transportation-value metric for a provider device corresponding to a destination location. Additionally, the act 1706 can include determining an additional multi-outcome transportation-value metric for a provider device corresponding to a current location (of the provider device).

As shown in FIG. 17, the series of acts 1700 can include an act 1708 of generating a discounted multi-outcome transportation-value metric. In particular, the act 1708 can include generating a discounted multi-outcome transportation-value metric for a provider device corresponding to a destination location by applying a transportation time to a multi-outcome transportation-value metric. For example, a discounted multi-outcome transportation value metric can include an expected reward corresponding to a provider device fulfilling multiple transportation requests in a sequence of outcomes originating from a destination location. Furthermore, an expected reward can include a number of transportation requests fulfilled by a provider device in a sequence of outcomes, a provider device utilization metric reflecting time associated with the provider device actively fulfilling transportation requests in the sequence of outcomes, or a monetary value corresponding to transportation requests in the sequence of outcomes. Furthermore, the act 1708 can include determining an additional discounted multi-outcome transportation-value metric for a provider device corresponding to an additional destination location. In addition, the act 1708 can include determining a set of discounted multi-outcome transportation-value metrics for a provider device corresponding to a set of destination locations.

As shown in FIG. 17, the series of acts 1700 can include an act 1710 of dispatching a provider device based on a discounted multi-outcome transportation-value metric (corresponding to a destination location). Additionally, the act 1710 can include dispatching a provider device based on a comparison of a discounted multi-outcome transportation-value metric corresponding to a destination location and an additional multi-outcome transportation-value metric corresponding to a current location (of the provider device). Furthermore, the act 1710 can include dispatching a provider device to a destination location in response to determining that a discounted multi-outcome transportation-value metric corresponding to the destination location is greater than an additional multi-outcome transportation-value metric corresponding to a current location.

In addition, the act 1710 can include utilizing a set of discounted multi-outcome transportation-value metrics to dispatch a provider device to a particular destination location corresponding to a maximum discounted multi-outcome transportation-value metric for the provider device. Furthermore, the act 1710 can include dispatching a provider device by selecting between a first transportation request and a second transportation request based on a comparison of a discounted multi-outcome transportation-value metric corresponding to a destination location (of the first transportation request) and an additional discounted multi-outcome transportation-value metric corresponding to an additional destination location (of the second transportation request). Additionally, the act 1710 can include dispatching a provider device by selecting a first transportation request based on a discounted multi-outcome transportation-value metric corresponding to a destination location (of the first transportation request). Moreover, the act 1710 can include determining an expected reward corresponding to providing transportation services to a destination location and dispatching a provider device based on a combination of a discounted multi-outcome transportation-value metric (corresponding to the destination location) and the expected reward corresponding to providing transportation services to the destination location.

Additionally, the act 1710 can include determining a first set of provider devices corresponding to a prioritized transportation dispatch mode and a second set of provider devices corresponding to an additional transportation dispatch mode. Moreover, the act 1710 can include generating a discounted multi-outcome transportation-value metric by determining a prioritized multi-outcome transportation-value metric for a provider device in response to determining that the provider device corresponds to a prioritized transportation dispatch mode. In addition, the act 1710 can include selecting a provider device to fulfill a transportation request based on a prioritized multi-outcome transportation-value metric. Furthermore, the act 1710 can include analyzing a multi-outcome transportation-value metric by comparing a prioritized multi-outcome transportation-value metric (corresponding to a destination location) to an additional prioritized multi-outcome transportation-value metric for a provider device corresponding to a current location.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system, including by one or more servers. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, virtual reality devices, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 18:
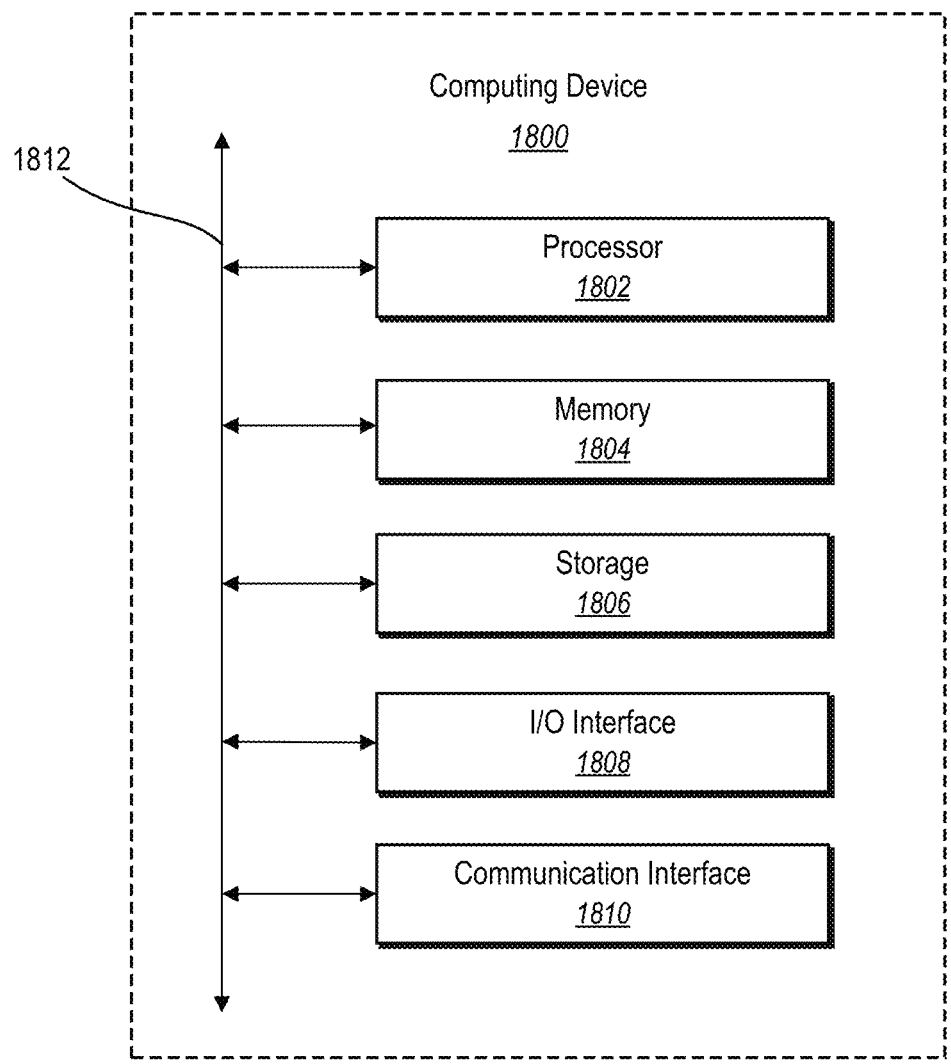
FIG. 18 illustrates a block diagram of a computing device in accordance with one or more embodiments.

FIG. 18 illustrates, in block diagram form, an exemplary computing device 1800 that may be configured to perform one or more of the processes described above. One will appreciate that the provider dispatch control system 106 (or the dynamic transportation matching system 104) can comprise implementations of the computing device 1800, including, but not limited to, the devices or systems illustrated in the previous figures. As shown by FIG. 18, the computing device can comprise a processor 1802, memory 1804, a storage device 1806, an I/O interface 1808, and a communication interface 1810. In certain embodiments, the computing device 1800 can include fewer or more components than those shown in FIG. 18. Components of computing device 1800 shown in FIG. 18 will now be described in additional detail.

In particular embodiments, processor(s) 1802 includes hardware for executing instructions, such as those making up a computer program. As an example, and not by way of limitation, to execute instructions, processor(s) 1802 may retrieve (or fetch) the instructions from an internal register, an internal cache, memory 1804, or a storage device 1806 and decode and execute them.

The computing device 1800 includes memory 1804, which is coupled to the processor(s) 1802. The memory 1804 may be used for storing data, metadata, and programs for execution by the processor(s). The memory 1804 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 1804 may be internal or distributed memory.

The computing device 1800 includes a storage device 1806 includes storage for storing data or instructions. As an example, and not by way of limitation, storage device 1806 can comprise a non-transitory storage medium described above. The storage device 1806 may include a hard disk drive ("HDD"), flash memory, a Universal Serial Bus ("USB") drive or a combination of these or other storage devices.

The computing device 1800 also includes one or more input or output ("I/O") interface 1808, which are provided to allow a user (e.g., requestor or provider) to provide input to (such as user strokes), receive output from, and otherwise transfer data to and from the computing device 1800. These I/O interface 1808 may include a mouse, keypad or a keyboard, a touch screen, camera, optical scanner, network interface, modem, other known I/O devices or a combination of such I/O interface 1808. The touch screen may be activated with a stylus or a finger.

The I/O interface 1808 may include one or more devices for presenting output to a user, including, but not limited to, a graphics engine, a display (e.g., a display screen), one or more output providers (e.g., display providers), one or more audio speakers, and one or more audio providers. In certain embodiments, the I/O interface 1808 is configured to provide graphical data to a display for presentation to a user. The graphical data may be representative of one or more graphical user interfaces and/or any other graphical content as may serve a particular implementation.

The computing device 1800 can further include a communication interface 1810. The communication interface 1810 can include hardware, software, or both. The communication interface 1810 can provide one or more interfaces for communication (such as, for example, packet-based communication) between the computing device and one or more other computing devices 1800 or one or more networks. As an example, and not by way of limitation, communication interface 1810 may include a network interface controller ("NIC") or network adapter for communicating with an Ethernet or other wire-based network or a wireless NIC ("WNIC") or wireless adapter for communicating with a wireless network, such as a WI-FI. The computing device 1800 can further include a bus 1812. The bus 1812 can comprise hardware, software, or both that couples components of computing device 1800 to each other.

Figure 19:
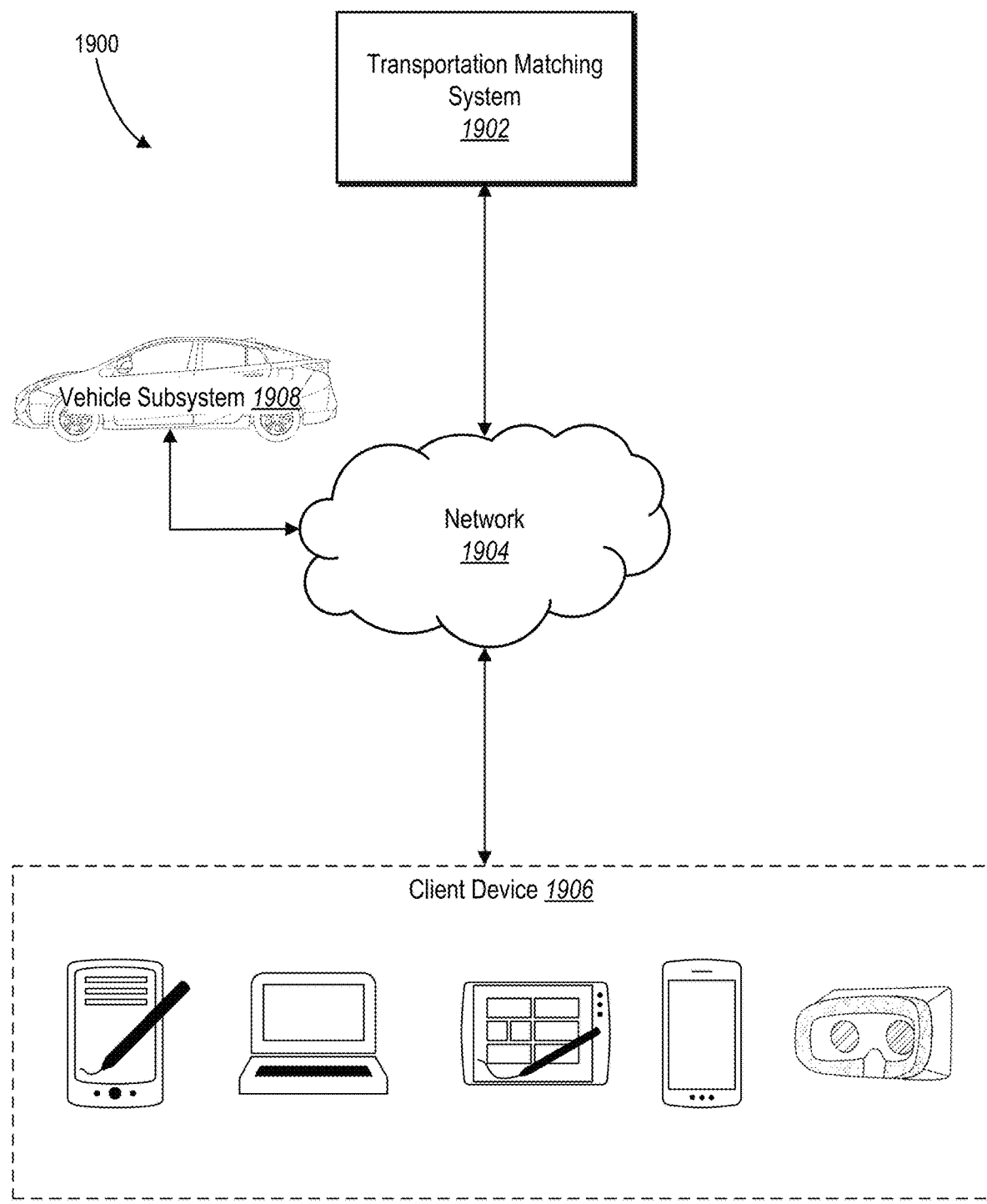
FIG. 19 illustrates an example environment for a transportation matching system in accordance with one or more embodiments.

FIG. 19 illustrates an example network environment 1900 of a transportation matching system 1902 (e.g., the dynamic transportation matching system 104). The network environment 1900 includes a client device 1906, a transportation matching system 1902, and a vehicle subsystem 1908 connected to each other by a network 1904. Although FIG. 19 illustrates a particular arrangement of the client device 1906, transportation matching system 1902, vehicle subsystem 1908, and network 1904, this disclosure contemplates any suitable arrangement of client device 1906, transportation matching system 1902, vehicle subsystem 1908, and network 1904. As an example, and not by way of limitation, two or more of client device 1906, transportation matching system 1902, and vehicle subsystem 1908 communicate directly, bypassing network 1904. As another example, two or more of client device 1906, transportation matching system 1902, and vehicle subsystem 1908 may be physically or logically co-located with each other in whole or in part. Moreover, although FIG. 19 illustrates a particular number of client devices 1906, transportation matching systems 1902, vehicle subsystems 1908, and networks 1904, this disclosure contemplates any suitable number of client devices 1906, transportation matching systems 1902, vehicle subsystems 1908, and networks 1904. As an example, and not by way of limitation, network environment 1900 may include multiple client device 1906, transportation matching systems 1902, vehicle subsystems 1908, and networks 1904.

This disclosure contemplates any suitable network 1904. As an example, and not by way of limitation, one or more portions of network 1904 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 1904 may include one or more networks 1904.

Links may connect client device 1906, transportation matching system 1902, and vehicle subsystem 1908 to network 1904 or to each other. This disclosure contemplates any suitable links. In particular embodiments, one or more links include one or more wireline (such as for example Digital Subscriber Line ("DSL") or Data Over Cable Service Interface Specification ("DOCSIS"), wireless (such as for example Wi-Fi or Worldwide Interoperability for Microwave Access ("WiMAX"), or optical (such as for example Synchronous Optical Network ("SONET") or Synchronous Digital Hierarchy ("SDH") links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1900. One or more first links may differ in one or more respects from one or more second links.

In particular embodiments, client device 1906 may be an electronic device including hardware, software, or embedded logic components or a combination of two or more such components and capable of carrying out the appropriate functionalities implemented or supported by client device 1906. As an example, and not by way of limitation, a client device 1906 may include any of the computing devices discussed above in relation to FIG. 18. A client device 1906 may enable a network user at client device 1906 to access network 1904. A client device 1906 may enable its user to communicate with other users at other client devices 1906.

In particular embodiments, client device 1906 may include a requestor application or a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client device 1906 may enter a Uniform Resource Locator ("URL") or other address directing the web browser to a particular server (such as server), and the web browser may generate a Hyper Text Transfer Protocol ("HTTP") request and communicate the HTTP request to server. The server may accept the HTTP request and communicate to client device 1906 one or more Hyper Text Markup Language ("HTML") files responsive to the HTTP request. Client device 1906 may render a webpage based on the HTML files from the server for presentation to the user. This disclosure contemplates any suitable webpage files. As an example, and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, transportation matching system 1902 may be a network-addressable computing system that can host a transportation matching network. Transportation matching system 1902 may generate, store, receive, and send data, such as, for example, user-profile data, concept-profile data, text data, transportation request data, GPS location data, provider data, requestor data, vehicle data, or other suitable data related to the transportation matching network. This may include authenticating the identity of providers and/or vehicles who are authorized to provide transportation services through the transportation matching system 1902. In addition, the transportation matching system may manage identities of service requestors such as users/requestors. In particular, the transportation matching system 1902 may maintain requestor data such as driving/riding histories, personal data, or other user data in addition to navigation and/or traffic management services or other location services (e.g., GPS services).

In particular embodiments, the transportation matching system 1902 may manage transportation matching services to connect a user/requestor with a vehicle and/or provider. By managing the transportation matching services, the transportation matching system 1902 can manage the distribution and allocation of resources from the vehicle subsystem 1908 and user resources such as GPS location and availability indicators, as described herein.

Transportation matching system 1902 may be accessed by the other components of network environment 1900 either directly or via network 1904. In particular embodiments, transportation matching system 1902 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, transportation matching system 1902 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 1906, or a transportation matching system 1902 to manage, retrieve, modify, add, or delete, the information stored in data store.

In particular embodiments, transportation matching system 1902 may provide users with the ability to take actions on various types of items or objects, supported by transportation matching system 1902. As an example, and not by way of limitation, the items and objects may include transportation matching networks to which users of transportation matching system 1902 may belong, vehicles that users may request, location designators, computer-based applications that a user may use, transactions that allow users to buy or sell items via the service, interactions with advertisements that a user may perform, or other suitable items or objects. A user may interact with anything that is capable of being represented in transportation matching system 1902 or by an external system of a third-party system, which is separate from transportation matching system 1902 and coupled to transportation matching system 1902 via a network 1904.

In particular embodiments, transportation matching system 1902 may be capable of linking a variety of entities. As an example, and not by way of limitation, transportation matching system 1902 may enable users to interact with each other or other entities, or to allow users to interact with these entities through an application programming interfaces ("API") or other communication channels.

In particular embodiments, transportation matching system 1902 may include a variety of servers, sub-systems, programs, modules, logs, and data stores. In particular embodiments, transportation matching system 1902 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Transportation matching system 1902 may also include suitable components such as network interfaces, security mechanisms, load balancers, failover servers, management-and-network-operations consoles, other suitable components, or any suitable combination thereof. In particular embodiments, transportation matching system 1902 may include one or more user-profile stores for storing user profiles. A user profile may include, for example, biographic information, demographic information, behavioral information, social information, or other types of descriptive information, such as work experience, educational history, hobbies or preferences, interests, affinities, or location.

The web server may include a mail server or other messaging functionality for receiving and routing messages between transportation matching system 1902 and one or more client devices 1906. An action logger may be used to receive communications from a web server about a user's actions on or off transportation matching system 1902. In conjunction with the action log, a third-party-content-object log may be maintained of user exposures to third-party-content objects. A notification controller may provide information regarding content objects to a client device 1906. Information may be pushed to a client device 1906 as notifications, or information may be pulled from client device 1906 responsive to a request received from client device 1906. Authorization servers may be used to enforce one or more privacy settings of the users of transportation matching system 1902. A privacy setting of a user determines how particular information associated with a user can be shared. The authorization server may allow users to opt in to or opt out of having their actions logged by transportation matching system 1902 or shared with other systems, such as, for example, by setting appropriate privacy settings. Third-party-content-object stores may be used to store content objects received from third parties. Location stores may be used for storing location information received from client devices 1906 associated with users.

In addition, the vehicle subsystem 1908 can include a human-operated vehicle or an autonomous vehicle. A provider of a human-operated vehicle can perform maneuvers to pick up, transport, and drop off one or more requestors according to the embodiments described herein. In certain embodiments, the vehicle subsystem 1908 can include an autonomous vehicle—i.e., a vehicle that does not require a human operator. In these embodiments, the vehicle subsystem 1908 can perform maneuvers, communicate, and otherwise function without the aid of a human provider, in accordance with available technology.

In particular embodiments, the vehicle subsystem 1908 may include one or more sensors incorporated therein or associated thereto. For example, sensor(s) can be mounted on the top of the vehicle subsystem 1908 or else can be located within the interior of the vehicle subsystem 1908. In certain embodiments, the sensor(s) can be located in multiple areas at once—i.e., split up throughout the vehicle subsystem 1908 so that different components of the sensor(s) can be placed in different locations in accordance with optimal operation of the sensor(s). In these embodiments, the sensor(s) can include a LIDAR sensor and an inertial measurement unit ("IMU") including one or more accelerometers, one or more gyroscopes, and one or more magnetometers. The sensor(s) can additionally or alternatively include a wireless IMU ("WIMU"), one or more cameras, one or more microphones, or other sensors or data input devices capable of receiving and/or recording information relating to navigating a route to pick up, transport, and/or drop off a requestor.

In particular embodiments, the vehicle subsystem 1908 may include a communication device capable of communicating with the client device 1906 and/or the transportation matching system 1902. For example, the vehicle subsystem 1908 can include an on-board computing device communicatively linked to the network 1904 to transmit and receive data such as GPS location information, sensor-related information, requestor location information, or other relevant information.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
   receiving, a transportation request from a requestor device corresponding to a destination location;
   determining a transportation time for a provider device to travel to the destination location;
   identifying a set of historical outcomes and historical rewards corresponding to providing transportation services from the destination location;
   utilizing a prediction model conditioned to approximate multi-outcome transportation metrics based on a least square value estimation and the set of historical outcomes and historical rewards to determine a multi-outcome transportation-value metric for the provider device corresponding to the destination location;
   generating a discounted multi-outcome transportation-value metric for the provider device corresponding to the destination location by applying a combination of the transportation time and a logarithmic time discounting rate reflecting a rate of value metric degradation over the transportation time to the multi-outcome transportation-value metric;
   based on the discounted multi-outcome transportation-value metric, transmitting, to the provider device, the transportation request to cause the provider device to display transportation request information for the transportation request with a selectable option to accept the transportation request, wherein the transportation request comprises a pickup location and a destination location; and based on receiving an indication of a user interaction with the selectable option, causing the provider device to display, via a map user interface of the provider device, electronic navigational directions to the pickup location corresponding to the transportation request and additional electronic navigational directions to the destination location corresponding to the transportation request.

2. The computer-implemented method of claim 1, further comprising:

identifying a current location of the provider device;

determining an additional multi-outcome transportation-value metric for the provider device corresponding to the current location; and transmitting the transportation request to the provider device based on a comparison of the discounted multi-outcome transportation-value metric corresponding to the destination location and the additional multi-outcome transportation-value metric corresponding to the current location.

3. The computer-implemented method of claim 2, further comprising transmitting to the provider device in response to determining that the discounted multi-outcome transportation-value metric corresponding to the destination location is greater than the additional multi-outcome transportation-value metric corresponding to the current location.

4. The computer-implemented method of claim 1, further comprising:

in response to the transportation request, generating a plurality of discounted multi-outcome transportation-value metrics for a plurality of provider devices operating in a plurality of geographical areas; and transmitting, to the provider device, transportation request based on a comparison between the discounted multi-outcome transportation-value metric and the plurality of discounted multi-outcome transportation-value metrics.

5. The computer-implemented method of claim 4, further comprising:

identifying an additional transportation request from a second requestor device corresponding to an additional destination location;

determining an additional discounted multi-outcome transportation-value metric for the provider device corresponding to the additional destination location; and transmitting, to the provider device, transportation request by selecting between the transportation request and the additional transportation request based on a comparison of the discounted multi-outcome transportation-value metric corresponding to the destination location, the plurality of discounted multi-outcome transportation-value metrics, and the additional discounted multi-outcome transportation-value metric corresponding to the additional destination location.

6. The computer-implemented method of claim 1, further comprising:

determining a first set of provider devices corresponding to a prioritized transportation dispatch mode and a second set of provider devices corresponding to an additional transportation dispatch mode;

generating the discounted multi-outcome transportation-value metric by determining a prioritized multi-outcome transportation-value metric for the provider device in response to determining that the provider device corresponds to the prioritized transportation dispatch mode; and selecting the provider device to fulfill the transportation request by comparing the prioritized multi-outcome transportation-value metric to an additional prioritized multi-outcome transportation-value metric for the provider device corresponding to a current location.

7. The computer-implemented method of claim 1, further comprising, based on the discounted multi-outcome transportation-value metric, transmitting the transportation request to an autonomous vehicle corresponding to the provider device to cause the autonomous vehicle to fulfill the transportation request.

8. The computer-implemented method of claim 1, wherein the set of historical outcomes and historical rewards corresponding to providing transportation services from the destination location comprises a first set of historical outcomes and historical rewards for providing transportation services from the destination location to successive destination locations and a second set of historical outcomes and historical rewards for providing transportation services from the successive destination locations.

9. A non-transitory computer-readable medium storing instructions that, when executed by at least one processor, cause a computer device to:

receive, a transportation request from a requestor device corresponding to a destination location;

determine a transportation time for a provider device to travel to the destination location;

identify a set of historical outcomes and historical rewards corresponding to providing transportation services from the destination location;

utilize a prediction model conditioned to approximate multi-outcome transportation metrics based on a least square value estimation and the set of historical outcomes and historical rewards to determine a multi-outcome transportation-value metric for the provider device corresponding to the destination location;

generate a discounted multi-outcome transportation-value metric for the provider device corresponding to the destination location by applying a combination of the transportation time and a logarithmic time discounting rate reflecting a rate of value metric degradation over the transportation time to the multi-outcome transportation-value metric;

based on the discounted multi-outcome transportation-value metric, transmit, to the provider device, the transportation request to cause the provider device to display transportation request information for the transportation request with a selectable option to accept the transportation request, wherein the transportation request comprises a pickup location and a destination location; and based on receiving an indication of a user interaction with the selectable option, cause the provider device to display, via a map user interface of the provider device, electronic navigational directions to the pickup location corresponding to the transportation request and additional electronic navigational directions to the destination location corresponding to the transportation request.

10. The non-transitory computer-readable medium of claim 9, further comprising instructions that, when executed by the at least one processor, cause the computer device to determine the multi-outcome transportation-value metric based on a sequence of expected rewards across a sequence of time modified utilizing the logarithmic time discounting rate.

11. The non-transitory computer-readable medium of claim 9, further comprising instructions that, when executed by the at least one processor, cause the computer device to:
identify discretized locations and discretized times within a geographical area;
generate state spaces from historical outcomes and historical rewards corresponding to the discretized locations and discretized times; and
utilize the prediction model to analyze the state spaces to determine the multi-outcome transportation-value metric for the provider device corresponding to the destination location.

12. The non-transitory computer-readable medium of claim 9, further comprising instructions that, when executed by the at least one processor, cause the computer device to transmit, to the provider device, the transportation request based on a comparison between the discounted multi-outcome transportation-value metric and a plurality of discounted multi-outcome transportation-value metrics corresponding to a plurality of provider devices operating in a plurality of geographical areas.

13. The non-transitory computer-readable medium of claim 9, wherein the discounted multi-outcome transportation-value metric comprises an expected reward corresponding to the provider device fulfilling multiple transportation requests in a sequence of outcomes originating from the destination location, the expected reward comprising a number of transportation requests fulfilled by the provider device in the sequence of outcomes, a provider device utilization metric reflecting time associated with the provider device actively fulfilling transportation requests in the sequence of outcomes, or a monetary value corresponding to transportation requests in the sequence of outcomes.

14. The non-transitory computer-readable medium of claim 9, further comprising instructions that, when executed by the at least one processor, cause the computer device to utilize the prediction model to analyze the set of historical outcomes and historical rewards to determine the multi-outcome transportation-value metric for the provider device corresponding to the destination location and a successive destination location.

15. The non-transitory computer-readable medium of claim 9, further comprising instructions that, when executed by the at least one processor, cause the computer device to:
determine an expected reward corresponding to providing transportation services to the destination location; and
transmit the transportation request to the provider device based on a combination of the discounted multi-outcome transportation-value metric and the expected reward corresponding to providing transportation services to the destination location.

16. A system comprising:
one or more memory devices; and
one or more computing devices configured to:
receive, a transportation request from a requestor device corresponding to a destination location;
determine a transportation time for a provider device to travel to the destination location;
identify a set of historical outcomes and historical rewards corresponding to providing transportation services from the destination location;
utilize a prediction model conditioned to approximate multi-outcome transportation metrics based on a least square value estimation and the set of historical outcomes and historical rewards to determine a multi-outcome transportation-value metric for the provider device corresponding to the destination location;
generate a discounted multi-outcome transportation-value metric for the provider device corresponding to the destination location by applying a combination of the transportation time and a logarithmic time discounting rate reflecting a rate of value metric degradation over the transportation time to the multi-outcome transportation-value metric;
based on the discounted multi-outcome transportation-value metric, transmit, to the provider device, the transportation request to cause the provider device to display transportation request information for the transportation request with a selectable option to accept the transportation request, wherein the transportation request comprises a pickup location and a destination location; and
based on receiving an indication of a user interaction with the selectable option, cause the provider device to display, via a map user interface of the provider device, electronic navigational directions to the pickup location corresponding to the transportation request and additional electronic navigational directions to the destination location corresponding to the transportation request.

17. The system of claim 16, wherein the one or more computing devices are further configured to:
identify a current location of the provider device;
determine an additional multi-outcome transportation-value metric for the provider device corresponding to the current location; and
transmit the transportation request to the provider device based on a comparison of the discounted multi-outcome transportation-value metric corresponding to the destination location and the additional multi-outcome transportation-value metric corresponding to the current location.

18. The system of claim 16, wherein the one or more computing devices are further configured to:
identify an additional transportation request from a second requestor device corresponding to an additional destination location;
determine an additional discounted multi-outcome transportation-value metric for the provider device corresponding to the additional destination location; and
transmitting, to the provider device, the transportation request by selecting between the transportation request and the additional transportation request based on a comparison of the discounted multi-outcome transportation-value metric corresponding to the destination location and the additional discounted multi-outcome transportation-value metric corresponding to the additional destination location.

19. The system of claim 16, wherein the one or more computing devices are further configured to:
determine a first set of provider devices corresponding to a prioritized transportation dispatch mode and a second set of provider devices corresponding to an additional transportation dispatch mode;
generate the discounted multi-outcome transportation-value metric by determining a prioritized multi-outcome transportation-value metric for the provider device in response to determining that the provider device corresponds to the prioritized transportation dispatch mode; and select the provider device to fulfill the transportation request by comparing the prioritized multi-outcome transportation-value metric to an additional prioritized multi-outcome transportation-value metric for the provider device corresponding to a current location.

20. The system of claim 16, wherein the set of historical outcomes and historical rewards correspond to providing transportation services from the destination location comprises a first set of historical outcomes and historical rewards for providing transportation services from the destination location to successive destination locations and a second set of historical outcomes and historical rewards for providing transportation services from the successive destination locations.

* * * * *